United States Patent
Tangirala et al.

(10) Patent No.: US 11,041,071 B2
(45) Date of Patent: Jun. 22, 2021

(54) PEG-BASED LIGANDS WITH ENHANCED DISPERSIBILITY AND IMPROVED PERFORMANCE

(71) Applicant: Nanosys, Inc., Milpitas, CA (US)

(72) Inventors: Ravisubhash Tangirala, Fremont, CA (US); Shihai Kan, San Jose, CA (US); Jay Yamanaga, Campbell, CA (US); Charles Hotz, San Rafael, CA (US); Donald Zehnder, San Carlos, CA (US)

(73) Assignee: Nanosys, Inc., Milpitas, CA (US)

( * ) Notice: Subject to any disclaimer, the term of this patent is extended or adjusted under 35 U.S.C. 154(b) by 165 days.

(21) Appl. No.: 15/998,504

(22) Filed: Aug. 16, 2018

(65) Prior Publication Data

US 2019/0077954 A1 Mar. 14, 2019

Related U.S. Application Data

(60) Provisional application No. 62/546,342, filed on Aug. 16, 2017, provisional application No. 62/694,652, filed on Jul. 6, 2018.

(51) Int. Cl.

| | | |
|---|---|---|
| *C08L 71/02* | (2006.01) | |
| *C08K 3/22* | (2006.01) | |
| *C08K 3/30* | (2006.01) | |
| *C08K 5/5313* | (2006.01) | |
| *C08K 5/3412* | (2006.01) | |
| *C08K 5/3467* | (2006.01) | |
| *C08G 65/332* | (2006.01) | |
| *C08G 65/333* | (2006.01) | |
| *B82Y 40/00* | (2011.01) | |

(52) U.S. Cl.
CPC .......... *C08L 71/02* (2013.01); *C08G 65/3324* (2013.01); *C08G 65/33306* (2013.01); *C08K 3/22* (2013.01); *C08K 3/30* (2013.01); *C08K 5/3412* (2013.01); *C08K 5/3467* (2013.01); *C08K 5/5313* (2013.01); *B82Y 40/00* (2013.01); *C08G 2650/56* (2013.01); *C08K 2003/2217* (2013.01); *C08K 2003/2296* (2013.01)

(58) Field of Classification Search
CPC .......... C08K 3/22; C08K 3/30; C08K 5/3412; C08K 5/3467; C08K 5/5313; C08L 71/02
See application file for complete search history.

(56) References Cited

U.S. PATENT DOCUMENTS

| | | |
|---|---|---|
| 5,505,928 A | 4/1996 | Alivisatos et al. |
| 6,207,229 B1 | 3/2001 | Bawendi et al. |
| 6,225,198 B1 | 5/2001 | Alivisatos et al. |
| 6,306,736 B1 | 10/2001 | Alivisatos et al. |
| 6,322,901 B1 | 11/2001 | Bawendi et al. |
| 6,576,291 B2 | 6/2003 | Bawendi et al. |
| 6,607,829 B1 | 8/2003 | Bawendi et al. |
| 6,788,453 B2 | 9/2004 | Banin et al. |
| 6,821,337 B2 | 11/2004 | Bawendi et al. |
| 6,861,155 B2 | 3/2005 | Bawendi et al. |
| 6,949,206 B2 | 9/2005 | Whiteford et al. |
| 7,060,243 B2 | 6/2006 | Bawendi et al. |
| 7,125,605 B2 | 10/2006 | Bawendi et al. |
| 7,138,098 B2 | 11/2006 | Bawendi et al. |
| 7,267,875 B2 | 9/2007 | Whiteford et al. |
| 7,374,807 B2 | 5/2008 | Parce et al. |
| 7,374,824 B2 | 5/2008 | Bawendi et al. |
| 7,557,028 B1 | 7/2009 | Scher et al. |
| 7,566,476 B2 | 7/2009 | Bawendi et al. |
| 7,572,393 B2 | 8/2009 | Whiteford et al. |
| 7,645,397 B2 | 1/2010 | Parce et al. |
| 8,062,967 B1 | 11/2011 | Scher et al. |
| 8,101,234 B2 | 1/2012 | Bawendi et al. |
| 8,158,193 B2 | 4/2012 | Bawendi et al. |
| 8,282,412 B1 | 10/2012 | Yaguchi et al. |
| 8,563,133 B2 | 10/2013 | Whiteford et al. |
| 9,169,435 B2 | 10/2015 | Guo et al. |
| 2008/0237540 A1 | 10/2008 | Dubrow |
| 2008/0281010 A1 | 11/2008 | Lefas et al. |
| 2010/0110728 A1 | 5/2010 | Dubrow et al. |
| 2011/0262752 A1 | 10/2011 | Bawendi et al. |
| 2011/0263062 A1 | 10/2011 | Bawendi et al. |
| 2015/0236195 A1 | 8/2015 | Guo et al. |

FOREIGN PATENT DOCUMENTS

WO WO 2005/010109 A2 2/2005

OTHER PUBLICATIONS

Boyer et al., "Surface modification of upconverting NaYF4 nanoparticles with PEG-phosphate ligands," Langmuir, vol. 26, No. 2, Jul. 10, 2009 (Jul. 10, 2009), pp. 1157-1164.*

Battaglia, D. and Peng, X., "Formation of High Quality InP and InAs Nanocrystals in a Noncoordinating Solvent," *Nano Letters* 2(9):1027-1030, American Chemical Society, United States (2002).

Borchert, H., et al., "Investigation of ZnS Passivated InP Nanocrystals by XPS," *Nano Letters* 2(2):151-154, American Chemical Society, United States (2002).

Chang, S., et al., "Alcohol-Soluble Quantum Dots: Enhanced Solution Processability and Charge Injection for Electroluminescence Devices," *J. Selected Topics in Quantum Electronics* 23(5):1-8, IEEE Publishing, United States (2017).

(Continued)

*Primary Examiner* — Robert D Harlan

(74) *Attorney, Agent, or Firm* — Sterne, Kessler, Goldstein & Fox P.L.L.C.

(57) ABSTRACT

The present disclosure provides nanostructure compositions and methods of producing nanostructure compositions. The nanostructure compositions comprise at least one population of nanostructures, at least one poly(alkylene oxide) ligand bound to the surface of the nanostructures, and optionally at least one organic resin. The present disclosure also provides nanostructure films comprising a nanostructure layer and methods of making nanostructure films.

27 Claims, 8 Drawing Sheets

(56) References Cited

OTHER PUBLICATIONS

Cros-Gagneux, A., et al., "Surface Chemistry of InP Quantum Dots: A Comprehensive Study," *J. Am. Chem. Soc.* 132:18147-18157, American Chemical Society, United States (2010).

Duan, L., et al., "Solution processable small molecules for organic light-emitting diodes," *J. Mater. Chem.* 20:6392-6407, Royal Society of Chemistry, England (2010).

Glogowski, E., et al., "Functionalization of Nanoparticles for Dispersion in Polymers and Assembly in Fluids," *J. Polymer Science: Part A: Polymer Chemistry* 44:5076-5086, Wiley InterScience, United States (2006).

Guzelian, A.A., et al, "Colloidal chemical synthesis and characterization of InAs nanocrystal quantum dots," *Appl. Phys. Lett.* 69(10):1432-1434, American Institute of Physics, United States (1996).

Guzelian, A.A., et al, "Synthesis of Size-Selected, Surface-Passivated InP Nanocrystals," *J. Phys. Chem.* 100:7212-7219, American Chemical Society, United States (1996).

Haubold, S., et al., "Strongly Luminescent InP/ZnS Core-Shell Nanoparticles," *ChemPhysChem* 5:331-334, Wiley-VCH-Verlag GmbH, Germany (2001).

Ho, S., et al., "Review of recent progress in multilayer solution-processed organic light-emitting diodes," *J. Photonics for Energy* 5:1-17, SPIE Publications, United States (2015).

Hussain, S., et al, "One-Pot Fabrication of High-Quality InP/ZnS (Core/Shell) Quantum Dots and Their Application to Cellular Imaging," *ChemPhysChem* 10:1466-1470, Wiley-VCH Verlag GmbH, Germany (2009).

Kim, S., et al., "Highly Luminescent InP/GaP/ZnS Nanocrystals and Their Application to White Light-Emitting Diodes," *J. Am. Chem. Soc.* 134:3804-3809, American Chemical Society, United States (2012).

Li, L., et al. "Economic Synthesis of High Quality InP Nanocrystals Using Calcium Phosphide as the Phosphorus Precursor," *Chem. Mater.* 20:2621-2623, American Chemical Society, United States (2008).

Li, L. and Reiss, P., "One-pot Synthesis of Highly Luminescent InP/ZnS Nanocrystals without Precursor Injection," *J. Am. Chem. Soc.* 130:11588-11589, American Chemical Society, United States (2008).

Lim, J., et al., "InP@ZnSeS, Core@Composition Gradient Shell Quantum Dots with Enhanced Stability," *Chemistry of Materials* 23:4459-4463, American Chemical Society, United States (2011).

Liu, Z., et al.,"Coreduction Colloidal Synthesis of III-V Nanocrystals: The Case of InP," *Angew. Chem. Int. Ed.* 47:3540-3542, Wiley-VCH Verlag GmbH & Co, Germany (2008).

Lucey, D.W., et al., "Monodispersed InP Quantum Dots Prepared by Colloidal Chemistry in a Noncoordinating Solvent," *Chem. Mater.* 17:3754-3762, American Chemical Society, United States (2005).

Mićić, O. I. et al., "Size-Dependent Spectroscopy of InP Quantum Dots," *J. Phys. Chem. B* 101:4904-4912, American Chemical Society, United States (1997).

Mićić, O. I. et al., "Core-Shell Quantum Dots of Lattice-Matched $ZnCdSe_2$ Shells on InP Cores: Experiment and Theory," *J. Phys. Chem. B* 104:12149-12156, American Chemical Society, United States (2000).

Mićić, O. I. et al., "Synthesis and characterization of InP, GaP, and GaInP2 quantum dots," *J. Phys. Chem. B*. 99:7754-7759, American Chemical Society, United States (1995).

Nann, T., et al., "Water Splitting by Visible Light: A Nanophotocathode for Hydrogen Production," *Angew. Chem. Int. Ed.* 49:1574-1577, Wiley-VCH Verlag GmbH & Co., Germany (2010).

Wells, R.L., et al., "Use of Tris(trimethylsilyl)arsine to Prepare Gallium Arsenide and Indium Arsenide," *Chemistry of Materials* 1(1):4-6, American Chemical Society, United States (1989).

Xie, R., et al., "Colloidal InP Nanocrystals as Efficient Emitters Covering Blue to Near-Infrared," *J. Am. Chem. Soc.* 129:15432-15433, American Chemical Society, United States (2007).

Xu, S., et al., "Rapid Synthesis of High-Quality InP Nanocrystals," *J. Am. Chem. Soc.* 128:1054-1055, American Chemical Society, United States (2006).

Zan, F., et al., "Experimental Studies on Blinking Behavior of Single InP/ZnS Quantum Dots: Effects of Synthetic Conditions and UV Irradiation," *J. Phys. Chem. C* 116:3944-3950, American Chemical Society, United States (2012).

Ziegler, J., et al., "Silica-Coated InP/ZnS Nanocrystals as Converter Material in White LEDs," *Adv. Mater.* 20:4068-4073, Wiley-VCH Verlag GmbH & Co., Germany (2008).

Amela-Cortes, M., et al., "Stable functionalized PEGylated quantum dots micelles with a controlled stoichiometry," *Chem. Commun.* 47:1246-1248, The Royal Society of Chemistry, England (2011).

Boyer, J.-C., et al., "Surface Modification of Upconverting $NaYF_4$ Nanoparticles with PEG-Phosphate Ligands for NIR (800 nm) Biolabeling within the Biological Window," *Langmuir* 26:1157-1164, American Chemical Society, United States (2009).

Huang, H., et al., "PEGylation of MnO nanoparticles via catechol-Mn chelation to improving $T_1$-weighted magnetic resonance imaging application," *Journal of Applied Polymer Science* 132:42360 (8 pages), Wiley Periodicals, Inc., United States (2015).

International Search Report and Written Opinion for International Application No. PCT/US2018/000232, United States Patent Office, dated Feb. 5, 2019, 20 pages.

Jokerst, J.V., et al., "Nanoparticle PEGylation for imaging and therapy," *Nanomedicine* 6:715-728, Future Medicine Ltd.. England (2011).

Susumu, K., et al., "Enhancing the Stability and Biological Functionalities of Quantum Dots via Compact Multifunctional Ligands," *J. Am. Chem. Soc.* 129:13987-13996, American Chemical Society, United States (2007).

Yoon, T.-J., "Specific Targeting, Cell Sorting, and Bioimaging with Smart Magnetic Silica Core-Shell Nanomaterials," *Small* 2:209-215, Wiley-VCH Verlag GmbH & Co., Germany (2006).

\* cited by examiner

PEG-BASED LIGANDS WITH ENHANCED DISPERSIBILITY AND IMPROVED PERFORMANCE

BACKGROUND OF THE INVENTION

Field of the Invention

The present disclosure provides nanostructure compositions and methods of producing nanostructure compositions. The nanostructure compositions comprise at least one population of nanostructures, at least one poly(alkylene oxide) ligand bound to the surface of the nanostructures, and optionally at least one organic resin. The present disclosure also provides nanostructure films comprising a nanostructure layer and methods of making nanostructure films.

BACKGROUND OF THE INVENTION

Synthetic methods that enable the preparation of quantum dots with accurate control of their properties afford nanocrystals whose surface is coated with a layer of highly hydrophobic molecular ligands. These quantum dots are therefore (moderately) soluble only in apolar organic solvents such as toluene, hexane, or chloroform. Quantum dots are often processed into nanocomposites, such as quantum dot enhancement films (QDEF) or other printed-ink applications through formulations of quantum dot concentrates with various curable resins. Inkjet printing is a potentially cheaper and more efficient alternative to photolithography for fabrication of quantum dot color conversion layers. For inkjet printing applications, quantum dots have to be homogenized with the ink components, which are often hydrophilic.

Photoresists and UV-curable resins used for printing or photopatterning applications typically contain monomeric or oligomeric acrylates or epoxies that can be polymerized upon exposure to UV radiation. Such photoresists and UV-curable formulations are relatively hydrophilic. As-synthesized quantum dots are typically immiscible with these types of formulations due to their hydrophobic long alkyl ligands. This problem is magnified at high quantum dots loadings that are required to make an efficient color filter that blocks blue light and allows only green or red light to pass through. In addition, photoresists are often processed and patterned in conditions that quantum dots are generally unsuited to, including deposition and heating in air, and exposure to a developer solution. Quantum dots are synthesized under inert atmosphere, and are known to lose photoluminescence when processed in air.

A need exists to improve dispersion of quantum dot concentrates in photoresists and UV-curable formulations and results in improved optical properties when used to prepare a quantum dot film. A need also exists to improve dispersion of quantum dot concentrates in photoresists and UV-curable formulations to achieve improved properties in quantum dot films.

BRIEF SUMMARY OF THE INVENTION

The present disclosure is directed to a nanostructure composition, comprising:
(a) at least one population of nanostructures; and
(b) at least one poly(alkylene oxide) ligand bound to the surface of the nanostructures, wherein the at least one poly(alkylene oxide) ligand comprises a functional group terminated poly(alkylene oxide), provided that the functional group terminated poly(alkylene oxide) is not a thiol terminated poly(ethylene oxide).

In some embodiments, the poly(alkylene oxide) ligand has the formula:

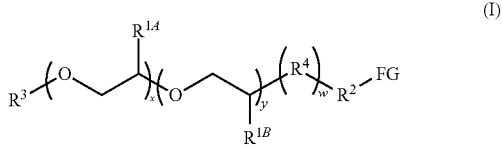

(I)

wherein:
x is 1 to 100;
y is 0 to 100;
w is 0 or 1;
$R^{1A}$ and $R^{1B}$ independently are H or $C_{1-20}$ alkyl;
$R^2$ is $C_{1-20}$ alkyl;
$R^3$ is H, $C_{1-20}$ alkyl, $C_{3-8}$ cycloalkyl, or $C_{6-14}$ aryl;
$R^4$ is —O—, —OC(=O)—, amido, or $C_{1-20}$ alkyl; and
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1A}$ and $R^{1B}$ cannot both be H.

In some embodiments, the poly(alkylene oxide) ligand has the formula:

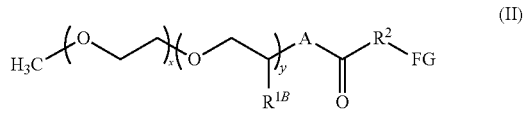

(II)

wherein:
x is 1 to 100;
y is 0 to 100;
A is —O— or —N—;
$R^{1B}$ is H or $C_{1-20}$ alkyl;
$R^2$ is $C_{1-20}$ alkyl;
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1B}$ is not H.

In some embodiments, the nanostructure composition comprises between one and five populations of nanostructures. In some embodiments, the nanostructure composition comprises two populations of nanostructures.

In some embodiments, the nanostructures comprise a core selected from the group consisting of InP, InZnP, InGaP, CdSe, CdS, CdSSe, CdZnSe, CdZnS, ZnSe, ZnSSe, ZnTe, ZnTeSe, ZnTeSeS, InAs, InGaAs, and InAsP.

In some embodiments, the nanostructures comprise a core of InP. In some embodiments, the nanostructures comprise at least one shell. In some embodiments, the nanostructures comprise two shells.

In some embodiments, x is 10 to 20. In some embodiments, y is 1 to 10. In some embodiments, $R^{1B}$ is —CH$_3$. In some embodiments, $R^2$ is —CH$_2$CH$_2$—.

In some embodiments, the poly(alkylene oxide) ligand has the formula:

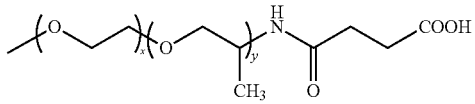

(III)

wherein:
x is 10 to 20; and
y is 1 to 10.

In some embodiments, x is 19 and y is 3.

In some embodiments, the nanostructure composition comprises at least one reactive diluent. In some embodiments, the at least one reactive diluent is isobornyl acrylate, 1,6-hexanediol dimethacrylate, dipropylene glycol diacrylate, limonene dioxide, or dioxetanyl ether.

In some embodiments, the nanostructure composition comprises an organic solvent. In some embodiments, the organic solvent is toluene, chloroform, propylene glycol methyl ether acetate, 1,4-butanediol diacetate, hexyl acetate, or combinations thereof.

In some embodiments, the nanostructures are quantum dots.

The present disclosure is also directed to a nanostructure composition, comprising:
(a) at least one population of nanostructures, wherein between about 10% and about 100% of the nanostructures in the at least one population of nanostructures comprise a functional group terminated poly(alkylene oxide) ligand bound to the nanostructures, provided that the functional group terminated poly(alkylene oxide) is not a thiol terminated poly(ethylene oxide); and
(b) at least one organic resin.

In some embodiments, the nanostructure composition comprises between one and five populations of nanostructures. In some embodiments, the nanostructure composition comprises one population of nanostructures.

In some embodiments, the nanostructures comprise a core selected from the group consisting of InP, InZnP, InGaP, CdSe, CdS, CdSSe, CdZnSe, CdZnS, ZnSe, ZnSSe, ZnTe, ZnTeSe, ZnTeSeS, InAs, InGaAs, and InAsP. In some embodiments, the nanostructures comprise a core of InP.

In some embodiments, the nanostructure composition comprises as a weight percentage between about 0.0001% and about 5% of the at least one population of nanostructures.

In some embodiments, the poly(alkylene oxide) ligand has the formula:

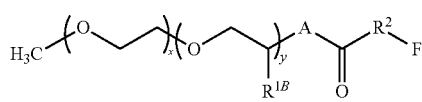

(II)

wherein:
x is 1 to 100;
y is 0 to 100;
A is —O— or —N—;
$R^{1B}$ is H or $C_{1-20}$ alkyl;
$R^2$ is $C_{1-20}$ alkyl;

FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1B}$ is not H.

In some embodiments, x is 10 to 20. In some embodiments, y is 1 to 10. In some embodiments, $R^{1B}$ is —CH$_3$. In some embodiments, $R^2$ is —CH$_2$CH$_2$—.

In some embodiments, the poly(alkylene oxide) ligand has the formula:

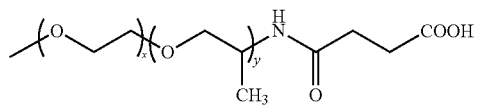

(III)

wherein:
x is 10 to 20; and
y is 1 to 10.

In some embodiments, x is 19 and y is 3.

In some embodiments, the nanostructure composition comprises between one and five organic resins. In some embodiments, the nanostructure composition comprises one organic resin.

In some embodiments, the at least one organic resin is a thermosetting resin or a UV curable resin. In some embodiments, the at least one organic resin is a UV curable resin. In some embodiments, the at least one organic resin is a mercapto-functional compound.

In some embodiments, the nanostructure composition comprises at least one reactive diluent. In some embodiments, the at least one reactive diluent is isobornyl acrylate, 1,4-butanediol diacrylate, 1,6-hexanediol dimethacrylate, dipropylene glycol diacrylate, limonene dioxide, or dioxetanyl ether.

In some embodiments, the nanostructure composition comprises an organic solvent. In some embodiments, the organic solvent is toluene, chloroform, propylene glycol methyl ether acetate, 1,4-butanediol diacetate, hexyl acetate, or combinations thereof.

In some embodiments, the nanostructure composition comprises as a weight percentage between about 5% and about 99% of the at least one organic resin.

In some embodiments, between about 30% and about 100% of the nanostructures in the at least one population of nanostructures comprise the poly(alkylene oxide) ligand bound to the nanostructures.

In some embodiments, the nanostructure composition comprises a population of nanostructures comprising a InP core and/or a population of nanostructures comprising a CdSe core. In some embodiments, the nanostructures comprise at least one shell. In some embodiments, the nanostructures comprise two shells. In some embodiments, the nanostructures are quantum dots.

In some embodiments, the nanostructure composition is stable for between about 1 day and about 3 years when stored at a temperature between about 10° C. and about 90° C.

In some embodiments, a molded article comprising the nanostructure composition is provided. In some embodiments, the molded article is a film, a substrate for a display, or a light emitting diode. In some embodiments, the molded article is a film.

The present disclosure is directed to a method of replacing a first ligand on a nanostructure with a second ligand, the method comprising admixing a reaction mixture comprising a population of nanostructures having the first ligand non-covalently bound to the nanostructure and a poly(alkylene oxide) ligand which is the second ligand, such that the second ligand displaces the first ligand and becomes non-covalently bound to the nanostructure, wherein the poly(alkylene oxide) ligand has the formula:

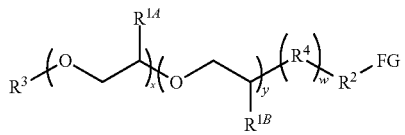

(I)

wherein:
x is 1 to 100;
y is 0 to 100;
w is 0 or 1;
$R^{1A}$ and $R^{1B}$ independently are H or $C_{1-20}$ alkyl;
$R^2$ is $C_{1-20}$ alkyl;
$R^3$ is H, $C_{1-20}$ alkyl, $C_{3-8}$ cycloalkyl, or $C_{6-14}$ aryl;
$R^4$ is —O—, —OC(=O)—, amido, or $C_{1-20}$ alkyl; and
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1A}$ and $R^{1B}$ cannot both be H.

In some embodiments, the poly(alkylene oxide) ligand has the formula:

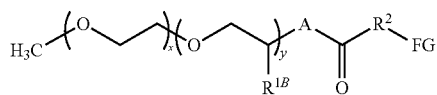

(II)

wherein:
x is 1 to 100;
y is 0 to 100;
A is —O— or —N—;
$R^{1B}$ is H or $C_{1-20}$ alkyl;
$R^2$ is $C_{1-20}$ alkyl;
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1B}$ is not H.

In some embodiments, the nanostructures comprise a core selected from the group consisting of InP, InZnP, InGaP, CdSe, CdS, CdSSe, CdZnSe, CdZnS, ZnSe, ZnSSe, ZnTe, ZnTeSe, ZnTeSeS, InAs, InGaAs, and InAsP.

In some embodiments, the nanostructures comprise a core of InP. In some embodiments, the nanostructures comprise at least one shell. In some embodiments, the nanostructures comprise two shells.

In some embodiments, x is 10 to 20. In some embodiments, y is 1 to 10. In some embodiments, $R^{1B}$ is —CH$_3$. In some embodiments, $R^2$ is —CH$_2$CH$_2$—.

In some embodiments, the poly(alkylene oxide) ligand has the formula:

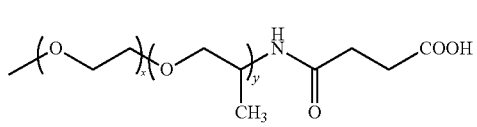

(III)

wherein:
x is 10 to 20; and
y is 1 to 10.
In some embodiments, x is 19 and y is 3.
In some embodiments, the second ligand displaces between about 40% and about 100% of the first ligand on the nanostructure.

In some embodiments, the admixing is at an agitation rate between 100 rpm and 10,000 rpm. In some embodiments, the admixing is for a time of between 1 minutes and 24 hours. In some embodiments, the admixing is at a temperature between about 20° C. and about 100° C.

The present disclosure is directed to a method of preparing a nanostructure composition, the method comprising
(a) providing a composition comprising at least one population of nanostructures, wherein between about 10% and about 100% of the nanostructures in the at least one population of nanostructures comprise a functional group terminated poly(alkylene oxide) ligand bound to the nanostructures, provided that the functional group terminated poly(alkylene oxide) is not a thiol terminated poly(ethylene oxide); and
(b) admixing at least one organic resin with the composition of (a).

In some embodiments, a composition comprising between one and five populations of nanostructures is provided in (a). In some embodiments, a composition comprising one population of nanostructures is provided in (a).

In some embodiments, the at least one population of nanostructures contains a core selected from the group consisting of InP, InZnP, InGaP, CdSe, CdS, CdSSe, CdZnSe, CdZnS, ZnSe, ZnSSe, ZnTe, ZnTeSe, ZnTeSeS, InAs, InGaAs, and InAsP.

In some embodiments, the nanostructure composition comprises as a weight percentage between about 0.0001% and about 5% of the at least one population of nanostructures.

In some embodiments, the nanostructure comprises at least one shell. In some embodiments, the nanostructure comprises two shells.

In some embodiments, the poly(alkylene oxide) ligand has the formula:

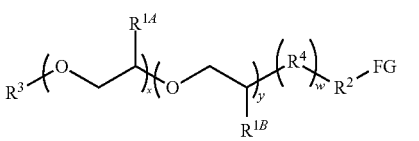

(I)

wherein:
x is 1 to 100;
y is 0 to 100;
w is 0 or 1;
$R^{1A}$ and $R^{1B}$ independently are H or $C_{1-20}$ alkyl;

$R^2$ is $C_{1-20}$ alkyl;
$R^3$ is H, $C_{1-20}$ alkyl, $C_{3-8}$ cycloalkyl, or $C_{6-14}$ aryl;
$R^4$ is —O—, —OC(=O)—, amido, or $C_{1-20}$ alkyl; and
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1A}$ and $R^{1B}$ cannot both be H.

In some embodiments, the poly(alkylene oxide) ligand has the formula:

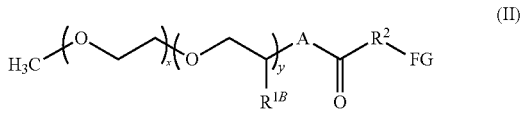

(II)

wherein:
x is 1 to 100;
y is 0 to 100;
A is —O— or —N—;
$R^{1B}$ is H or $C_{1-20}$ alkyl;
$R^2$ is $C_{1-20}$ alkyl;
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1B}$ is not H.

In some embodiments, x is 10 to 20. In some embodiments, y is 1 to 10. In some embodiments, $R^{1B}$ is —CH$_3$. In some embodiments, $R^2$ is —CH$_2$CH$_2$—.

In some embodiments, the poly(alkylene oxide) ligand has the formula:

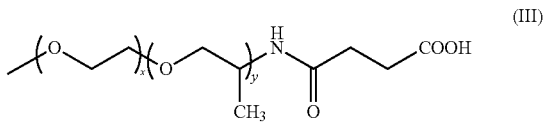

(III)

wherein:
x is 10 to 20; and
y is 1 to 10.

In some embodiments, x is 19 and y is 3.

In some embodiments, the nanostructure composition comprises between one and five organic resins. In some embodiments, the nanostructure composition comprises one organic resin.

In some embodiments, the at least one organic resin is a thermosetting resin or a UV curable resin. In some embodiments, the at least one organic resin is a UV curable resin. In some embodiments, the at least one organic resin is a mercapto-functional compound.

In some embodiments, the nanostructure composition comprises as a weight percentage between about 5% and about 99% of the at least one organic resin.

In some embodiments, between about 30% and about 100% of the nanostructures in the at least one population of nanostructures comprise the poly(alkylene oxide) ligand bound to the nanostructure. In some embodiments, between about 40% and about 100% of the nanostructures in the at least one populations of nanostructures comprise the poly(alkylene oxide) ligand bound to the nanostructure. In some embodiments, the nanostructures are quantum dots.

In some embodiments, the providing in (a) comprises: (1) replacing a first ligand non-covalently bound to a population of nanostructures with the poly(alkylene oxide) ligand; (2) purifying the nanostructures prepared in (1); and (3) dispersing the nanostructures in (2) in a reactive diluent or an organic solvent.

In some embodiments, the purifying in (2) comprises: (4) precipitating the nanostructures prepared in (1) in a non-polar solvent; and (5) centrifuging the composition in (4) and removing a supernatant.

In some embodiments, the reactive diluent is isobornyl acrylate, 1,4-butanediol acrylate, 1,6-hexanediol dimethacrylate, dipropylene glycol diacrylate, limonene dioxide, or dioxetanyl ether. In some embodiments, the organic solvent is toluene, chloroform, propylene glycol methyl ether acetate, 1,4-butanediol diacetate, hexyl acetate, or combinations thereof. In some embodiments, the non-polar solvent is hexane.

In some embodiments, the admixing in (b) is at an agitation rate between 100 rpm and 10,000 rpm. In some embodiments, the admixing in (b) is for a time of between 1 minutes and 24 hours.

The present disclosure is also directed to a nanostructure film layer comprising:
(a) at least one population of nanostructures, wherein between about 10% and about 100% of the nanostructures in the at least one population of nanostructures comprise a functional group terminated poly(alkylene oxide) ligand bound to the nanostructures, provided that the functional group terminated poly(alkylene oxide) is not a thiol terminated poly(ethylene oxide); and
(b) at least one organic resin.

In some embodiments, the nanostructure film layer comprises between one and five populations of nanostructures. In some embodiments, the nanostructure film layer comprises one population of nanostructures.

In some embodiments, the at least one population of nanostructures contains a core selected from the group consisting of InP, InZnP, InGaP, CdSe, CdS, CdSSe, CdZnSe, CdZnS, ZnSe, ZnSSe, ZnTe, ZnTeSe, ZnTeSeS, InAs, InGaAs, and InAsP. In some embodiments, the nanostructures comprises a core of InP.

In some embodiments, the at least one population of nanostructures comprises as a weight percentage between about 0.0001% and about 5% of the total weight of the nanostructure film layer.

In some embodiments, the poly(alkylene oxide) ligand has the formula:

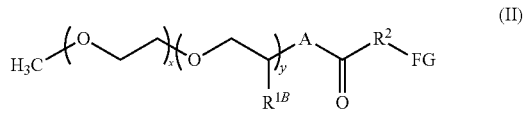

(II)

wherein:
x is 1 to 100;
y is 0 to 100;
A is —O— or —N—;
$R^{1B}$ is H or $C_{1-20}$ alkyl;
$R^2$ is $C_{1-20}$ alkyl;
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1B}$ is not H.

In some embodiments, x is 10 to 20. In some embodiments, y is 1 to 10. In some embodiments, $R^{1B}$ is —$CH_3$. In some embodiments, $R^2$ is —$CH_2CH_2$—.

In some embodiments, the poly(alkylene oxide) ligand has the formula:

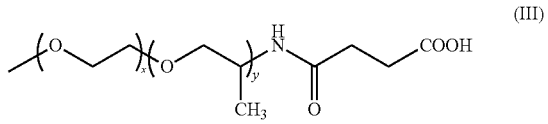

wherein:
x is 10 to 20; and
y is 1 to 10.

In some embodiments, x is 19 and y is 3.

In some embodiments, the nanostructure film layer comprises between one and five organic resins. In some embodiments, the nanostructure film layer comprises one organic resin.

In some embodiments, the at least one organic resin is a thermosetting resin or a UV curable resin. In some embodiments, the at least one organic resin is a UV curable resin. In some embodiments, the at least one organic resin is a mercapto-functional compound In some embodiments, the nanostructure film layer comprises at least one reactive diluent. In some embodiments, the at least one reactive diluent is isobornyl acrylate, 1,4-butanediol diacrylate, 1,6-hexanediol dimethacrylate, dipropylene glycol diacrylate, limonene dioxide, or dioxetanyl ether.

In some embodiments, the nanostructure film layer comprises as a weight percentage between 5% and 99% of the at least one organic resin.

In some embodiments, wherein between about 30% and about 100% of the nanostructures in at least one population of nanostructures comprise the poly(alkylene oxide) ligand bound to the nanostructures. In some embodiments, wherein between about 40% and about 100% of the nanostructures in at least one population of nanostructures comprise the poly(alkylene oxide) ligand bound to the nanostructures.

In some embodiments, the at least one population of nanostructures comprises at least one shell. In some embodiments, the at least one population of nanostructures comprises two shells. In some embodiments, the nanostructures are quantum dots. In some embodiments, the quantum dots are InP and/or CdSe quantum dots.

In some embodiments, the nanostructure composition further comprises at least one additional material selected from the group consisting of a hole transport material, an electron transport material, a processing additive, and combinations thereof.

In some embodiments, the nanostructure composition further comprises at least one hole transport material. In some embodiments, the nanostructure composition further comprises one hole transport material. In some embodiments, the nanostructure composition further comprises two hole transport materials.

In some embodiments, the nanostructure composition further comprises at least one hole transport material selected from the group consisting of an amine, a triarylamine, a thiophene, a carbazole, a phthalocyanine, a porphyrin, and combinations thereof.

In some embodiments, the nanostructure composition further comprises at least one hole transport material, wherein the at least one hole transport material is a triarylamine.

In some embodiments, the nanostructure composition further comprises at least one hole transport material, wherein the at least one hole transport material is poly[(9,9-dioctylfluorenyl-2,7-diyl)-co-(4,4'-(N-(4-sec-butylphenyl)diphenylamine)].

In some embodiments, the nanostructure composition further comprises at least one electron transport material. In some embodiments, the nanostructure composition further comprises one electron transport material. In some embodiments, the nanostructure composition further comprises two electron transport materials.

In some embodiments, the nanostructure composition further comprises at least one electron transport material selected from the group consisting of an imidazole, a pyridine, a pyrimidine, a pyridazine, a pyrazxine, an oxadiazole, a chinoline, a chinoxaline, an anthracene, a benzanthracene, a pyrene, a perylen, a benzimidazole, a triazine, a ketone, a phosphinoxide, a phenazine, a phenanthroline, a triarylborane, a metal oxide, and combinations thereof.

In some embodiments, the nanostructure composition further comprises at least one electron transport material, wherein the at least one electron transport material is a metal oxide.

In some embodiments, the nanostructure composition further comprises at least one electron transport material, wherein the at least one electron transport material is ZnMgO.

In some embodiments, the nanostructure composition further comprises at least one processing additive. In some embodiments, the nanostructure composition further comprises one processing additive. In some embodiments, the nanostructure composition further comprises two processing additives.

In some embodiments, the nanostructure composition further comprises at least one processing additive selected from the group consisting of selected from the group consisting of a surfactant, a viscosity modifier, a polymer additive, an organic salt, an inorganic salt, and combinations thereof.

In some embodiments, the nanostructure composition further comprises at least one solvent selected from the group consisting of dipropylene glycol monomethyl ether acetate, polyglycidyl methacrylate, diethylene glycol monoethyl ether acetate, propylene glycol methyl ether acetate, ethanol, methanol, 1-propanol, 2-propanol, acetone, methyl ethyl ketone, methyl isobutyl ketone, ethyl acetate, tetrahydrofuran, and combinations thereof.

In some embodiments, the nanostructure composition further comprises at least one solvent selected from the group consisting of ethanol and propylene glycol methyl ether acetate.

In some embodiments, x is 2 to 20 in the poly(alkylene oxide) ligand of formula (I).

In some embodiments, x is 1, y is 1, w is 1, $R^{1A}$ is H, $R^{1B}$ is H, $R^2$ is —$CH_2$—, $R_3$ is —$CH_3$, $R^4$ is —O—, and FG is —C(=O)OH in the poly(alkylene oxide) ligand of formula (I).

In some embodiments, x is 8, y is 0, w is 1, $R^{1A}$ is H, $R^{1B}$ is H, $R^2$ is —$CH_2$—, $R_3$ is —$CH_3$, $R^4$ is —O—, and FG is —C(=O)OH in the poly(alkylene oxide) ligand of formula (I).

In some embodiments, x is 23, y is 0, w is 1, $R^{1A}$ is H, $R^{1B}$ is H, $R^2$ is —$CH_2$—, $R_3$ is —$CH_3$, $R^4$ is —O—, and FG is —C(=O)OH in the poly(alkylene oxide) ligand of formula (I).

BRIEF DESCRIPTION OF THE DRAWINGS

The accompanying drawings, which are incorporated herein and form a part of the specification, illustrate the present disclosure and, together with the description, further serve to explain the principles of the disclosure and to enable a person skilled in the pertinent art to make and use the disclosure.

DETAILED DESCRIPTION OF THE INVENTION

Figure 1:
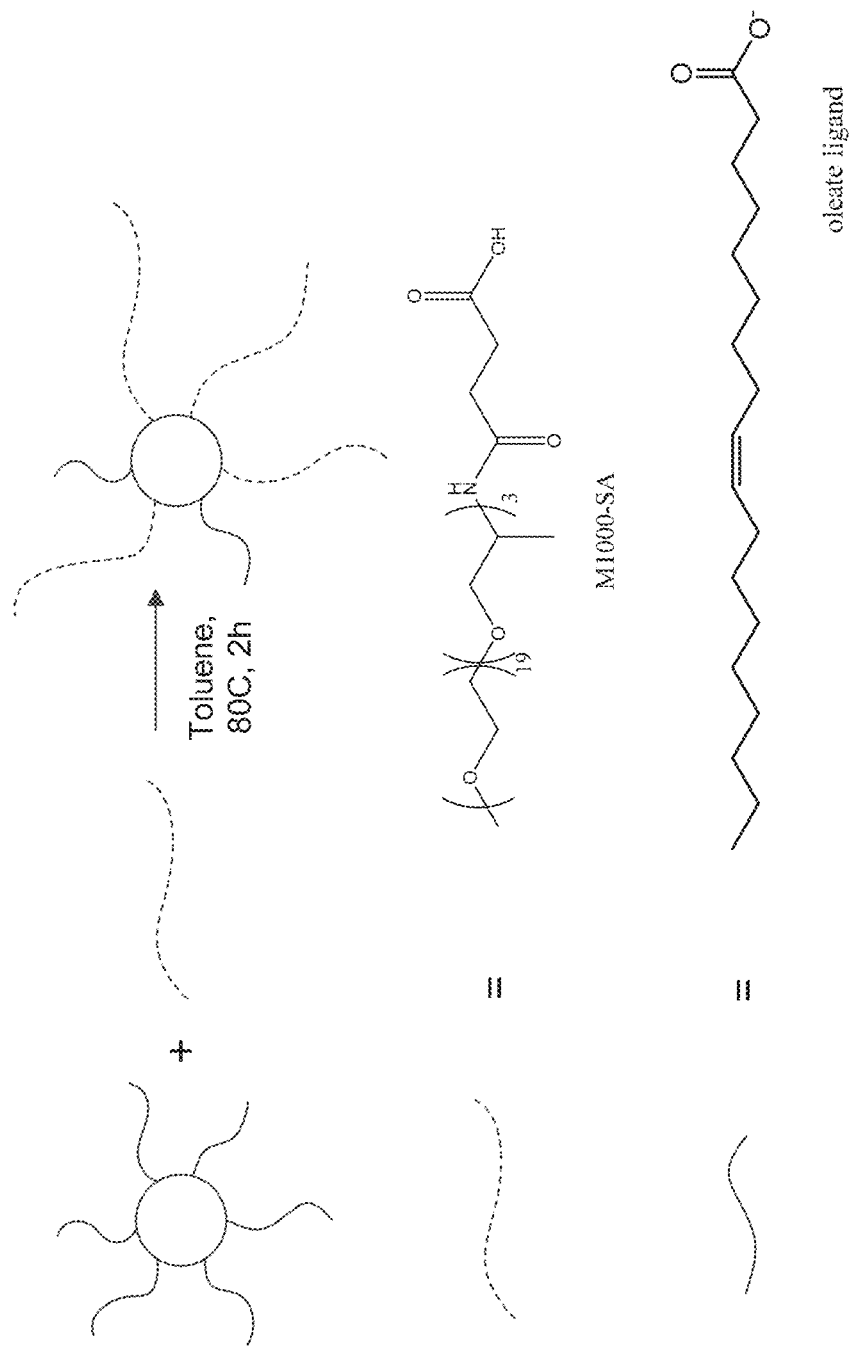
FIG. 1 illustrates a general ligand exchange process between hydrophobic ligands (such as oleate ligand) bound to an as-synthesized quantum dot and hydrophilic poly (alkylene oxide) ligands (such as M1000-SA).

Unless defined otherwise, all technical and scientific terms used herein have the same meaning as commonly understood by one of ordinary skill in the art to which the disclosure pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present disclosure, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by ±10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more faces of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "external quantum efficiency" (EQE) is a ratio of the number of photons emitted from a light emitting diode (LED) to the number of electrons passing through the device. The EQE measures how efficiently a LED converts electrons to photons and allows them to escape. EQE can be measured using the formula:

$$EQE = [\text{injection efficiency}] \times [\text{solid-state quantum yield}] \times [\text{extraction efficiency}]$$

where:
injection efficiency=the proportion of electrons passing through the device that are injected into the active region;
solid-state quantum yield=the proportion of all electron-hole recombinations in the active region that are radiative and thus, produce photons; and
extraction efficiency=the proportion of photons generated in the active region that escape from the device.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from transmission electron microscopy (TEM) images of nanocrystals before and after a shell synthesis.

The stability of a nanostructure composition can be determined by measuring the peak emission wavelength after admixing at least one population of nanostructure, at least one functional group terminated poly(alkylene oxide), and optionally at least one organic resin. The peak emission wavelength can be measured by irradiating a nanostructure composition with UV or blue (450 nm) light and measuring the output with a spectrometer. The emission spectrum is compared to the emission from the original nanostructure composition. A nanostructure composition is stable if the peak emission wavelength does not shift by more than 5 nm.

As used herein, the term "reactive diluent" refers to one or more monomers and/or one or more oligomers that are substantially non-reactive with nanostructures under conditions used to prepare and store a nanostructure composition, but are capable of undergoing a reaction to form a polymer and/or interpenetrating network. In some embodiments, the reactive diluent is capable of undergoing a radical polymerization reaction.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

"Alkyl" as used herein refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

"Alkenyl" as used herein refers to a monovalent group derived from a straight- or branched-chain hydrocarbon moiety having at least one carbon-carbon double bond by the removal of a single hydrogen atom. In some embodiments, the alkenyl group contains 2-20 carbon atoms and is a $C_{2-20}$ alkenyl. In some embodiments, the alkenyl group contains 2-15 carbon atoms and is a $C_{2-15}$ alkenyl. In some embodiments, the alkenyl group contains 2-10 carbon atoms and is a $C_{2-10}$ alkenyl. In some embodiments, the alkenyl group contains 2-8 carbon atoms and is a $C_{2-8}$ alkenyl. In some embodiments, the alkenyl group contains 2-5 carbons and is a $C_{2-5}$ alkenyl. Alkenyl groups include, for example, ethenyl, propenyl, butenyl, and 1-methyl-2-buten-1-yl.

"Alkynyl" as used herein refers to a monovalent group derived from a straight- or branched-chain hydrocarbon having at least one carbon-carbon triple bond by the removal of a single hydrogen atom. In some embodiments, the alkynyl group contains 2-20 carbon atoms and is a $C_{2-20}$ alkynyl. In some embodiments, the alkynyl group contains 2-15 carbon atoms and is a $C_{2-15}$ alkynyl. In some embodiments, the alkynyl group contains 2-10 carbon atoms and is a $C_{2-10}$ alkynyl. In some embodiments, the alkynyl group contains 2-8 carbon atoms and is a $C_{2-8}$ alkynyl. In some embodiments, the alkynyl group contains 2-5 carbons and is a $C_{2-5}$ alkynyl. Representative alkynyl groups include, but are not limited to, ethynyl, 2-propynyl (propargyl), and 1-propynyl.

"Alkylamino" as used herein, refers to a "substituted amino" of the formula ($-NR^{K}_{2}$), wherein $R^{K}$ is, independently, a hydrogen or an optionally substituted alkyl group, as defined herein, and the nitrogen moiety is directly attached to the parent molecule.

"Heteroalkyl" as used herein, refers to an alkyl moiety which is optionally substituted with one or more functional groups, and that contain one or more oxygen, sulfur, nitrogen, phosphorus, or silicon atoms, e.g., in place of carbon atoms.

"Cycloalkyl" as used herein, refers to a monovalent or divalent group of 3 to 8 carbon atoms, preferably 3 to 5 carbon atoms derived from a saturated cyclic hydrocarbon. Cycloalkyl groups can be monocyclic or polycyclic. Cycloalkyl can be substituted by $C_{1-3}$ alkyl groups or halogens.

"Amido" as used herein, refers to both "aminocarbonyl" and "carbonylamino." These terms when used alone or in connection with another group refers to an amido group such as $N(R^{L}R^{M})$—C(O)— or $R^{M}C(O)$—N($R^{L}$)— when used terminally and —C(O)—N($R^{L}$)— or —N($R^{M}$)—C(O)— when used internally, wherein each of $R^{L}$ and $R^{M}$ is independently hydrogen, alkyl, cycloaliphatic, (cycloaliphatic)aliphatic, aryl, araliphatic, heterocycloaliphatic, (heterocycloaliphatic) aliphatic, heteroaryl, carboxy, sulfanyl, sulfinyl, sulfonyl, (aliphatic)carbonyl, (cycloaliphatic)carbonyl, ((cycloaliphatic)aliphatic)carbonyl, arylcarbonyl, (araliphatic)carbonyl, (heterocycloaliphatic)carbonyl, ((heterocycloaliphatic) aliphatic)carbonyl, (heteroaryl)carbonyl, or (heteroarylaliphatic)carbonyl, each of which being defined herein and being optionally substituted. Examples of amino groups include alkylamino, dialkylamino, or arylamino. Examples of amido groups include alkylamido (such as alkylcarbonylamino or alkylcarbonylamino), (heterocycloaliphatic) amido, (heteroaralkyl)amido, (heteroaryl)amido, (heterocycloalkyl)alkylamido, arylamido, aralkylamido, (cycloalkyl) alkylamido, or cycloalkylamido.

"Carboxyalkyl" as used herein, refers to a carboxylic acid group (—COOH) appended to a lower alkyl radical.

"Heterocycloalkyl" as used herein, refers to cycloalkyl substituents that have from 1 to 5, and more typically from 1 to 4 heteroatoms in the ring structure. Suitable heteroatoms employed in compounds of the present disclosure are nitrogen, oxygen, and sulfur. Representative heterocycloalkyl moieties include, for example, morpholino, piperazinyl, piperidinyl, and the like.

The term "alkylene," as used herein, alone or in combination, refers to a saturated aliphatic group derived from a straight or branched chain saturated hydrocarbon attached at two or more positions, such as methylene (—CH₂—). Unless otherwise specified, the term "alkyl" may include "alkylene" groups.

"Aryl" as used herein refers to unsubstituted monocyclic or bicyclic aromatic ring systems having from six to fourteen carbon atoms, i.e., a $C_{6-14}$ aryl. Non-limiting exemplary aryl groups include phenyl, naphthyl, phenanthryl, anthracyl, indenyl, azulenyl, biphenyl, biphenylenyl, and fluorenyl groups. In one embodiment, the aryl group is a phenyl or naphthyl.

"Heteroaryl" or "heteroaromatic" as used herein refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen and sulfur. In one embodiment, the heteroaryl contains 1, 2, 3, or 4 heteroatoms independently selected from the group consisting of oxygen, nitrogen and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

Unless clearly indicated otherwise, ranges listed herein are inclusive.

A variety of additional terms are defined or otherwise characterized herein.

Nanostructure Composition

In some embodiments, the present disclosure provides a nanostructure composition comprising:
(a) at least one population of nanostructures; and
(b) at least one poly(alkylene oxide) ligand bound to the surface of the nanostructures, wherein the poly(alkylene oxide) ligand comprises a functional group terminated poly(alkylene oxide), provided that the functional group terminated poly(alkylene oxide) is not a thiol-terminated poly(ethylene oxide).

In some embodiments, the functional group terminated poly(alkylene oxide) comprises a random copolymer of ethylene oxide and propylene oxide, a poly(ethylene oxide)-poly(propylene oxide) diblock copolymer, a poly(ethylene oxide)-polypropylene oxide)-poly(ethylene oxide) triblock copolymer, a polypropylene oxide)-poly(ethylene oxide)-poly(propylene oxide) triblock copolymer, or combinations thereof, provided that the functional group terminated poly (alkylene oxide) is not a thiol terminated poly(ethylene oxide).

In some embodiments, the nanostructure is a quantum dot.

In some embodiments, the present disclosure provides a nanostructure composition comprising:
(a) at least one population of nanostructures; and
(b) at least one poly(alkylene oxide) ligand bound to the surface of the nanostructures, the poly(alkylene oxide) ligand having the formula:

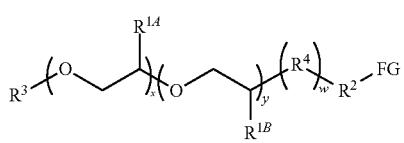

(I)

wherein:
x is 1 to 100;
y is 0 to 100;
w is 0 or 1;
$R^{1A}$ and $R^{1B}$ independently are H or $C_{1-20}$ alkyl;
$R^2$ is $C_{1-20}$ alkyl;
$R^3$ is H, $C_{1-20}$ alkyl, $C_{3-8}$ cycloalkyl, or $C_{6-14}$ aryl;
$R^4$ is —O—, —OC(=O)—, amido, or $C_{1-20}$ alkyl; and
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1A}$ and $R^{1B}$ cannot both be H.

In some embodiments, the nanostructure is a quantum dot.

In some embodiments, the present disclosure provides a nanostructure composition comprising:
(a) at least one population of nanostructures; and
(b) at least one poly(alkylene oxide) ligand bound to the surface of the nanostructures, the poly(alkylene oxide) ligand having the formula:

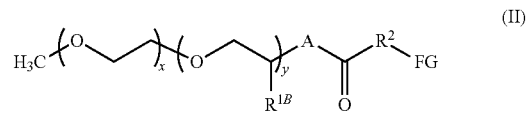

(II)

wherein:
x is 1 to 100;
y is 0 to 100;
A is —O— or —N—;
$R^{1B}$ is H or $C_{1-20}$ alkyl;
$R^2$ is $C_{1-20}$ alkyl;
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided that when FG is —SH, $R^{1B}$ is not H.

In some embodiments, $R^{1B}$ is —CH$_3$.

In some embodiments, the nanostructure is a quantum dot.

In some embodiments, the present disclosure provides a nanostructure compositing comprising:
(a) at least one population of nanostructures; and
(b) at least one poly(alkylene oxide) ligand bound to the surface of the nanostructures, the poly(alkylene oxide) ligand having the formula:

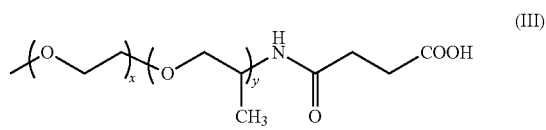

(III)

wherein:
x is 1 to 100; and
y is 1 to 100.

In some embodiments, x is 19 and y is 3,

In some embodiments, the nanostructure is a quantum dot.

In some embodiments, the present disclosure provides a nanostructure composition comprising:
(a) at least one population of nanostructures; and
(b) at least one poly(alkylene oxide) ligand bound to the surface of the nanostructures, the poly(alkylene oxide) ligand having the formula:

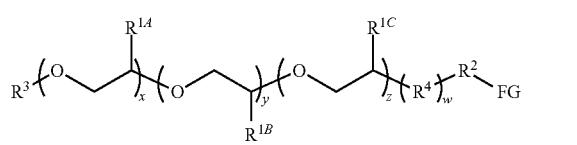

(IV)

wherein:
x is 1 to 100;
y is 0 to 100;
z is 1 to 100;
w is 0 or 1;
$R^{1A}$, $R^{1B}$, and $R^{1C}$ independently are H or $C_{1-20}$ alkyl;

$R^2$ is $C_{1-20}$ alkyl;
$R^3$ is H, $C_{1-20}$ alkyl, $C_{3-8}$ cycloalkyl, or $C_{6-14}$ aryl;
$R^4$ is —O—, —OC(=O)—, amido, or $C_{1-20}$ alkyl;
FG is —OH, —SH, —NH$_2$, —C(=O)OH, —P(=O)(OH)$_2$, —N$_3$, or —Si(OR$^{1V}$)$_3$; and
each $R^{1V}$ is independently H or $C_{1-20}$ alkyl,
provided when FG is —SH, $R^{1A}$, $R^{1B}$, and $R^{1C}$ cannot all be H.

In some embodiments, $R^{1A}$ is H, $R^{1B}$ is —CH$_3$, and $R^{1C}$ is H.

In some embodiments, $R^{1A}$ is —CH$_3$, $R^{1B}$ is H, and $R^{1C}$ is —CH$_3$.

In some embodiments, the nanostructure is a quantum dot.

In some embodiments, the present disclosure provides a nanostructure composition comprising:
(a) at least one population of nanostructures, wherein between about 10% and about 100% of the nanostructures in the at least one population of nanostructures comprise a functional group terminated poly(alkylene oxide) ligand bound to the nanostructures, provided that the functional group terminated poly(alkylene oxide) is not a thiol terminated poly(ethylene oxide); and
(b) at least one organic resin.

In some embodiments, the nanostructure composition further comprises at least one reactive diluent.

In some embodiments, the nanostructure composition further comprises a solvent.

In some embodiments, the nanostructure is a quantum dot.

In some embodiments, the present disclosure provides a nanostructure film kit comprising:
(a) a first composition comprising at least one population of nanostructures, wherein between about 10% and about 100% of the nanostructures in the at least one population of nanostructures comprise a functional group terminated poly(alkylene oxide) ligand bound to the nanostructures, provided that the functional group terminated poly(alkylene oxide) is not a thiol terminated poly(ethylene oxide);
(b) a second composition comprising at least one organic resin; and
(d) instructions for preparing a nanostructure film.

In some embodiments, the nanostructure film kit further comprises at least one reactive diluent.

In some embodiments, the nanostructure film kit further comprises a solvent.

In some embodiments, the nanostructure is a quantum dot.

Nanostructure Film Layer

In some embodiments, the present disclosure provides a nanostructure film layer comprising:
(a) at least one population of nanostructures, wherein between about 10% and about 100% of the nanostructures in the population of nanostructure comprise a functional group terminated poly(alkylene oxide) ligand bound to the nanostructures, provided that the functional group terminated poly(alkylene oxide) is not a thiol terminated poly(ethylene oxide); and
(b) at least one organic resin.

In some embodiments, the nanostructure film layer further comprises at least one reactive diluent.

In some embodiments, the nanostructure is a quantum dot.

Nanostructure Molded Article

In some embodiments, the present disclosure provides a nanostructure molded article comprising:
(a) at least one population of nanostructures, wherein between about 10% and about 100% of the nanostructures in the at least one population of nanostructures comprise a functional group terminated poly(alkylene oxide) ligand bound to the nanostructures, provided that the functional group terminated poly(alkylene oxide) is not a thiol terminated poly(ethylene oxide); and
(b) at least one organic resin.

In some embodiments, the molded article is a film, a substrate for a display, or a light emitting diode.

In some embodiments, the nanostructure is a quantum dot.

In some embodiments, the present disclosure provides a nanostructure film comprising:
(a) a first barrier layer;
(b) a second barrier layer; and
(c) a nanostructure layer between the first barrier layer and the second barrier layer, wherein the nanostructure layer comprises at least one population of nanostructures, wherein between about 10% and about 100% of the nanostructures in the at least one population of nanostructures comprise a functional group terminated poly(alkylene oxide) ligand bound to the nanostructures, provided that the functional group terminated poly(alkylene oxide) is not a thiol terminated poly (ethylene oxide); and at least one organic resin.

In some embodiments, the nanostructure is a quantum dot.

Quantum Dots

The quantum dots (or other nanostructures) for use in the present disclosure can be produced from any suitable material, suitably an inorganic material, and more suitably an inorganic conductive or semiconductive material. Suitable semiconductor materials include any type of semiconductor, including Group II-VI, Group III-V, Group IV-VI, and Group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, ZnO, ZnS, ZnSe, ZnTeSe, ZnTeSeS, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, Si$_3$N$_4$, Ge$_3$N$_4$, Al$_2$O$_3$, Al$_2$CO, and combinations thereof.

The synthesis of Group II-VI nanostructures has been described in U.S. Pat. Nos. 6,225,198, 6,322,901, 6,207,229, 6,607,829, 6,861,155, 7,060,243, 7,125,605, 7,374,824, 7,566,476, 8,101,234, and 8,158,193 and in U.S. Patent Appl. Publication Nos. 2011/0262752 and 2011/0263062. In some embodiments, the core is a Group II-VI nanocrystal selected from the group consisting of ZnO, ZnSe, ZnS, ZnTe, ZnTeSe, ZnTeSeS, CdO, CdSe, CdS, CdTe, HgO, HgSe, HgS, and HgTe. In some embodiments, the core is a nanocrystal selected from the group consisting of ZnSe, ZnTe, ZnTeSe, ZnTeSeS, ZnS, CdSe, or CdS.

Although Group II-VI nanostructures such as CdSe and CdS quantum dots can exhibit desirable luminescence behavior, issues such as the toxicity of cadmium limit the applications for which such nanostructures can be used. Less toxic alternatives with favorable luminescence properties are thus highly desirable. Group III-V nanostructures in general and InP-based nanostructures in particular, offer the best known substitute for cadmium-based materials due to their compatible emission range.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures of the present disclosure is limited by the trace metal concentration in the precursor materials. The trace metal (including cadmium) concentration in the precursor materials for the Cd-free nanostructures, can be measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the core is a Group III-V nanostructure. In some embodiments, the core is a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core is a InP nanocrystal.

The synthesis of Group III-V nanostructures has been described in U.S. Pat. Nos. 5,505,928, 6,306,736, 6,576,291, 6,788,453, 6,821,337, 7,138,098, 7,557,028, 7,645,397, 8,062,967, and 8,282,412 and in U.S. Patent Appl. Publication No. 2015/236195. Synthesis of Group III-V nanostructures has also been described in Wells, R. L., et al., "The use of tris(trimethylsilyl)arsine to prepare gallium arsenide and indium arsenide," *Chem. Mater.* 1:4-6 (1989) and in Guzelian, A. A., et al., "Colloidal chemical synthesis and characterization of InAs nanocrystal quantum dots," *Appl. Phys. Lett.* 69: 1432-1434 (1996).

Synthesis of InP-based nanostructures has been described, e.g., in Xie, R., et al., "Colloidal InP nanocrystals as efficient emitters covering blue to near-infrared," *J. Am. Chem. Soc.* 129:15432-15433 (2007); Micic, O. I., et al., "Core-shell quantum dots of lattice-matched ZnCdSe$_2$ shells on InP cores: Experiment and theory," *J. Phys. Chem. B* 104:12149-12156 (2000); Liu, Z., et al., "Coreduction colloidal synthesis of III-V nanocrystals: The case of InP," *Angew. Chem. Int. Ed. Engl.* 47:3540-3542 (2008); Li, L. et al., "Economic synthesis of high quality InP nanocrystals using calcium phosphide as the phosphorus precursor," *Chem. Mater.* 20:2621-2623 (2008); D. Battaglia and X. Peng, "Formation of high quality InP and InAs nanocrystals in a noncoordinating solvent," *Nano Letters* 2:1027-1030 (2002); Kim, S., et al., "Highly luminescent InP/GaP/ZnS nanocrystals and their application to white light-emitting diodes," *J. Am. Chem. Soc.* 134:3804-3809 (2012); Nann, T., et al., "Water splitting by visible light: A nanophotocathode for hydrogen production," *Angew. Chem. Int. Ed.* 49:1574-1577 (2010); Borchert, H., et al., "Investigation of ZnS passivated InP nanocrystals by XPS," *Nano Letters* 2:151-154 (2002); L. Li and P. Reiss, "One-pot synthesis of highly luminescent InP/ZnS nanocrystals without precursor injection," *J. Am. Chem. Soc.* 130:11588-11589 (2008); Hussain, S., et al. "One-pot fabrication of high-quality InP/ZnS (core/shell) quantum dots and their application to cellular imaging," *Chemphyschem.* 10:1466-1470 (2009); Xu, S., et al., "Rapid synthesis of high-quality InP nanocrystals," *J. Am. Chem. Soc.* 128:1054-1055 (2006); Micic, O. I., et al., "Size-dependent spectroscopy of InP quantum dots," *J. Phys. Chem. B* 101:4904-4912 (1997); Haubold, S., et al., "Strongly luminescent InP/ZnS core-shell nanoparticles," *Chemphyschem.* 5:331-334 (2001); CrosGagneux, A., et al., "Surface chemistry of InP quantum dots: A comprehensive study," *J. Am. Chem. Soc.* 132:18147-18157 (2010); Micic, O. I., et al., "Synthesis and characterization of InP, GaP, and GaInP$_2$ quantum dots," *J. Phys. Chem.* 99:7754-7759 (1995); Guzelian, A. A., et al., "Synthesis of size-selected, surface-passivated InP nanocrystals," *J. Phys. Chem.* 100: 7212-7219 (1996); Lucey, D. W., et al., "Monodispersed InP quantum dots prepared by colloidal chemistry in a non-coordinating solvent," *Chem. Mater.* 17:3754-3762 (2005); Lim, J., et al., "InP@ZnSeS, core@composition gradient shell quantum dots with enhanced stability," *Chem. Mater.* 23:4459-4463 (2011); and Zan, F., et al., "Experimental studies on blinking behavior of single InP/ZnS quantum dots: Effects of synthetic conditions and UV irradiation," *J. Phys. Chem. C* 116:394-3950 (2012).

In some embodiments, the core is doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, CuInS$_2$, CuInSe$_2$, AlN, AlP, AlAs, GaN, GaP, or GaAs.

Inorganic shell coatings on nanostructures are a universal approach to tailoring their electronic structure. Additionally, deposition of an inorganic shell can produce more robust particles by passivation of surface defects. Ziegler, J., et al., *Adv. Mater.* 20:4068-4073 (2008). For example, shells of wider band gap semiconductor materials such as ZnS can be deposited on a core with a narrower band gap—such as CdSe or InP—to afford structures in which excitons are confined within the core. This approach increases the probability of radiative recombination and makes it possible to synthesize very efficient quantum dots with quantum yields close to unity and thin shell coatings.

In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

In some embodiments, the nanostructures of the present disclosure include a core and at least one shell. In some embodiments, the nanostructures of the present disclosure include a core and at least two shells. The shell can, e.g., increase the quantum yield and/or stability of the nanostructures. In some embodiments, the core and the shell comprise different materials. In some embodiments, the nanostructure comprises shells of different shell material.

Exemplary materials for preparing shells include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, Si$_3$N$_4$, Ge$_3$N$_4$, Al$_2$O$_3$, Al$_2$CO, and combinations thereof.

In some embodiments, the shell is a mixture of at least two of a zinc source, a selenium source, a sulfur source, a tellurium source, and a cadmium source. In some embodiments, the shell is a mixture of two of a zinc source, a selenium source, a sulfur source, a tellurium source, and a cadmium source. In some embodiments, the shell is a mixture of three of a zinc source, a selenium source, a sulfur source, a tellurium source, and a cadmium source. In some embodiments, the shell is a mixture of: zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium and zinc; cadmium, zinc, and sulfur; cadmium, zinc, and selenium; or cadmium, zinc, sulfur, and selenium. In some embodiments, the shell is a mixture of zinc and selenium. In some embodiments, the shell is a mixture of zinc and sulfur.

Exemplary core/shell luminescent nanocrystals for use in the practice of the present disclosure include, but are not limited to (represented as core/shell) CdSe/ZnS, InP/ZnS, PbSe/PbS, CdSe/CdS, CdTe/CdS, and CdTe/ZnS. In some embodiments, the core/shell luminescent nanocrystal is ZnSe/ZnS. The synthesis of core/shell nanostructures is disclosed in U.S. Pat. No. 9,169,435.

In some embodiments, the nanostructures include a core and at least two shells. In some embodiments, one shell is a mixture of zinc and selenium and one shell is a mixture of zinc and sulfur. In some embodiments, the core/shell/shell nanostructure is InP/ZnSe/ZnS.

The luminescent nanocrystals can be made from a material impervious to oxygen, thereby simplifying oxygen barrier requirements and photostabilization of the quantum dots in the quantum dot film layer. In exemplary embodiments, the luminescent nanocrystals are coated with one or more organic polymeric ligand material and dispersed in an organic polymeric matrix comprising one or more matrix materials, as discussed in more detail below. The luminescent nanocrystals can be further coated with one or more inorganic layers comprising one or more material such as a silicon oxide, an aluminum oxide, or a titanium oxide (e.g., $SiO_2$, $Si_2O_3$, $TiO_2$, or $Al_2O_3$), to hermetically seal the quantum dots.

In some embodiments, the population of nanostructures emits red, green, or blue light. In some embodiments, the respective portions of red, green, and blue light can be controlled to achieve a desired white point for the white light emitted by a display device incorporating a nanostructure film.

In some embodiments, the nanostructure composition comprises at least one population of nanostructure material. In some embodiments, the nanostructure composition comprises a population of between 1 and 5, between 1 and 4, between 1 and 3, between 1 and 2, between 2 and 5, between 2 and 4, between 2 and 3, between 3 and 5, between 3 and 4, or between 4 and 5 nanostructure materials. Any suitable ratio of the populations of nanostructures can be combined to create the desired nanostructure composition characteristics.

In some embodiments, the weight percentage of the population of nanostructures in the nanostructure composition is between about 0.0001% and about 5%, about 0.0001% and about 4%, about 0.0001% and about 3%, about 0.0001% and about 2%, about 0.0001% and about 1%, about 0.0001% and about 0.5%, about 0.0001% and about 0.1%, about 0.0001% and 0.01%, about 0.0001% and about 0.001% and about 5%, about 0.001% and about 4%, about 0.001% and about 3%, about 0.001% and about 2%, about 0.001% and about 1%, about 0.001% and about 0.5%, about 0.001% and about 0.1%, about 0.001% and 0.01%, about 0.01% and about 5%, about 0.01% and about 4%, about 0.01% and about 3%, about 0.01% and about 2%, about 0.01% and about 1%, about 0.01% and about 0.5%, about 0.01% and about 0.1%, about 0.1% and about 5%, about 0.1% and about 4%, about 0.1% and about 3%, about 0.1% and about 2%, about 0.1% and about 1%, about 0.1% and about 0.5%, about 0.5% and about 5%, about 0.5% and about 4%, about 0.5% and about 3%, about 0.5% and about 2%, about 0.5% and about 1%, about 1% and about 5%, about 1% and about 4%, about 1% and about 3%, or about 1% and about 2%. In some embodiments, the nanostructure is a quantum dot.

In some embodiments, the weight percent of the population of nanostructures in the nanostructure molded article is between about 0.0001% and about 5%, about 0.0001% and about 4%, about 0.0001% and about 3%, about 0.0001% and about 2%, about 0.0001% and about 1%, about 0.0001% and about 0.5%, about 0.0001% and about 0.1%, about 0.0001% and 0.01%, about 0.0001% and about 0.001%, about 0.001% and about 5%, about 0.001% and about 4%, about 0.001% and about 3%, about 0.001% and about 2%, about 0.001% and about 1%, about 0.001% and about 0.5%, about 0.001% and about 0.1%, about 0.001% and 0.01%, about 0.01% and about 5%, about 0.01% and about 4%, about 0.01% and about 3%, about 0.01% and about 2%, about 0.01% and about 1%, about 0.01% and about 0.5%, about 0.01% and about 0.1%, about 0.1% and about 5%, about 0.1% and about 4%, about 0.1% and about 3%, about 0.1% and about 2%, about 0.1% and about 1%, about 0.1% and about 0.5%, about 0.5% and about 5%, about 0.5% and about 4%, about 0.5% and about 3%, about 0.5% and about 2%, about 0.5% and about 1%, about 1% and about 5%, about 1% and about 4%, about 1% and about 3%, or about 1% and about 2%. In some embodiments, the nanostructure is a quantum dot.

First Ligands

In some embodiments, the nanostructures comprise first ligands bound to their surface. In some embodiments, the nanostructures include a coating layer comprising first ligands to protect the quantum dots from external moisture and oxidation, to control aggregation, and to allow for dispersion of the nanostructures in the matrix material. Suitable first ligands include those disclosed in U.S. Pat. Nos. 6,949,206; 7,267,875; 7,374,807; 7,572,393; 7,645,397; and 8,563,133 and in U.S. Patent Appl. Publication Nos. 2008/237540; 2008/281010; and 2010/110728.

In some embodiments, the nanostructure comprises a multi-part ligand structure, such as the three-part ligand structure disclosed in U.S. Patent Appl. Publication No. 2008/237540, in which the head-group, tail-group, and middle/body group are independently fabricated and optimized for their particular function, and then combined into an ideally functioning complete surface ligand.

In some embodiments, the first ligands comprise one or more organic polymeric ligands. Suitable ligands provide: efficient and strong bonding quantum dot encapsulation with low oxygen permeability; precipitate or segregate into domain in the matrix material to form a discontinuous dual-phase or multi-phase matrix; disperse favorably throughout the matrix material; and are commercially available materials or can be easily formulated from commercially available materials.

In some embodiments, the first ligand is a polymer, a glassy polymer, a silicone, a carboxylic acid, a dicarboxylic acid, a polycarboxylic acid, an acrylic acid, a phosphonic acid, a phosphonate, a phosphine, a phosphine oxide, a sulfur, or an amine.

In some embodiments, the first ligand comprises a long alkyl chain. In some embodiments, the first ligand is an alkyl carboxylic acid. In some embodiments, the first ligand is an oleate ligand. In some embodiments, the first ligand is an alkylphosphine. In some embodiments, the first ligand is an alkyl phosphine oxide. In some embodiments, the first ligand is trihexylphosphine oxide, trioctylphosphine oxide (TOPO), or tridecylphosphine oxide.

Poly(alkylene oxide) Ligands

Ligands employed in the stabilization of nanostructures generally belong to either the group of neutral L-type ligands, which bind to cations and anions of the crystal and X-type ligands, which selectively bind to the cationic component. L-type ligands donate their lone pair to a surface metal atom, thus establishing a dative (coordinate covalent) bond. Examples of L-type ligands are amines, thiols, phosphines, and phosphine oxides. X-type ligands are typically monovalent atoms that bind positively charged sites at the quantum dot surface. Examples of X-type ligands are carboxylates, phosphonates, and thiolates.

In some embodiments, a poly(alkylene oxide) ligand comprises a poly(alkylene oxide) backbone. In some embodiments, the poly(alkylene oxide) ligand comprises at least one functional group attached to the poly(alkylene oxide) backbone. In some embodiments, the at least one functional group can bind to II-VI nanocrystal surfaces as a neutral L-type binding ligand (e.g., R—COOH). In some embodiments, the at least one functional group can bind to II-VI nanocrystal surfaces as an electron donating X-type ligand (e.g., R—COO$^-$).

In some embodiments, the poly(alkylene oxide) ligand has at least one functional group. In some embodiments, the at least one functional group is —OH, —NH$_2$, —C(=O)OH, —P(=O)(OH)$_2$, —N$_3$, or —Si(OR$^{1V}$)$_3$.

In some embodiments, the poly(alkylene oxide) ligand is a mixture of a functional group terminated poly(alkylene oxide), a copolymer of alkylene oxides, and combinations thereof. In some embodiments, the functional group terminated poly(alkylene oxide) comprises a copolymer of alkylene oxides. In some embodiments, the copolymer is a random copolymer or a block copolymer. In some embodiments, the block copolymer is a diblock copolymer or a triblock copolymer. In some embodiments, the copolymer is based on a propylene oxide (PO), an ethylene oxide (EO), or a mixture of PO and EO. In some embodiments, the copolymer is a mixture of PO and EO.

In some embodiments, the poly(alkylene oxide) ligand comprises a random copolymer of ethylene oxide and propylene oxide, a poly(ethylene oxide)-poly(propylene oxide) diblock copolymer, a poly(ethylene oxide)-poly(propylene oxide)-poly(ethylene oxide) triblock copolymer, a poly(propylene oxide)-poly(ethylene oxide)-poly(propylene oxide) triblock copolymer, or combinations thereof.

In some embodiments, the poly(alkylene oxide) ligand comprises a copolymer of PO and EO. In some embodiments, the ratio of ethylene oxide groups to propylene oxide groups is sufficiently high so that the poly(alkylene oxide) ligand has a high degree of hydrophilicity. In some embodiments, the ratio of ethylene oxide groups to propylene oxide groups is low enough that the ligand has the desired resiliency. In some embodiments, the ratio of ethylene oxide groups:propylene oxide groups is between about 15:1 and about 1:15, about 15:1 and about 1:10, about 15:1 and 1:5, about 10:1 and 1:15, about 10:1 and 1:10, about 10:1 and 1:5, about 5:1 and 1:15, about 5:1 and 1:10, or about 5:1 and 1:5.

In some embodiments, the poly(alkylene oxide) ligand has the structure of Formula I:

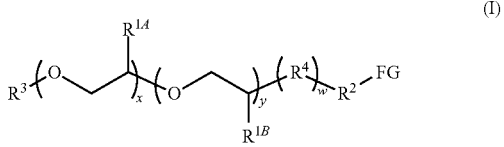

wherein:
x is 1 to 100;
y is 0 to 100;
w is 0 or 1;
R$^{1A}$ and R$^{1B}$ independently are H or C$_{1-20}$ alkyl;
R$^2$ is C$_{1-20}$ alkyl;
R$^3$ is H, C$_{1-20}$ alkyl, C$_{3-8}$ cycloalkyl, or C$_{6-14}$ aryl;
R$^4$ is —O—, —OC(=O)—, amido, or C$_{1-20}$ alkyl; and
FG is —OH, —SH, —NH$_2$, —C(=O)OH, —P(=O)(OH)$_2$, —N$_3$, or —Si(OR$^{1V}$)$_3$; and
each R$^{1V}$ is independently H or C$_{1-20}$ alkyl,
provided that when FG is —SH, R$^{1A}$ and R$^{1B}$ cannot both be H.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20. In some embodiments, x is 19.

The values for x are to be understood as modified by the word "about." Therefore, a value of x=1 is understood to mean x=1±0.1. For example a value of x=1 is understood to mean 0.9 to 1.1.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10. In some embodiments, y is 3.

The values for y are to be understood as modified by the word "about." Therefore, a value of y=1 is understood to mean y=1±0.1. For example a value of y=1 is understood to mean 0.9 to 1.1.

In some embodiments, the ratio of x to y is between about 15:1 and about 1:15, about 15:1 and about 1:10, about 15:1 and about 1:5, about 10:1 and 1:15, about 10:1 and 1:10, about 10:1 and 1:5, about 5:1 and 1:15, about 5:1 and 1:10, or about 5:1 and 1:5. In some embodiments, the ratio of x to y is about 19:3.

In some embodiments, w is 1. In some embodiments, w is 0.

In some embodiments, R$^{1A}$ is H. In some embodiments, R$^{1A}$ is C$_{1-20}$ alkyl. In some embodiments, R$^{1A}$ is C$_{1-10}$ alkyl. In some embodiments, R$^{1A}$ is C$_{1-5}$ alkyl. In some embodiments, R$^{1A}$ is —CH$_3$.

In some embodiments, R$^{1B}$ is H. In some embodiments, R$^{1B}$ is C$_{1-20}$ alkyl. In some embodiments, R$^{1B}$ is C$_{1-10}$ alkyl. In some embodiments, R$^{1B}$ is C$_{1-5}$ alkyl. In some embodiments, R$^{1B}$ is —CH$_3$.

In some embodiments, R$^{1A}$ is H and R$^{1B}$ is —CH$_3$. In some embodiments, R$^{1A}$ is —CH$_3$ and R$^{1B}$ is H. In some embodiments, R$^{1A}$ is H and R$^{1B}$ is H. In some embodiments, R$^{1A}$ is —CH$_3$ and R$^{1B}$ is —CH$_3$.

In some embodiments, R$^2$ is C$_{1-20}$ alkyl. In some embodiments, R$^2$ is C$_{1-10}$ alkyl. In some embodiments, R$^2$ is C$_{1-5}$ alkyl. In some embodiments, R$^2$ is —CH$_2$CH$_2$—.

In some embodiments, $R^3$ is $C_{1-20}$ alkyl. In some embodiments, $R^3$ is $C_{1-10}$ alkyl. In some embodiments, $R^3$ is $C_{1-5}$ alkyl. In some embodiments, $R^3$ is —$CH_3$. In some embodiments, $R^3$ is $C_{3-8}$ cycloalkyl. In some embodiments, $R^3$ is $C_{6-14}$ aryl. In some embodiments, $R^3$ is phenyl, naphthyl, phenanthryl, anthracyl, indenyl, azulenyl, biphenyl, biphenylenyl, or fluorenyl.

In some embodiments, $R^4$ is —O—. In some embodiments, $R^4$ is —OC(=O)—. In some embodiments, $R^4$ is amido. In some embodiments, $R^4$ is —NHC(=O)—. In some embodiments, $R^4$ is $C_{1-20}$ alkyl. In some embodiments, $R^4$ is $C_{1-10}$ alkyl. In some embodiments, $R^4$ is $C_{1-5}$ alkyl. In some embodiments, $R^4$ is —$CH_2$—.

In some embodiments, FG is —OH. In some embodiments, FG is —$NH_2$. In some embodiments, FG is —C(=O)OH. In some embodiments, FG is —P(=O)(OH)$_2$. In some embodiments, FG is —$N_3$. In some embodiments, FG is —Si(OR$^{1V}$)$_3$. In some embodiments, FG is —Si(OH)$_3$. In some embodiments, FG is —Si(OCH$_3$)$_3$. In some embodiments, FG is —Si(OCH$_2$CH$_3$)$_3$.

In some embodiments, wherein w is 1, $R^{1A}$ is H, $R^3$ is —$CH_3$, and $R^4$ is —OC(=O)— or —NHC(=O)— in Formula I, the poly(alkylene oxide) ligand has the structure of Formula II:

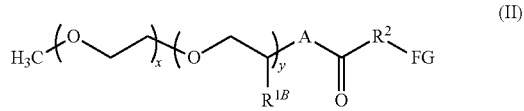

(II)

wherein:
x is 1 to 100;
y is 0 to 100;
A is —O— or —N—;
$R^{1B}$ is H or $C_{1-20}$ alkyl;
$R^2$ is $C_{1-20}$ alkyl;
FG is —OH, —SH, —$NH_2$, —C(=O)OH, —P(=O)(OH)$_2$, —$N_3$, or —Si(OR$^{1V}$)$_3$; and
each $R^{1V}$ is independently H or $C_{1-20}$ alkyl,
provided that when FG is —SH, $R^{1B}$ is not H.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20. In some embodiments, x is 19.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10. In some embodiments, y is 3.

In some embodiments, the ratio of x to y is between about 15:1 and about 1:15, about 15:1 and about 1:10, about 15:1 and about 1:5, about 10:1 and 1:15, about 10:1 and 1:10, about 10:1 and 1:5, about 5:1 and 1:15, about 5:1 and 1:10, or about 5:1 and 1:5. In some embodiments, the ratio of x to y is about 19:3.

In some embodiments, A is —O—. In some embodiments, A is —N—.

In some embodiments, $R^{1B}$ is H. In some embodiments, $R^{1B}$ is $C_{1-20}$ alkyl. In some embodiments, $R^{1B}$ is $C_{1-10}$ alkyl. In some embodiments, $R^{1B}$ is $C_{1-5}$ alkyl. In some embodiments, $R^{1B}$ is —$CH_3$.

In some embodiments, $R^2$ is $C_{1-20}$ alkyl. In some embodiments, $R^2$ is $C_{1-10}$ alkyl. In some embodiments, $R^2$ is $C_{1-5}$ alkyl. In some embodiments, $R^2$ is —$CH_2CH_2$—.

In some embodiments, wherein $R^{1B}$ is —$CH_3$, A is —NH—, $R^2$ is —$CH_2CH_2$—, and FG is —C(=O)OH in Formula II, the poly(alkylene oxide) ligand has the structure of Formula III:

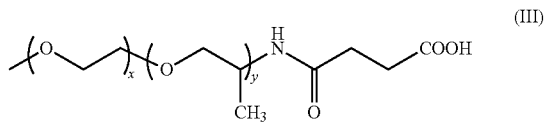

(III)

wherein:
x is 1 to 100; and
y is 1 to 100.

In some embodiments, x is 1 and y is 9. In some embodiments, x is 19 and y is 3. In some embodiments, x is 6 and y is 29. In some embodiments, x is 31 and y is 10.

In some embodiments, the poly(alkylene oxide) ligand is prepared from an amine-terminated polymer by the reaction shown in SCHEME 1.

SCHEME 1

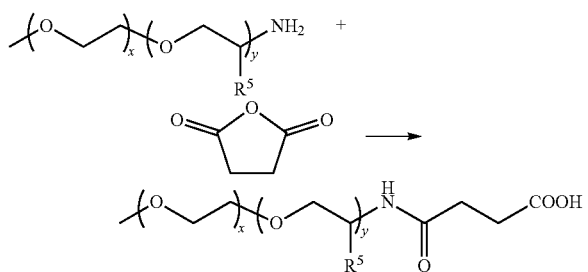

wherein:
x is 1 to 100;
y is 1 to 100; and
$R^5$ is H or $C_{1-20}$ alkyl.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20. In some embodiment, x is 19.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10. In some embodiments, y is 3.

In some embodiments, $R^5$ is H. In some embodiments, $R^5$ is $C_{1-20}$ alkyl. In some embodiments, $R^5$ is $C_{1-10}$ alkyl. In some embodiments, $R^5$ is $C_{1-5}$ alkyl. In some embodiments, $R^5$ is —$CH_3$.

In some embodiments, the amine-terminated polymer is a commercially available amine-terminated polymer from Huntsman Petrochemical Corporation. In some embodiments, the amine-terminated polymer of SCHEME 1 has x=1, y=9, and $R^5$=—$CH_3$ and is Jeffamine® M-600 (Huntsman Petrochemical Corporation, Texas). Jeffamine® M-600 has a molecular weight of approximately 600. In some embodiments, the amine-terminated polymer of SCHEME 1 has x=19, y=3, and $R^5$=—$CH_3$ and is Jeffamine® M-1000 (Huntsman Petrochemical Corporation, Texas). Jeffamine® M-1000 has a molecular weight of approximately 1,000. In some embodiments, the amine-terminated polymer of SCHEME 1 has x=6, y=29, and $R^5$=—$CH_3$ and is Jeffamine® M-2005 (Huntsman Petrochemical Corporation, Texas). Jeffamine® M-2005 has a molecular weight of approximately 2,000. In some embodiments, the amine-terminated polymer of SCHEME 1 has x=31, y=10, and $R^5$=—$CH_3$ and is Jeffamine® M-2070 (Huntsman Petrochemical Corporation, Texas). Jeffamine® M-2070 has a molecular weight of approximately 2,000.

In some embodiments, the poly(alkylene oxide) ligand is prepared from a hydroxy-terminated polymer by the reaction shown in SCHEME 2.

SCHEME 2

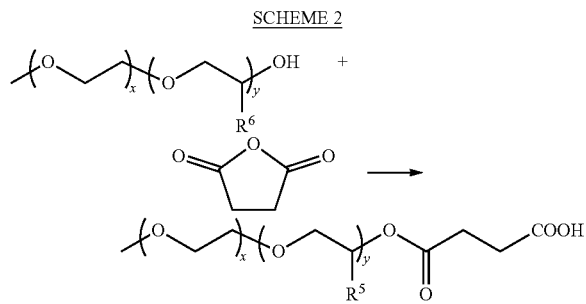

wherein:

x is 1 to 100;

y is 1 to 100; and $R^6$ is H or $C_{1-20}$ alkyl.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20. In some embodiment, x is 19.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10. In some embodiments, y is 3.

In some embodiments, $R^6$ is H. In some embodiments, $R^6$ is $C_{1-20}$ alkyl. In some embodiments, $R^6$ is $C_{1-10}$ alkyl. In some embodiments, $R^6$ is $C_{1-5}$ alkyl. In some embodiments, $R^6$ is $CH_3$.

In some embodiments, the poly(alkylene oxide) ligand has the structure of Formula IV:

(IV)

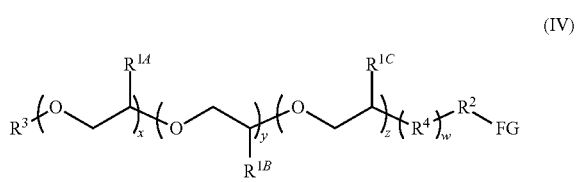

wherein x is 1 to 100;

y is 1 to 100;

z is 1 to 100;

w is 0 or 1;

$R^{1A}$, $R^{1B}$, and $R^{1C}$ independently are H or $C_{1-20}$ alkyl;

$R^2$ is $C_{1-20}$ alkyl;

$R^3$ is H, $C_{1-20}$ alkyl, $C_{3-8}$ cycloalkyl, or $C_{6-14}$ aryl;

$R^4$ is —O—, —O C(=O)—, amido, or $C_{1-20}$ alkyl;

FG is —OH, —SH, —$NH_2$, —C(=O)OH, —P(=O)(OH)$_2$, —$N_3$, or —Si(O$R^{1V}$)$_3$; and each $R^{1V}$ is independently H or $C_{1-20}$ alkyl, provided when FG is —SH, $R^{1A}$, $R^{1B}$, and $R^{1C}$ cannot all be H.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 1 to 50. In some embodiments, x is 1 to 20. In some embodiments, x is 1 to 10.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 50. In some embodiments, y is 1 to 20. In some embodiments, y is 1 to 10.

In some embodiments, z is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, z is 1 to 50. In some embodiments, z is 1 to 20. In some embodiments, z is 1 to 10.

In some embodiments, w is 1. In some embodiments, w is 0.

In some embodiments, $R^{1A}$ is H. In some embodiments, $R^{1A}$ is $C_{1-20}$ alkyl. In some embodiments, $R^{1A}$ is $C_{1-10}$ alkyl. In some embodiments, $R^{1A}$ is $C_{1-5}$ alkyl. In some embodiments, $R^{1A}$ is —$CH_3$.

In some embodiments, $R^{1B}$ is H. In some embodiments, $R^{1B}$ is $C_{1-20}$ alkyl. In some embodiments, $R^{1B}$ is $C_{1-10}$ alkyl. In some embodiments, $R^{1B}$ is $C_{1-5}$ alkyl. In some embodiments, $R^{1B}$ is —$CH_3$.

In some embodiments, $R^{1C}$ is H. In some embodiments, $R^{1C}$ is $C_{1-20}$ alkyl. In some embodiments, $R^{1C}$ is $C_{1-10}$ alkyl. In some embodiments, $R^{1C}$ is $C_{1-5}$ alkyl. In some embodiments, $R^{1C}$ is —$CH_3$.

In some embodiments, $R^{1A}$ is H, $R^{1B}$ is —$CH_3$, and $R^{1C}$ is H.

In some embodiments, $R^{1A}$ is —$CH_3$, $R^{1B}$ is H, and $R^{1C}$ is —$CH_3$.

In some embodiments, $R^2$ is $C_{1-20}$ alkyl. In some embodiments, $R^2$ is $C_{1-10}$ alkyl.

In some embodiments, $R^2$ is $C_{1-5}$ alkyl. In some embodiments, $R^2$ is —$CH_2CH_2$—.

In some embodiments, $R^3$ is $C_{1-20}$ alkyl. In some embodiments, $R^3$ is $C_{1-10}$ alkyl. In some embodiments, $R^3$ is $C_{1-5}$ alkyl. In some embodiments, $R^3$ is —$CH_3$. In some embodiments, $R^3$ is $C_{3-8}$ cycloalkyl. In some embodiments, $R^3$ is $C_{6-14}$ aryl. In some embodiments, $R^3$ is phenyl, naphthyl, phenanthryl, anthracyl, indenyl, azulenyl, biphenyl, biphenylenyl, and fluorenyl groups.

In some embodiments, $R^4$ is —O—. In some embodiments, $R^4$ is —OC(=O)—. In some embodiments, $R^4$ is amido. In some embodiments, $R^4$ is —NHC(=O)—. In some embodiments, $R^4$ is $C_{1-20}$ alkyl. In some embodiments, $R^4$ is $C_{1-10}$ alkyl. In some embodiments, $R^4$ is $C_{1-5}$ alkyl. In some embodiments, $R^4$ is —$CH_2$—.

In some embodiments, FG is —OH. In some embodiments, FG is —SH. In some embodiments, FG is —$NH_2$. In some embodiments, FG is —C(=O)OH. In some embodiments, FG is —P(=O)(OH)$_2$. In some embodiments, FG is —$N_3$. In some embodiments, FG is —Si(O$R^{1C}$)$_3$. In some embodiments, FG is —Si(OH)$_3$. In some embodiments, FG is —Si(OCH$_3$)$_3$. In some embodiments, FG is —Si(OCH$_2$CH$_3$)$_3$.

Ligand Exchange

In some embodiments, the present disclosure is directed to a method for exchanging ligands on nanostructures. In some embodiments, a first ligand on a nanostructure is exchanged with a poly(alkylene oxide) ligand. At least one functional group of the poly(alkylene oxide) ligand displaces the native hydrophobic ligands non-covalently bound to the nanostructure and affords a stable anchoring of the poly(alkylene oxide) ligand onto the nanostructure surface. In some embodiments, the nanostructure is a quantum dot.

In some embodiments, the present disclosure is directed to a method of replacing a first ligand on a nanostructure with a second ligand. In some embodiments, the second ligand is a poly(alkylene oxide) ligand. In some embodiments, the nanostructure is a quantum dot.

In some embodiments, the present disclosure is directed to a method of replacing a first ligand on a nanostructure with a second ligand comprising:

admixing a reaction mixture comprising a population of nanostructures having the first ligand non-covalently bound to the nanostructure and a poly(alkylene oxide) ligand which is the second ligand, such that the second ligand displaces the first ligand and becomes non-covalently bound to the nanostructure.

In some embodiments, the nanostructure is a quantum dot.

In some embodiments, the admixing is performed at a temperature between about 0° C. and about 200° C., about 0° C. and about 150° C., about 0° C. and about 100° C., about 0° C. and about 80° C., about 20° C. and about 200° C., about 20° C. and about 150° C., about 20° C. and about 100° C., about 20° C. and about 80° C., about 50° C. and about 200° C., about 50° C. and about 150° C., about 50° C. and about 100° C., about 50° C. and about 80° C., about 80° C. and about 200° C., about 80° C. and about 150° C., about 80° C. and about 100° C., about 100° C. and about 200° C., about 100° C. and about 150° C., or about 150° C. and about 200° C. In some embodiments, the admixing is performed at a temperature between about 50° C. and about 100° C. In some embodiments, the admixing is performed at a temperature of about 80° C.

In some embodiments, the admixing is performed over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours. In some embodiments, the admixing is performed over a period of about 40 minutes and about 2 hours. In some embodiments, the admixing is performed over a period of about 1 hour. In some embodiments, the admixing is performed over a period of about 2 hours.

In some embodiments, the reaction mixture further comprises a solvent. In some embodiments, the solvent is selected from the group consisting of chloroform, acetone, butanone, ethylene glycol monoethyl ether, ethylene glycol monopropyl ether, 1,4-butanediol diacetate, diethylene glycol monobutyl ether acetate, ethylene glycol monobutyl ether acetate, glyceryl triacetate, heptyl acetate, hexyl acetate, pentyl acetate, butyl acetate, ethyl acetate, diethylene glycol butyl methyl ether, diethylene glycol monobutyl ether, di(propylene glycol) dimethyl ether, diethylene glycol ethyl methyl ether, ethylene glycol monobutyl ether, diethylene glycol diethyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof. In some embodiments, the solvent is toluene. In some embodiments, the solvent is chloroform. In some embodiments, the sovlent is a mixture of toluene and chloroform. In some embodiments, the solvent is propylene glycol methyl ether acetate. In some embodiments, the solvent is 1,4-butanediol diacetate. In some embodiments, the solvent is hexyl acetate.

In some embodiments, the nanostructure is a quantum dot. The ratio of the quantum dots to the poly(alkylene oxide) ligand can be determined by measuring the optical density of a stock solution at a desired wavelength. For example, to achieve a ligand ratio of 5.0 mg/mL/$OD_{460}$, 4.0 mL of a stock solution of quantum dots with an optical density of 10 (measured at a wavelength of 460 nm in a 1 cm path length cuvette) can be combined with 200 mg of a poly(alkylene oxide) ligand. And, to achieve a ligand ratio of 2.5 mg/mL/$OD_{460}$, 4.0 mL of a stock solution of quantum dots with an optical density of 10 (measured at a wavelength of 460 nm in a 1 cm path length cuvette) can be combined with 100 mg of a poly(alkylene oxide) ligand.

In some embodiments, the ratio of quantum dots to the poly(alkylene oxide) ligand measured by optical density (at a wavelength between about 450 nm and about 600 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL.

In some embodiments, the ratio of quantum dots to the poly(alkylene oxide) ligand measured by optical density (at a wavelength of about 460 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL.

In some embodiments, the ratio of quantum dots to the poly(alkylene oxide) ligand measured by optical density (at a wavelength between about 600 nm and about 750 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL.

The percentage of first ligands displaced by the poly (alkylene oxide) ligand can be measured by $^1$H NMR. In some embodiments, the percentage of first ligands displaced by the poly(alkylene oxide) ligand is between about 10% and about 100%, about 10% and about 80%, about 10% and about 60%, about 10% and about 40%, about 10% and about 30%, about 10% and about 20%, about 20% and about 100%, about 20% and about 80%, about 20% and about 60%, about 20% and about 40%, about 20% and about 30%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

The percentage of nanostructures in a population of nanostructures that comprise a poly(alkylene oxide) ligand can be measured by $^1$H NMR. In some embodiments, the percentage of nanostructures in a population of nanostructures that comprise a poly(alkylene oxide) ligand is between about 10% and about 100%, about 10% and about 80%, about 10% and about 60%, about 10% and about 40%, about 10% and about 30%, about 10% and about 20%, about 20% and about 100%, about 20% and about 80%, about 20% and about 60%, about 20% and about 40%, about 20% and about 30%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

Reactive Diluent

In some embodiments, the nanostructures are dispersed in a reactive diluent. A suitable reactive diluent is substantially non-reactive with nanostructures under conditions used to prepare and store a nanostructure composition, but are capable of undergoing a reaction to form a polymer and/or interpenetrating network.

In some embodiments, the reactive diluent is capable of undergoing a radical polymerization reaction. In some embodiments, the reactive diluent comprises one or more monomers. In some embodiments, the reactive diluent comprises one or more oligomers.

In some embodiments, the reactive diluent has a radical-polymerizable group. In some embodiments, the radical-polymerizable group is an ethylenically unsaturated group. In some embodiments, the ethylenically unsaturated group is an acrylyloxy group, an acrylyloxyalkyl group, a methacrylyloxy group, a methacrylyloxyalkyl group, an acrylamide group, a methacrylamide group, a vinyloxy group, a vinyl carbonate group, an O-vinyl carbamate group, an N-vinyl carbamate group, an aromatic vinyl group, or a vinyl group.

In some embodiments, the reactive diluent is an acrylate. In some embodiments, the acrylate is a single acrylate compound or a mixture of different acrylate compounds. In some embodiments, the acrylate is monofunctional, difunctional, trifunctional, or of a higher functionality.

In some embodiments, the acrylate is monofunctional. In some embodiments, the monofunctional acrylate is isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, 2-phenoxyethyle acrylate, ethoxylated o-phenylphenol acrylate, N-[2-(acryloyloxy)ethyl]phthalimide, 2-acryloyloxyethyl succinate or glycidyl acrylate. In some embodiments, the monofunctional acrylate is isobornyl acrylate.

In some embodiments, the acrylate is difunctional. In some embodiments, the difunctional acrylate is tricyclodecane dimethanol diacrylate (SARTOMER® 833s), dioxane glycerol diacrylate (SARTOMER® CD 536), 1,4-butanediol diacrylate (SARTOMER® 213), 1,6-hexanediol diacrylate (SARTOMER® 238), ethoxylated 1,6-hexanediol diacrylate, 3-methyl 1,5-pentanediol diacrylate (SARTOMER® 341), tripropylene glycol diacrylate (SARTOMER® 306), neopentyl glycol diacrylate (SARTOMER® 247), propoxylated neopentyl glycol diacrylate, dimethyloltricyclodecane diacrylate (KAYARAD® R-684), 1,4-dihydroxymethylcyclohexane diacrylate, 2,2-bis(4-hydroxy-cyclohexyl)propane diacrylate, bis(4-hydroxycyclohexyl)methane diacrylate, hydroxyl pivalic acid neopentyl glycol diacrylate, or dipropylene glycol diacrylate. In some embodiments, the difunctional acrylate is dipropylene glycol diacrylate. In some embodiments, the acrylate is 1,4-butanediol diacrylate.

In some embodiments, the acrylate is an aromatic difunctional acrylate. In some embodiments, the aromatic difunctional acrylate is bisphenol A polyethylene glycol diether diacrylate (KAYARAD® R-551), 2,2'-methylenebis[p-phenylenepoly(oxyethylene)oxy]diethyl diacrylate (KAYARAD® R-712), hydroquinone diacrylate, 4,4'-dihydroxybiphenyl diacrylate, bisphenol A diacrylate, bisphenol F diacrylate, bisphenol S diacrylate, ethoxylated or propoxylated bisphenol A diacrylate, ethoxylated or propoxylated bisphenol diacrylate, ethoxylated or propoxylated bisphenol S diacrylate, or bisphenol-A epoxy diacrylate.

In some embodiments, the acrylate is a polyethylenglycol difunctional acrylate. In some embodiments, the polyethyleneglycol difunctional acrylate is tetraethyleneglycol diacrylate (SARTOMER® 268), polyethyleneglycol (200) diacrylate (SARTOMER® 259), polyethyleneglycol (400) diacrylate (SARTOMER® 344).

In some embodiments, the acrylate is a trifunctional acrylate or an acrylate with even higher functionality. In some embodiments, the acrylate is hexane-2,4,6-triol triacrylate, glycerol triacrylate, 1,1,1-trimethylolpropane triacrylate, ethoxylated or propoxylated glycerol triacrylate, ethoxylated or propoxylated 1,1,1-trimethylolpropane triacrylate, pentaerythritol tetraacrylate, bistrimethylolpropane tetraacrylate, pentaerythritol monohydroxytriacrylate, dipentaerythritol monohydroxypentaacrylate, dipentaerythritol pentaacrylate (SARTOMER® 399), pentaerythritol triacrylate (SARTOMER® 444), pentaerythritol tetraacrylate (SARTOMER® 295), trimethylolpropane triacrylate (SARTOMER® 351), tris(2-acryloxy ethyl) isocyanurate triacrylate (SARTOMER® 368), ethoxylated trimethylolpropane triacrylate (SARTOMER® 454), or dipentaerythritol pentaacrylate ester (SARTOMER® 9041). In some embodiments, the acrylate is an aromatic triacrylate reaction product of triglycidyl ethers of trihydric phenols and phenol or cresol novolaks (phenol-formaldehyde condensation polymer) containing three hydroxyl groups, with acrylic acid.

In some embodiments, the acrylate is a polyfunctional urethane acrylate. Urethane acrylates can be prepared by, e.g., reacting a hydroxyl-terminated polyurethane with acrylic acid, or by reacting an isocyanate-terminated prepolymer with a hydroxyalkyl acrylate to give the urethane acrylat. In some embodiments, the urethane acrylate is made from a polyester diol, an aliphatic isocyanate, or a hydroxyalkyl acrylate.

In some embodiments, the acrylate is a higher functionality acrylate, including hyberbranched polyester types. In some embodiments, the acrylate is a commercially available acrylate such as CN2301, CN2302, CN2303, CN2304 from SARTOMER®.

In some embodiments, the acrylate is a commercially available acrylate such as KAYARAD® D-310, D-330, DPHA-2H, DPHA-2C, DPHA-21, DPCA-20, DPCA-30, DPCA-60, DPCA-120, DN-0075, DN-2475, T-2020, T-2040, TPA-320, TPA-330 T-1420, PET-30, THE-330, and RP-1040 from Nippon Kayaku Co., Ltd., Tokyo, Japan; R-526, R-604, R-011, R-300 and R-205 from Nippon Kayaku Co., Ltd., Tokyo, Japan; ARONIX® M-210, M-220, M-233, M-240, M-215, M-305, M-309, M-310, M-315, M-325, M-400, M-6200, and M-6400 from Toagosei Chemical Industry Co., Ltd., Tokyo, Japan; light acrylate BP-4EA, BP-4PA, BP-2EA, BP-2PA, and DCP-A from Kyoeisha Chemical Industry Co., Ltd., Osaka, Japan; New Frontier BPE-4, TEICA, BR-42M, and GX-8345 from Daichi Kogyo Seiyaku Co., Ltd., Tokyo, Japan; ASF-400 from Nippon Steel Chemical Co., Ltd., Tokyo, Japan; Ripoxy SP-1506, SP-1507, SP-1509, VR-77, SP-4010 and SP-4060 from Showa Highpolymer Co., Ltd., Tokyo, Japan; NK Ester A-BPE-4 from Shin-Nakamura Chemical Industry Co., Ltd., Wakayama, Japan; SA-1002 from Mitsubishi Chemical Co., Ltd., Tokyo, Japan; or Viscoat-195, Viscoat-230, Viscoat-260, Viscoat-310, Viscoat-214HP, Viscoat-295, Viscoat-300, Viscoat-360, Viscoat-GPT, Viscoat-400, Viscoat-700, Viscoat-540, Viscoat-3000, and Viscoat-3700 from Osaka Organic Chemical Industry Co., Ltd., Osaka, Japan.

In some embodiments, the reactive diluent is a methacrylate. In some embodiments, the methacrylate is a single methacrylate compound or a mixture of different methacrylate compounds. In some embodiments, the methacrylate is monofunctional, difunctional, trifunctional, or of higher functionality.

In some embodiments, the methacrylate is monofunctional. In some embodiments, the monofunctional methacrylate is isobornyl methacrylate, tetrahydrofurfuryl methacrylate, ethoxylated phenyl methacrylate, lauryl methacrylate, stearyl methacrylate, octyl methacrylate, isodecyl methacrylate, tridecyl methacrylate, caprolactone methacrylate, nonyl phenol methacrylate, cyclic trimethylolpropane formal methacrylate, methoxy polyethyleneglycol methacrylates, methoxy polypropyleneglycol methacrylates, hydroxyethyl methacrylate, hydroxypropyl methacrylate, or glycidyl methacrylate.

In some embodiments, the methacrylate is an aliphatic or cycloaliphatic difunctional methacrylate such as 1,4-dihydroxymethylcyclohexane dimethacrylate, 2,2-bis(4-hydroxy-cyclohexyl)propane dimethacrylate, bis(4-hydroxycyclohexyl)methane dimethacrylate, or 1,6-hexanediol dimethacrylate. In some embodiments, the methacrylate is 1,6-hexanediol dimethacrylate.

In some embodiments, the methacrylate is an aromatic difunctional methacrylate such as ethoxylated (2) bisphenol A dimethacrylate (SARTOMER® 10 IK), ethoxylated (2) bisphenol A dimethacrylate (SARTOMER® 348L), ethoxylated (3) bisphenol A dimethacrylate (SARTOMER® 348C), ethoxylated (4) bisphenol A dimethacrylate (SARTOMER® 150), ethoxylated (4) bisphenol A dimethacrylate (SARTOMER® 540), ethoxylated (10) bisphenol A dimethacrylate (SARTOMER® 480), hydroquinone dimethacrylate, 4,4'-dihydroxybiphenyl dimethacrylate, bisphenol A dimethacrylate, bisphenol F dimethacrylate, bisphenol S dimethacrylate, ethoxylated or propoxylated bisphenol A dimethacrylate, ethoxylated or propoxylated bisphenol F dimethacrylate, or ethoxylated or propoxylated bisphenol S dimethacrylate.

In some embodiments, the methacrylate is a trifunctional methacrylate or a methacrylate with higher functionality such as tricyclodecane dimethanol dimethacrylate (SARTOMER® 834), trimethylolpropane trimethacrylate (SARTOMER® 350), tetramethylolmethane tetramethacrylate (SARTOMER® 367), hexane-2,4,6-triol trimethacrylate, glycerol trimethacrylate, 1,1,1-trimethylolpropane trimethacrylate, ethoxylated or propoxylated glycerol trimethacrylate, ethoxylated or propoxylated 1,1,1-trimethylolpropane trimethacrylate, pentaerythritol tetramethacrylate, bistrimethylolpropane tetramethacrylate, pentaerythritol monohydroxytrmethiacrylate, or dipentaerythritol monohydroxypentamethacrylate.

In some embodiments, the methacrylate is an aromatic trifunctional methacrylate. In some embodiments, the aromatic trifunctional methacrylate is the reaction product of a triglycidyl ether of a trihydric phenol with phenol or cresol novolaks containing three hydroxy groups, with methacrylic acid. In some embodiments, the aromatic trimethacrylates is the reaction product of a triglycidyl ether of a trihydric phenol with a phenol or cresol novolak containing three hydroxy groups, with methacrylic acid.

In some embodiments, the reactive diluent is selected from the group consisting of isobornyl acrylate, isobornyl methacrylate, lauryl methacrylate, tricyclodecane dimethanol diacrylate, trimethylolpropane triacrylate, trimethylolpropane trimethacrylate, 1,3,5-Triallyl-1,3,5-triazine-2,4,6 (1H,3H,5H)-trione, 1,4-butanediol acrylate, 1,6-hexanediol dimethacrylate, dipropylene glycol diacrylate, and combinations thereof.

In some embodiments, the reactive diluent is an epoxy monomer. In some embodiments, the epoxy monomer is 3,4-epoxycyclohexylmethyl-3',4'-epoxycyclohexane carboxylate, cyclohexene oxide, limonene dioxide, glycidyl methacrylate, trimethylolpropane triglycidyl ether, neopentyl glycol diglycidyl ether, bisphenol-A diglycidyl ether, glycidyl acrylate ester, glycidyl methacrylate ester, α-ethyl acrylate glycidyl ester, α-n-propyl acrylate glycidyl ester, α-n-butyl acrylate glycidyl ester, acrylate-3,4-epoxy-butyl ester, methacrylate-3,4-epoxy-butyl ester, acrylate-6,7-epoxy-heptyl ester, methacrylate-6,7-epoxy-heptyl ester, α-ethyl acrylate-6,7-epoxy-heptyl ester, o-vinyl benzyl glycidyl ether, m-vinyl benzyl glycidyl ether, or p-vinyl benzyl glycidyl ether. In some embodiments, the epoxy monomer is limonene dioxide.

In some embodiments, the reactive diluent is an oxetane monomer. In some embodiments, the oxetane monomer is dioxetanyl ether, 3-ethyl-3-hydroxymethyl oxetane, 3-ethyl-3-phenoxymethyloxetane, 3,3-dimethyl oxetane, 3,3-(hydroxymethyl) methyl oxetane, 3,3-(nitratomethyl) methyl oxetane, 3,3-bis(hydroxymethyl) oxetane, 3,3-bis(chloromethyl) oxetane, 3,3-(azidomethyl) methyl oxetane, 3,3-bis (azidomethyl) oxetane, 3-methyl nitroaminomethyl-oxetane, 3,3-bis(methyl nitraminomethyl) oxetane, 3,3-(difluoro aminomethyl) methyl oxetane, 3,3-bis(difluoro aminomethyl) oxetane, 3-hydroxy-oxetane, 1,4-bis[(3-ethyl-3-oxetanylmethoxy)methyl]benzene, or bis[1-ethyl(3-oxetanyl)]methyl ether. In some embodiments, the oxetane monomer is dioxetanyl ether.

In some embodiments, the nanostructure composition comprises at least one reactive diluent. In some embodiments, the nanostructure composition comprises between 1 and 5, between 1 and 4, between 1 and 3, between 1 and 2, between 2 and 5, between 2 and 4, between 2 and 3, between 3 and 5, between 3 and 4, or between 4 and 5 reactive diluents.

The reactive diluent can be present in any suitable amount. For example, the reactive diluent can be present in an amount that is more than, about the same as, or less than (weight/weight) compared to the nanostructures. In some embodiments, the weight ratio of the reactive diluent to the nanostructures is about 1000:1 to about 1:1000, about 1000:1 to about 1:500, about 1000:1 to about 1:200, about 1000:1 to about 1:100, about 1000:1 to about 1:50, about 1000:1 to about 1:10, about 1000:1 to about 1:1, about 500:1 to about 1:1000, about 500:1 to about 1:500, about 500:1 to about 1:200, about 500:1 to about 1:100, about 500:1 to about 1:50, about 500:1 to about 1:10, about 500:1 to about 1:1, about 200:1 to about 1:1000, about 200:1 to about 1:500, about 200:1 to about 1:200, about 200:1 to about 1:100, about 200:1 to about 1:50, about 200:1 to about 1:10, about 200:1 to about 1:1, about 100:1 to about 1:1000, about 100:1 to about 1:500, about 100:1 to about 1:200, about 100:1 to about 1:100, about 100:1 to about 1:50, about 100:1 to about 1:10, about 100:1 to about 1:1, about 50:1 to about 1:1000, about 50:1 to about 1:500, about 50:1 to about 1:200, about 50:1 to about 1:100, about 50:1 to about 1:50, about 50:1 to about 1:10, about 50:1 to about 1:1, about 10:1 to about 1:1000, about 10:1 to about 1:500, about 1:10, to about 1:200, about 10:1 to about 1:100, about 10:1 to about 1:50, about 10:1 to about 1:10, about 10:1 to about 1:1. In some embodiments, the weight ratio of the reactive diluent to the nanostructures is about 1000:1, about 500:1, about 200:1, about 100:1, about 50:1, about 10:1, about 1:1, about 1:10, about 1:50, about 1:100, about 1:200, about 1:500, or about 1:1000.

In some embodiments, the weight percentage of the reactive diluent in the nanostructure composition is between about 0.01% and about 99%, about 0.01% and about 95%, about 0.01% and about 90%, about 0.01% and about 80%, about 0.01% and about 70%, about 0.01% and about 60%, about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 99%, about 1% and about 95%, about 1% and about 90%, about 1% and about 80%, about 1% and about 70%, about 1% and about 60%, about 1% and about 50%, about 1% and about 25%, about 1% and about 20%, about 1% and about 15%, about 1% and about 10%, about 1% and about 5%, about 1% and about 2%, about 2% and about 99%, about 2% and about 95%, about 2% and about 90%, about 2% and about 80%, about 2% and about 70%, about 2% and about 60%, about 2% and about 50%, about 2% and about 25%, about 2% and about 20%, about 2% and about 15%, about 2% and about 10%, about 2% and about 5%, about 5% and about 99%, about 5% and about 95%, about 5% and about 90%, about 5% and about 80%, about 5% and about 70%, about 5% and about 60%, about 5% and about 50%, about 5% and about 25%, about 5% and about 20%, about 5% and about 15%, about 5% and about 10%, about 10% and about 99%, about 10% and about 95%, about 10% and about 90%, about 10% and about 80%, about 10% and about 70%, about 10% and about 60%, about 10% and about 50%, about 10% and about 25%, about 10% and about 20%, about 10% and about 15%, about 15% and about 50%, about 15% and about 25%, about 15% and about 20%, about 20% and about 99%, about 20% and about 95%, about 20% and about 90%, about 20% and about 80%, about 20% and about 70%, about 20% and about 60%, about 20% and about 50%, about 20% and about 25%, about 25% and about 99%, about 25% and about 95%, about 25% and about 90%, about 25% and about 80%, about 25% and about 70%, about 25% and about 60%, about 25% and about 50%, about 50% and about 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 90%, about 80% and about 95%, about 80% and about 99%, about 90% and about 95%, about 90% and about 99%, or about 95% and about 99%.

In some embodiments, the weight percentage of the reactive diluent in the nanostructure molded article is between about 0.01% and about 99%, about 0.01% and about 95%, about 0.01% and about 90%, about 0.01% and about 80%, about 0.01% and about 70%, about 0.01% and about 60%, about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 99%, about 1% and about 95%, about 1% and about 90%, about 1% and about 80%, about 1% and about 70%, about 1% and about 60%, about 1% and about 50%, about 1% and about 25%, about 1% and about 20%, about 1% and about 15%, about 1% and about 10%, about 1% and about 5%, about 1% and about 2%, about 2% and about 99%, about 2% and about 95%, about 2% and about 90%, about 2% and about 80%, about 2% and about 70%, about 2% and about 60%, about 2% and about 50%, about 2% and about 25%, about 2% and about 20%, about 2% and about 15%, about 2% and about 10%, about 2% and about 5%, about 5% and about 99%, about 5% and about 95%, about 5% and about 90%, about 5% and about 80%, about 5% and about 70%, about 5% and about 60%, about 5% and about 50%, about 5% and about 25%, about 5% and about 20%, about 5% and about 15%, about 5% and about 10%, about 10% and about 99%, about 10% and about 95%, about 10% and about 90%, about 10% and about 80%, about 10% and about 70%, about 10% and about 60%, about 10% and about 50%, about 10% and about 25%, about 10% and about 20%, about 10% and about 15%, about 15% and about 50%, about 15% and about 25%, about 15% and about 20%, about 20% and about 99%, about 20% and about 95%, about 20% and about 90%, about 20% and about 80%, about 20% and about 70%, about 20% and about 60%, about 20% and about 50%, about 20% and about 25%, about 25% and about 99%, about 25% and about 95%, about 25% and about 90%, about 25% and about 80%, about 25% and about 70%, about 25% and about 60%, about 25% and about 50%, about 50% and about 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 90%, about 80% and about 95%, about 80% and about 99%, about 90% and about 95%, about 90% and about 99%, or about 95% and about 99%.

Nanostructure Composition with Additional Materials

Quantum dot layers in quantum dot light emitting diodes (LEDs) must be solution-processed since quantum dots are colloids and cannot be evaporated. Because a quantum dot LED is a multi-layered structure, it is clearly desirable to solution process as much of the device as possible.

Solution processing includes many techniques such as layer-by-layer assembly from solution, spin coating, and inkjet printing. Quantum dots are typically soluble in a limited range of solvents. Typically, synthesized quantum dots are well dispersed in non-polar solvents such as toluene or octane. However, these solvents are often not compatible with the desired method of layer deposition such as inkjet printing or spin coating. Inkjet printing and spin coating typically involve high boiling point, environmentally acceptable solvents which are usually incompatible with the quantum dot surface without modifications being made to that surface.

Solution processing should allow for improved device performance by allowing a wide variety of additives to be added to the quantum dot solutions. However, it is well-known that quantum dots prepared using conventional techniques are immiscible with many such additives. This may result in aggregation of the quantum dots or the additive. This may also result in phase segregation as solvent is removed from a deposited layer, which would result in non-uniform mixing of the additives. Phase segregation between quantum dots and additives would likely decrease performance by a variety of mechanisms since it will generally be most advantageous for any additive to be uniformly distributed among the quantum dots.

Due to the differences in solubility between quantum dots and additives, many additives are not soluble in solvents typically used with quantum dots. Modifying the quantum dots to be soluble in a wider range of solvents would allow additional additives to be incorporated into nanostructure compositions which can be used to prepare an emissive layer. Increasing the number and types of additives that can be added to the nanostructure composition would allow the emissive layer to be tailored for many functions.

Various materials including other kinds of nanostructures or polymer complexes may be combined with quantum dots in the nanostructure composition to prepare emissive layers with increased particle spacing (e.g., by reducing Förster resonance energy transfer (FRET)). Host materials may be added to the nanostructure compositions to facilitate efficient transport of electrons and holes to the nanostructures and to promote efficient recombination within the nanostructures. Materials such as surfactants and viscosity modifiers can be added to the nanostructure compositions to increase their ability to be processed. Reactive precursors can be added to the nanostructure compositions to allow photo-curing or photo-patterning of a coated emissive layer. A photo-cured emissive layer will be protected from solvent damage caused by solution coating a next layer, allowing an all-solution processed "inverted" quantum dot LED (where usually the hole transport layer is evaporated).

In some embodiments, the present disclosure provides a nanostructure composition comprising:
(a) at least one population of nanostructures;
(b) at least one poly(alkylene oxide) ligand described herein bound to the surface of the nanostructures; and
(c) at least one additional material selected from the group consisting of a hole transport material, an electron transport material, an additional polymer complex, and a processing additive.

In some embodiments, the nanostructure composition with at least one additional material further comprises a solvent. In some embodiments, the solvent is selected from the group consisting of dipropylene glycol monomethyl ether acetate (DPMA), polyglycidyl methacrylate (PGMA), diethylene glycol monoethyl ether acetate (EDGAC), and propylene glycol methyl ether acetate (PGMEA), ethanol, methanol, 1-propanol, 2-propanol, acetone, methyl ethyl ketone, methyl isobutyl ketone, ethyl acetate, tetrahydrofuran, chloroform, chlorobenzene, cyclohexane, hexane, heptane, octane, hexadecane, undecane, decane, dodecane, xylene, toluene, benzene, octadecane, tetradecane, butyl ether, and combinations thereof. In some embodiments, the solvent is selected from DPMA, PGMA, EDGAC, PGMEA, ethanol, methanol, 1-propanol, 2-propanol, acetone, methyl ethyl ketone, methyl isobutyl ketone, ethyl acetate, tetrahydrofuran, and combinations thereof.

In some embodiments, the weight percent of the at least one additional material in the nanostructure composition is between about 0.0001% and about 5%, about 0.0001% and about 4%, about 0.0001% and about 3%, about 0.0001% and about 2%, about 0.0001% and about 1%, about 0.0001% and about 0.5%, about 0.0001% and about 0.1%, about 0.0001% and 0.01%, about 0.0001% and about 0.001%, about 0.001% and about 5%, about 0.001% and about 4%, about 0.001% and about 3%, about 0.001% and about 2%, about 0.001% and about 1%, about 0.001% and about 0.5%, about 0.001% and about 0.1%, about 0.001% and 0.01%, about 0.01% and about 5%, about 0.01% and about 4%, about 0.01% and about 3%, about 0.01% and about 2%, about 0.01% and about 1%, about 0.01% and about 0.5%, about 0.01% and about 0.1%, about 0.1% and about 5%, about 0.1% and about 4%, about 0.1% and about 3%, about 0.1% and about 2%, about 0.1% and about 1%, about 0.1% and about 0.5%, about 0.5% and about 5%, about 0.5% and about 4%, about 0.5% and about 3%, about 0.5% and about 2%, about 0.5% and about 1%, about 1% and about 5%, about 1% and about 4%, about 1% and about 3%, or about 1% and about 2%. In some embodiments, the nanostructure is a quantum dot.

Hole Transport Materials

In some embodiments, the increased dispersibility of the nanostructure compositions comprising poly(alkylene oxide) ligands described herein allows hole transport materials to be added to the nanostructure compositions. In some embodiments, the at least one additional material added to the nanostructure composition is a hole transport material.

In some embodiments, the present disclosure provides a nanostructure composition comprising:
(a) at least one population of nanostructures;
(b) at least one poly(alkylene oxide) ligand described herein bound to the surface of the nanostructures; and
(c) at least one hole transport material.

In some embodiments, the nanostructure composition comprises at least one population of nanostructures comprising at least one poly(alkylene oxide) ligand described herein and one hole transport material. In some embodiments, the nanostructure composition comprises at least one population of nanostructures comprising at least one poly(alkylene oxide) ligand described herein and two hole transport materials.

In some embodiments, the nanostructure compositions comprising a hole transport material are deposited as an emissive layer in a device and the device does not comprise a discrete hole transport layer.

In some embodiments, the hole transport material is an amine, a triarylamine, a thiophene, a carbazole, a phthalocyanine, a porphyrin, and combinations thereof.

In some embodiments, the hole transport material is 1,3-bis(N-carbazolyl)benzene, 4,4'-bis(N-carbazolyl)-1,1'-biphenyl, 1,4-bis(diphenylamino)benzene, 4,4'-bis(3-ethyl-N-carbazolyl)-1,1'-biphenyl, N,N'-bis(3-ethyl-N-carbazolyl)-1,1'-biphenyl, N,N'-bis(3-methylphenyl)-N,N'-diphenylbenzidine, N,N'-bis(phenanthren-9-yl)-N,N'-bis(phenyl)-benzidine, 4,4'-cyclohexylidenebis[N,N-bis(4-methylphenyl)benzenamine], 4-(dibenzylamino) benzaldehyde-N,N-diphenylhydrazone, 9,9'-(2,2'-dimethyl [1,1'-biphenyl]-4,4'-diyl)bis-9H-carbazole, 2,2'-dimethyl-N, N'-di[(1-naphthyl)-N,N'-diphenyl]-1,1'-biphenyl-4,4'-diamine, 9,9-dimethyl-N,N'-di(1-naphthyl)-N,N'-diphenyl-9H-fluorene-2,7-diamine, N,N-di(1-naphthyl)-N,N'-diphenyl-(1,1'-biphenyl)-4,4'-diamine, N,N-di(2-naphthyl-N,N'-diphenyl)-1,1'-biphenyl-4,4'-diamine, 4-(diphenylamino)benzaldehyde diphenylhydrazone, N,N'-diphenyl-N,N'-di-tolylbenzene-1,4-diamine, dipyrazino[2,3-f:2'3'-h]quinoxaline-2,3,6,7,10,11-hexacarbonitrile, N,N'-diphenyl-N,N'-bis-[4-(phenyl-m-tolyl-amino)-phenyl]-biphenyl-4,4'-diamine (DNTPD), N,N'-di(1-naphthyl)-N,N'-diphenylbenzidine (NPB), 4,4',4''-tris(N-carbazolyl)triphenylamine (TCTA), (4,4'-N,N'-dicarbazole)biphenyl (CBP), 3,4-ethylenedioxythiophene (H101), poly(N-ethylo-2-vinylcarbazole), poly(2-vinylcarbazole), poly(1-vinylnaphthalene), poly(2-vinylnaphthalene), N,N,N',N'-tetrakis(4-methoxyphenyl)benzidine, N,N,N',N'-tetrakis(3-methylphenyl)-3,3'-dimethylbenzidine, N,N,N',N'-tetrakis(2-naphthyl)benzidine, tetra-N-phenylbenzidine, N,N,N',N'-tetraphenylnaphthalene-2,6-diamine, N,N'-bis(3-methylphenyl)-N,N'-diphenylbenzidine (TPD), poly[(9,9-dioctylfluorenyl-2,7-diyl)-co-(4,4'-(N-(4-sec-butylphenyl)diphenylamine)] (TFB) tris(4-carbazolyl-9-ylphenyl)amine, tris[4-(diethylamino)phenyl]amine, 1,3,5-tris(diphenylamino)benzene, 1,3,5-tri(2-(9-ethylcarbazyl-3)ethylene)benzene, 1,3,5-tris[(3-methylphenyl)phenylamino]benzene, 4,4',4''-tris[2-naphthyl(phenyl)amino]triphenylamine, 4,4',4''-tris[phenyl(m-tolyl)amino]triphenylamine, tri-p-tolylamine, 5,10,15-triphenyl-5H-diindolo[3,2-a:3',2'-c]carbazole (TPDI), or N4,N4'-di(naphthalen-1-yl)-N4,N4'-bis(4-vinylphenyl)biphenyl-4,4'-diamine (VNPB).

In some embodiments, the hole transport material is TFB.

Electron Transport Materials

In some embodiments, the increased dispersibility of the nanostructure compositions with poly(alkylene oxide) ligands described herein allows electron transport materials to be added to the nanostructure compositions. In some embodiments, the at least one additional material added to the nanostructure composition is an electron transport material.

In some embodiments, the present disclosure provides a nanostructure composition comprising:
(a) at least one population of nanostructures;
(b) at least one poly(alkylene oxide) ligand described herein bound to the surface of the nanostructures; and
(c) at least one electron transport material.

In some embodiments, the nanostructure composition comprises at least one population of nanostructure comprising at least one poly(alkylene oxide) ligand described herein and one electron transport material. In some embodiments, the nanostructure composition comprises at least one population of nanostructure comprising at least one poly(alkylene oxide) ligand described herein and two electron transport materials.

In some embodiments, the nanostructure compositions comprising an electron transport material are deposited as an emissive layer in a device and the device does not comprise a discrete electron transport layer.

In some embodiments, the electron transport material is an imidazole, a pyridine, a pyrimidine, a pyridazine, a pyraxine, an oxadiazole, a chinoline, a chinoxaline, an anthracene, a benzanthracene, a pyrene, a perylene, a benzimidazole, a triazine, a ketone, a phosphinoxide, a phenazine, a phenanthroline, a triarylborane, a metal oxide, and combinations thereof.

In some embodiments, the electron transport material is 1,3-bis(3,5-dipyrid-3-ylphenyl)benzene (B3PyPB), bathocuproine, bathophenanthroline, 3-(biphenyl-4-yl)-5-(4-tert-butylphenyl)-4-phenyl-4H-1,2,4-triazole, 2-(4-biphenylyl)-5-phenyl-1,3,4-oxadiazole, 3,5-bis(4-tert-butylphenyl)-4-phenyl-4H-1,2,4-triazole, bis(8-hydroxy-2-methylquinoline)-(4-phenylphenoxy)aluminum, 2,5-bis(1-naphthyl)-1,3,4-oxadiazole, 3,5-diphenyl-4-(1-naphthyl)-1H-1,2,4-triazole, 1,3,5-tri(m-pyridin-3-ylphenyl)benzene (TmPyPB), 2,2',2''-(1,3,5-benzinetriyl)-tris(1-phenyl-1-H-benzimidazole) (TPBi), tris-(8-hydroxyquinoline)aluminum, TiO2, SnO2, SiO2, ZrO2, ZnO, or ZnMgO.

In some embodiments, the electron transport material is ZnMgO.

Additives to Enhance Processability

In some embodiments, the increased dispersibility of the nanostructure compositions with poly(alkylene oxide) ligands described herein allows additives to be added to the nanostructure compositions to enhance processability. In some embodiments, the at least one additional material added to the nanostructure composition is a processing additive.

In some embodiments, the present disclosure provides a nanostructure composition comprising:
(a) at least one population of nanostructures;
(b) at least one poly(alkylene oxide) ligand described herein bound to the surface of the nanostructures; and
(c) at least one processing additive.

In some embodiments, the nanostructure composition comprises at least one population of nanostructure comprising at least one poly(alkylene oxide) ligand described herein and one processing additive. In some embodiments, the nanostructure composition comprises at least one population of nanostructure comprising at least one poly(alkylene oxide) ligand described herein and two processing additives.

In some embodiments, the processing additive improves the coating characteristics of the film such as wetting, leveling, cratering, and release of entrapped air. In some embodiments, the processing additive is a surfactant, a viscosity modifier, a polymer additive, an organic salt, an inorganic salt, and combinations thereof.

In some embodiments, the processing additive is a surfactant. In some embodiments, the processing additive is a surfactant such as a fluorosurfactant, a polyoxyethylene alkylphenol ether, or combinations thereof. In some embodiments, the surfactant facilitates the coating of additional layers.

In some embodiments, the processing additive is a polymer additive. In some embodiments, a polymer additive can be used to increase the viscosity of the nanostructure compositions to control printability. In some embodiments, the polymer additive is selected from the group consisting of polyesters, polyethers, polycarbonates, polystyrene, polyacrylates, polymethacrylates, polyaldehydes, poly(lactide-co-glycolide), and combinations thereof. In some embodiments, the polymer additive is a poly(propylene oxide), a poly(methyl methacrylate, a poly(propylene carbonate), or a poly(ethylene carbonate).

Organic Solvents

In some embodiments, the nanostructure composition further comprises an organic solvent. In some embodiments, the organic solvent is selected from the group consisting of chloroform, acetone, butanone, ethylene glycol monoethyl ether, ethylene glycol monopropyl ether, 1,4-butanediol diacetate, diethylene glycol monobutyl ether acetate, ethylene glycol monobutyl ether acetate, glyceryl triacetate, heptyl acetate, hexyl acetate, pentyl acetate, butyl acetate, ethyl acetate, diethylene glycol butyl methyl ether, diethylene glycol monobutyl ether, di(proyplene glycol) dimethyl ether, diethylene glycol ethyl methyl ether, ethylene glycol monobutyl ether, diethylene glycol diethyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof.

In some embodiments, the organic solvent is toluene, chloroform, propylene glycol methyl ether acetate, or combinations thereof. In some embodiments, the organic solvent is toluene. In some embodiments, the organic solvent is chloroform. In some embodiments, the organic solvent is propylene glycol methyl ether acetate. In some embodiments, the organic solvent is a mixture of toluene and chloroform. In some embodiments, the organic solvent is 1,4-butanediol diacetate. In some embodiments, the organic solvent is hexyl acetate.

Organic Resin

In some embodiments, the nanostructure composition further comprises at least one organic resin.

In some embodiments, the nanostructure composition comprises (a) at least one population of nanostructures, wherein between about 10% and about 100% of the nanostructures in the at least one population of nanostructures comprise a poly(alkylene oxide) ligand bound to the nanostructures; and (b) at least one organic resin. In some embodiments, the nanostructure is a quantum dot.

In some embodiments, the organic resin is a thermosetting resin or a ultraviolet (UV) curable resin. In some embodiments, the organic resin is cured by a method that facilitates roll-to-roll processing.

Thermosetting resins require curing in which they undergo an irreversible molecular cross-linking process which renders the resin infusible. In some embodiments, the thermosetting resin is an epoxy resin, a phenolic resin, a vinyl resin, a melamine resin, a urea resin, an unsaturated polyester resin, a polyurethane resin, an allyl resin, an acrylic resin, a polyamide resin, a polyamide-imide resin, a phenolamine condensation polymerization resin, a urea melamine condensation polymerization resin, or combinations thereof.

In some embodiments, the thermosetting resin is an epoxy resin. Epoxy resins are easily cured without evolution of volatiles or by-products by a wide range of chemicals. Epoxy resins are also compatible with most substrates and tend to wet surfaces easily. See Boyle, M. A., et al., "Epoxy Resins," Composites, Vol. 21, ASM Handbook, pages 78-89 (2001).

In some embodiments, the organic resin is a silicone thermosetting resin. In some embodiments, the silicone thermosetting resin is OE6630A or OE6630B (Dow Corning Corporation, Auburn, Mich.).

In some embodiments, a thermal initiator is used. In some embodiments, the thermal initiator is AIBN [2,2'-Azobis(2-methylpropionitrile)] or benzoyl peroxide.

UV curable resins are polymers that cure and quickly harden when exposed to a specific light wavelength. In some embodiments, the UV curable resin is a resin having as a functional group a radical-polymerization group such as a (meth)acrylyloxy group, a vinyloxy group, a styryl group, or a vinyl group; a cation-polymerizable group such as an epoxy group, a thioepoxy group, a vinyloxy group, or an oxetanyl group. In some embodiments, the UV curable resin is a polyester resin, a polyether resin, a (meth)acrylic resin, an epoxy resin, a urethane resin, an alkyd resin, a spiroacetal resin, a polybutadiene resin, or a polythiolpolyene resin.

In some embodiments, the UV curable resin is selected from the group consisting of urethane acrylate, allyloxylated cyclohexyl diacrylate, bis(acryloxy ethyl)hydroxyl isocyanurate, bis(acryloxy neopentylglycol)adipate, bisphenol A diacrylate, bisphenol A dimethacrylate, 1,4-butanediol diacrylate, 1,4-butanediol dimethacrylate, 1,3-butyleneglycol diacrylate, 1,3-butyleneglycol dimethacrylate, dicyclopentanyl diacrylate, diethyleneglycol diacrylate, diethyleneglycol dimethacrylate, dipentaerythritol hexaacrylate, dipentaerythritol monohydroxy pentaacrylate, di(trimethylolpropane) tetraacrylate, ethyleneglycol dimethacrylate, glycerol methacrylate, 1,6-hexanediol diacrylate, neopentylglycol dimethacrylate, neopentylglycol hydroxypivalate diacrylate, pentaerythritol triacrylate, pentaerythritol tetraacrylate, phosphoric acid dimethacrylate, polyethyleneglycol diacrylate, polypropyleneglycol diacrylate, tetraethyleneglycol diacrylate, tetrabromobisphenol A diacrylate, triethyleneglycol divinylether, triglycerol diacrylate, trimethylolpropane triacrylate, tripropyleneglycol diacrylate, tris(acryloxyethyl) isocyanurate, phosphoric acid triacrylate, phosphoric acid diacrylate, acrylic acid propargyl ester, vinyl terminated polydimethylsiloxane, vinyl terminated diphenylsiloxane-dimethylsiloxane copolymer, vinyl terminated polyphenylmethylsiloxane, vinyl terminated trifluoromethylsiloxane-dimethylsiloxane copolymer, vinyl terminated diethylsiloxane-dimethylsiloxane copolymer, vinylmethylsiloxane, monomethacryloyloxypropyl terminated polydimethyl siloxane, monovinyl terminated polydimethyl siloxane, monoallyl-mono trimethylsiloxy terminated polyethylene oxide, and combinations thereof.

In some embodiments, the UV curable resin is a mercapto-functional compound that can be cross-linked with an isocyanate, an epoxy, or an unsaturated compound under UV curing conditions. In some embodiments, the polythiol is pentaerythritol tetra(3-mercapto-propionate) (PETMP); trimethylol-propane tri(3-mercapto-propionate) (TMPMP); glycol di(3-mercapto-propionate) (GDMP); tris[25-(3-mercapto-propionyloxy)ethyl]isocyanurate (TEMPIC); di-pentaerythritol hexa(3-mercapto-propionate) (Di-PETMP); ethoxylated trimethylolpropane tri(3-mercapto-propionate) (ETTMP 1300 and ETTMP 700); polycaprolactone tetra(3-mercapto-propionate) (PCL4MP 1350); pentaerythritol tetramercaptoacetate (PETMA); trimethylol-propane trimercaptoacetate (TMPMA); or glycol dimercaptoacetate (GDMA). These compounds are sold under the trade name THIOCURE® by Bruno Bock, Marschacht, Germany.

In some embodiments, the UV curable resin is a polythiol. In some embodiments, the UV curable resin is a polythiol selected from the group consisting of ethylene glycol bis (thioglycolate), ethylene glycol bis(3-mercaptopropionate), trimethylol propane tris (thioglycolate), trimethylol propane tris (3-mercaptopropionate), pentaerythritol tetrakis (thioglycolate), pentaerythritol tetrakis(3-mercaptopropionate) (PETMP), and combinations thereof. In some embodiments, the UV curable resin is PETMP.

In some embodiments, the UV curable resin is a thiol-ene formulation comprising a polythiol and 1,3,5-Triallyl-1,3,5-triazine-2,4,6 (1H,3H,5H)-trione (TTT). In some embodiments, the UV curable resin is a thiol-ene formulation comprising PETMP and TTT.

In some embodiments, the UV curable resin further comprises a photoinitiator. A photoinitiator initiates the crosslinking and/or curing reaction of the photosensitive material during exposure to light. In some embodiments, the photoinitiator is acetophenone-based, benzoin-based, or thioxathenone-based.

In some embodiments, the photoinitiator is a vinyl acrylate-based resin. In some embodiments, the photoinitiator is MINS-311RM (Minuta Technology Co., Ltd, Korea).

In some embodiments, the photoinitiator is IRGACURE® 127, IRGACURE® 184, IRGACURE® 184D, IRGACURE® 2022, IRGACURE® 2100, IRGACURE® 250, IRGACURE® 270, IRGACURE® 2959, IRGACURE® 369, IRGACURE® 369 EG, IRGACURE® 379, IRGACURE® 500, IRGACURE® 651, IRGACURE® 754, IRGACURE® 784, IRGACURE® 819, IRGACURE® 819Dw, IRGACURE® 907, IRGACURE® 907 FF, IRGACURE® Oxe01, IRGACURE® TPO-L, IRGACURE® 1173, IRGACURE® 1173D, IRGACURE® 4265, IRGACURE® BP, or IRGACURE® MBF (BASF Corporation, Wyandotte, Mich.). In some embodiments, the photoinitiator is TPO (2,4,6-trimethylbenzoyl-diphenyl-phosphine oxide) or MBF (methyl benzoylformate).

In some embodiments, the weight percentage of the at least one organic resin in the nanostructure composition is between about 5% and about 99%, about 5% and about 95%, about 5% and about 90%, about 5% and about 80%, about 5% and about 70%, about 5% and about 60%, about 5% and about 50%, about 5% and about 40%, about 5% and about 30%, about 5% and about 20%, about 5% and about 10%, about 10% and about 99%, about 10% and about 95%, about 10% and about 90%, about 10% and about 80%, about 10% and about 70%, about 10% and about 60%, about 10% and about 50%, about 10% and about 40%, about 10% and about 30%, about 10% and about 20%, about 20% and about 99%, about 20% and about 95%, about 20% and about 90%, about 20% and about 80%, about 20% and about 70%, about 20% and about 60%, about 20% and about 50%, about 20% and about 40%, about 20% and about 30%, about 30% and about 99%, about 30% and about 95%, about 30% and about 90%, about 30% and about 80%, about 30% and about 70%, about 30% and about 60%, about 30% and about 50%, about 30% and about 40%, about 40% and about 99%, about 40% and about 95%, about 40% and about 90%, about 40% and about 80%, about 40% and about 70%, about 40% and about 60%, about 40% and about 50%, about 50% and about 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 99%, about 80% and about 95%, about 80% and about 90%, about 90% and about 99%, about 90% and about 95%, or about 95% and about 99%.

In some embodiments, the weight percentage of the organic resin in the nanostructure molded article is between about 5% and about 99%, about 5% and about 95%, about 5% and about 90%, about 5% and about 80%, about 5% and about 70%, about 5% and about 60%, about 5% and about 50%, about 5% and about 40%, about 5% and about 30%, about 5% and about 20%, about 5% and about 10%, about 10% and about 99%, about 10% and about 95%, about 10% and about 90%, about 10% and about 80%, about 10% and about 70%, about 10% and about 60%, about 10% and about 50%, about 10% and about 40%, about 10% and about 30%, about 10% and about 20%, about 20% and about 99%, about 20% and about 95%, about 20% and about 90%, about 20% and about 80%, about 20% and about 70%, about 20% and about 60%, about 20% and about 50%, about 20% and about 40%, about 20% and about 30%, about 30% and about 99%, about 30% and about 95%, about 30% and about 90%, about 30% and about 80%, about 30% and about 70%, about 30% and about 60%, about 30% and about 50%, about 30% and about 40%, about 40% and about 99%, about 40% and about 95%, about 40% and about 90%, about 40% and about 80%, about 40% and about 70%, about 40% and about 60%, about 40% and about 50%, about 50% and about 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 99%, about 80% and about 95%, about 80% and about 90%, about 90% and about 99%, about 90% and about 95%, or about 95% and about 99%.

Making the Nanostructure Compositions

The present disclosure provides a method of making a nanostructure composition comprising admixing at least one population of nanostructures and at least one organic resin. In some embodiments, between about 10% and about 100% of the nanostructures in the at least one population of nanostructures comprise a poly(alkylene oxide) ligand.

The present disclosure provides a method of preparing a nanostructure composition, the method comprising:
  (a) providing a composition comprising at least one population of nanostructures, wherein between about 10% and about 100% of the nanostructures in the at least one population of nanostructures comprise a functional group terminated poly(alkylene oxide) ligand bound to the nanostructures, provided that the functional group terminated poly(alkylene oxide) is not a thiol terminated poly(ethylene oxide); and
  (b) admixing at least one organic resin with the composition of (a).

In some embodiments, the providing in (a) comprises:
  (1) replacing a first ligand non-covalently bound to a population of nanostructures with the functional group terminated poly(alkylene oxide) ligand,
  (2) purifying the nanostructures prepared in (1); and
  (3) dispersing the nanostructures in (2) in a reactive diluent or an organic solvent.

In some embodiments, the purifying in (2) comprises:
  (4) precipitating the nanostructures prepared in (1) in a non-polar solvent; and
  (5) centrifuging the composition in (4) and removing a supernatant.

In some embodiments, the population of nanostructures emits red, green, or blue light. In some embodiments, the respective portions of red, green, and blue light can be controlled to achieve a desired white point for the white light emitted by a display device incorporating a nanostructure film.

In some embodiments, the nanostructure composition comprises at least one population of nanostructure materials. In some embodiments, the nanostructure composition comprises a population of between 1 and 5, 1 and 4, 1 and 3, 1 and 2, 2 and 5, 2 and 4, 2 and 3, 3 and 5, 3 and 4, or 4 and 5 nanostructures. Any suitable ratio of the populations of nanostructures can be combined to create the desired nanostructure composition characteristics. In some embodiments, the nanostructure is a quantum dot.

In some embodiments, the at least one population of nanostructures is admixed with at least one organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the at least one population of nanostructures is admixed with at least one organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the at least one population of nanostructures is admixed with at least one organic resin at a temperature between about −5° C. and about 100° C., about −5° C. and about 75° C., about −5° C. and about 50° C., about −5° C. and about 23° C., about 23° C. and about 100° C., about 23° C. and about 75° C., about 23° C. and about 50° C., about 50° C. and about 100° C., about 50° C. and about 75° C., or about 75° C. and about 100° C. In some embodiments, the at least one organic resin is admixed with the at least one population of nanostructures at a temperature between about 23° C. and about 50° C.

In some embodiments, if more than one organic resin is used, the organic resins are added together and mixed. In some embodiments, a first organic resin is mixed with a second organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, a first organic resin is mixed with a second organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the replacing is performed at a temperature between about 0° C. and about 200° C., about 0° C. and about 150° C., about 0° C. and about 100° C., about 0° C. and about 80° C., about 20° C. and about 200° C., about 20° C. and about 150° C., about 20° C. and about 100° C., about 20° C. and about 80° C., about 50° C. and about 200° C., about 50° C. and about 150° C., about 50° C. and about 100° C., about 50° C. and about 80° C., about 80° C. and about 200° C., about 80° C. and about 150° C., about 80° C. and about 100° C., about 100° C. and about 200° C., about 100° C. and about 150° C., or about 150° C. and about 200° C. In some embodiments, the replacing is performed at a temperature between about 50° C. and about 100° C. In some embodiments, the replacing is performed at a temperature of about 80° C.

In some embodiments, the replacing is performed over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours. In some embodiments, the replacing is performed over a period of about 40 minutes and about 2 hours. In some embodiments, the replacing is performed over a period of about 1 hour. In some embodiments, the replacing is performed over a period of about 2 hours.

In some embodiments, the purifying is carried out by precipitating the nanostructure composition in a non-polar solvent, centrifuging the resulting mixture produced by precipitation, and removing a supernatant from centrifugation. In some embodiments, the non-polar solvent is pentane, hexane, heptane, octane, or combinations thereof. In some embodiments, the non-polar solvent is hexane.

In some embodiments, the centrifuging is performed at a speed of between about 1000 rpm and about 100,000 rpm, about 1000 rpm and about 75,000 rpm, about 1000 rpm and about 50,000 rpm, about 1000 rpm and about 25,000 rpm, about 1000 rpm and about 10,000 rpm, about 1000 rpm and about 5000 rpm, about 5000 rpm and about 100,000 rpm, about 5000 rpm and about 75,000 rpm, about 5000 rpm and about 50,000 rpm, about 5000 rpm and about 25,000 rpm, about 5000 rpm and about 10,000 rpm, about 10,000 rpm and about 100,000 rpm, about 10,000 rpm and about 75,000 rpm, about 10,000 rpm and about 50,000 rpm, about 10,000 rpm and about 25,000 rpm, about 25,000 rpm and about 100,000 rpm, about 25,000 rpm and about 75,000 rpm, about 25,000 rpm and about 50,000 rpm, about 50,000 rpm and about 100,000 rpm, about 50,000 rpm and about 75,000 rpm, or about 75,000 rpm and 100,000 rpm.

In some embodiments, the centrifuging is performed over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours.

In some embodiments, after removing the supernatant from centrifugation, the nanostructures are dispersed in a reactive diluent or an organic solvent. In some embodiments, the reactive diluent has a radical-polymerizable group. In some embodiments, the reactive diluent is miscible with the at least one organic resin. In some embodiments, the reactive diluent is isobornyl acrylate.

In some embodiments, the organic solvent can dissolve the at least one organic resin. In some embodiments, the organic solvent is selected from the group consisting of chloroform, acetone, butanone, ethylene glycol monoethyl ether, ethylene glycol monopropyl ether, 1,4-butanediol diacetate, diethylene glycol monobutyl ether acetate, ethylene glycol monobutyl ether acetate, glyceryl triacetate, heptyl acetate, hexyl acetate, pentyl acetate, butyl acetate, ethyl acetate, diethylene glycol butyl methyl ether, diethylene glycol monobutyl ether, di(proyplene glycol) dimethyl ether, diethylene glycol ethyl methyl ether, ethylene glycol monobutyl ether, diethylene glycol diethyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof. In some embodiments, the organic solvent is toluene, chloroform, propylene glycol methyl ether acetate, or combinations thereof. In some embodiments, the solvent is toluene. In some embodiments, the solvent is chloroform. In some embodiments, the solvent is a mixture of toluene and chloroform. In some embodiments, the solvent is propylene glycol methyl ether acetate. In some embodiments, the solvent is 1,4-butanediol diacetate. In some embodiments, the solvent is hexyl acetate.

The poly(alkylene oxide) ligand improves dispersion of nanostructures in photoresists and UV-curable formulations. The poly(alkylene oxide) ligand provides increased stability to the population of nanostructures in an organic resin and allows for storage of the nanostructures for extended periods of time. In some embodiments, the composition comprising at least one population of nanostructures and at least one organic resin can be stably stored at a temperature between about 10° C. and about 90° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

In some embodiments, the composition comprising at least one population of nanostructures, at least one reactive diluent, and at least one organic resin can be stably stored at a temperature between about 10° C. and about 90° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

In some embodiments, a thermal initiator, a photoinitiator, or a photoacid generator can be added to the nanostructure composition to facilitate curing.

Making a Nanostructure Layer

The nanostructures used in the present disclosure can be embedded in a polymeric matrix using any suitable method. As used herein, the term "embedded" is used to indicate that the nanostructure population is enclosed or encased with the polymer that makes up the majority of the component of the matrix. In some embodiments, the at least one nanostructure population is suitably uniformly distributed throughout the matrix. In some embodiments, the at least one nanostructure population is distributed according to an application-specific distribution. In some embodiments, the nanostructures are mixed in a polymer and applied to the surface of a substrate.

The nanostructure composition can be deposited by any suitable method known in the art, including but not limited to painting, spray coating, solvent spraying, wet coating, adhesive coating, spin coating, tape-coating, roll coating, flow coating, inkjet vapor jetting, drop casting, blade coating, mist deposition, or a combination thereof. Preferably, the nanostructure composition is cured after deposition. Suitable curing methods include photo-curing, such as UV curing, and thermal curing. Traditional laminate film processing methods, tape-coating methods, and/or roll-to-roll fabrication methods can be employed in forming the nanostructure films of the present disclosure. The nanostructure composition can be coated directly onto the desired layer of a substrate. Alternatively, the nanostructure composition can be formed into a solid layer as an independent element and subsequently applied to the substrate. In some embodiments, the nanostructure composition can be deposited on one or more barrier layers.

Spin Coating

In some embodiments, the nanostructure composition is deposited onto a substrate using spin coating. In spin coating a small amount of material is typically deposited onto the center of a substrate loaded a machine called the spinner which is secured by a vacuum. A high speed of rotation is applied on the substrate through the spinner which causes centripetal force to spread the material from the center to the edge of the substrate. While most of the material would be spun off, a certain amount remains of the substrate, forming a thin film of material on the surface as the rotation continues. The final thickness of the film is determined by the nature of the deposited material and the substrate in addition to the parameters chosen for the spin process such as spin speed, acceleration, and spin time. For typical films, a spin speed of 1500 to 6000 rpm is used with a spin time of 10-60 seconds.

Mist Deposition

In some embodiments, the nanostructure composition is deposited onto a substrate using mist deposition. Mist deposition takes place at room temperature and atmospheric pressure and allows precise control over film thickness by changing the process conditions. During mist deposition, a liquid source material is turned into a very fine mist and carried to the deposition chamber by nitrogen gas. The mist is then drawn to a surface by a high voltage potential between the field screen and the holder. Once the droplets coalesce on the surface, the surface is removed from the chamber and thermally cured to allow the solvent to evaporate. The liquid precursor is a mixture of solvent and material to be deposited. It is carried to the atomizer by pressurized nitrogen gas. Price, S. C., et al., "Formation of Ultra-Thin Quantum Dot Films by Mist Deposition," *ESC Transactions* 11:89-94 (2007).

Spray Coating

In some embodiments, the nanostructure composition is deposited onto a substrate using spray coating. The typical equipment for spray coating comprises a spray nozzle, an atomizer, a precursor solution, and a carrier gas. In the spray deposition process, a precursor solution is pulverized into micro sized drops by means of a carrier gas or by atomization (e.g., ultrasonic, air blast, or electrostatic). The droplets that come out of the atomizer are accelerated by the substrate surface through the nozzle by help of the carrier gas which is controlled and regulated as desired. Relative motion between the spray nozzle and the substrate is defined by design for the purpose of full coverage on the substrate.

In some embodiments, application of the nanostructure composition further comprises a solvent. In some embodiments, the solvent for application of the nanostructure composition is water, organic solvents, inorganic solvents, halogenated organic solvents, or mixtures thereof. Illustrative solvents include, but are not limited to, water, $D_2O$, acetone, ethanol, dioxane, ethyl acetate, methyl ethyl ketone, isopropanol, anisole, γ-butyrolactone, dimethylformamide, N-methylpyrroldinone, dimethylacetamide, hexamethylphosphoramide, toluene, dimethylsulfoxide, cyclopentanone, tetramethylene sulfoxide, xylene, ε-caprolactone, tetrahydrofuran, tetrachloroethylene, chloroform, chlorobenzene, dichloromethane, 1,2-dichloroethane, 1,1,2,2-tetrachloroethane, or mixtures thereof.

In some embodiments, the compositions are thermally cured to form the nanostructure layer. In some embodiments, the compositions are cured using UV light. In some embodiments, the nanostructure composition is coated directly onto a barrier layer of a nanostructure film, and an additional barrier layer is subsequently deposited upon the nanostructure layer to create the nanostructure film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are preferably deposited over a nanostructure layer to seal the material between the top and bottom barrier layers. Suitably, the barrier layers can be deposited as a laminate film and optionally sealed or further processed, followed by incorporation of the nanostructure film into the particular lighting device. The nanostructure composition deposition process can include additional or varied components, as will be understood by persons of ordinary skill in the art. Such embodiments will allow for in-line process adjustments of the nanostructure emission characteristics, such as brightness and color (e.g., to adjust the quantum film white point), as well as the nanostructure film thickness and other characteristics. Additionally, these embodiments will allow for periodic testing of the nanostructure film characteristics during production, as well as any necessary toggling to achieve precise nanostructure film characteristics. Such testing and adjustments can also be accomplished without changing the mechanical configuration of the processing line, as a computer program can be employed to electronically change the respective amounts of mixtures to be used in forming a nanostructure film.

Inkjet Printing

The formation of thin films using dispersions of nanostructures in organic solvents is often achieved by coating techniques such as spin coating. However, these coating techniques are generally not suitable for the formation of thin films over a large area and do not provide a means to pattern the deposited layer and thus, are of limited use. Inkjet printing allows for precisely patterned placement of thin films on a large scale at low cost. Inkjet printing also allows for precise patterning of quantum dot layers, allows printing pixels of a display, and eliminates photopatterning. Thus, inkjet printing is very attractive for industrial application—particularly in display applications.

Solvents commonly used for inkjet printing are dipropylene glycol monomethyl ether acetate (DPMA), polyglycidyl methacrylate (PGMA), diethylene glycol monoethyl ether acetate (EDGAC), and propylene glycol methyl ether acetate (PGMEA). Volatile solvents are also frequently used in inkjet printing because they allow rapid drying. Volatile solvents include ethanol, methanol, 1-propanol, 2-propanol, acetone, methyl ethyl ketone, methyl isobutyl ketone, ethyl acetate, and tetrahydrofuran. Conventional quantum dots generally cannot be dissolved in these solvents. However, the increased hydrophilicity of the quantum dots comprising poly(alkylene oxide) ligands allows for increased solubility in these solvents.

In some embodiments, the nanostructures comprising a poly(alkylene oxide) ligands described herein used for inkjet printing are dispersed in a solvent selected from DPMA, PGMA, EDGAC, PGMEA, ethanol, methanol, 1-propanol, 2-propanol, acetone, methyl ethyl ketone, methyl isobutyl ketone, ethyl acetate, tetrahydrofuran, chloroform, chlorobenzene, cyclohexane, hexane, heptane, octane, hexadecane, undecane, decane, dodecane, xylene, toluene, benzene, octadecane, tetradecane, butyl ether, or combinations thereof. In some embodiments, the nanostructures comprising a poly(alkylene oxide) ligands described herein used for inkjet printing are dispersed in a solvent selected from DPMA, PGMA, EDGAC, PGMEA, ethanol, methanol, 1-propanol, 2-propanol, acetone, methyl ethyl ketone, methyl isobutyl ketone, ethyl acetate, tetrahydrofuran, or combinations thereof.

In order to be applied by inkjet printing or microdispensing, the inkjet compositions comprising nanostructures should be dissolved in a suitable solvent. The solvent must be able to disperse the nanostructure composition and must not have any detrimental effect on the chosen print head.

In some embodiments, the inkjet composition further comprises one or more additional components such as surface-active compounds, lubricating agents, wetting agents, dispersing agents, hydrophobing agents, adhesive agents, flow improvers, defoaming agents, deaerators, diluents, auxiliaries, colorants, dyes, pigments, sensitizers, stabilizers, and inhibitors.

In some embodiments, the nanostructure compositions described herein comprise by weight of the inkjet composition between about 0.01% and about 20%. In some embodiments, the nanostructures comprising poly(alkylene oxide) ligands comprise by weight of the inkjet composition between about 0.01% and about 20%, about 0.01% and about 15%, about 0.01% and about 10%, about 0.01% and about 5%, about 0.01% and about 2%, about 0.01% and about 1%, about 0.01% and about 0.1%, about 0.01% and about 0.05%, about 0.05% and about 20%, about 0.05% and about 15%, about 0.05% and about 10%, about 0.05% and about 5%, about 0.05% and about 2%, about 0.05% and about 1%, about 0.05% and about 0.1%, about 0.1% and about 20%, about 0.1% and about 15%, about 0.1% and about 10%, about 0.1% and about 5%, about 0.1% and about 2%, about 0.1% and about 1%, about 0.5% and about 20%, about 0.5% and about 15%, about 0.5% and about 10%, about 0.5% and about 5%, about 0.5% and about 2%, about 0.5% and about 1%, about 1% and about 20%, about 1% and about 15%, about 1% and about 10%, about 1% and about 5%, about 1% and about 2%, about 2% and about 20%, about 2% and about 15%, about 2% and about 10%, about 2% and about 5%, about 5% and about 20%, about 5% and about 15%, about 5% and about 10%, about 10% and about 20%, about 10% and about 15%, or about 15% and 20%.

In some embodiments, the inkjet composition comprising a nanostructure composition described herein is used in the formulation of an electronic device. In some embodiments, the inkjet composition comprising a nanostructure composition described herein is used in the formulation of an electronic device selected from the group consisting of a nanostructure film, a display device, a lighting device, a backlight unit, a color filter, a surface light-emitting device, an electrode, a magnetic memory device, or a battery. In some embodiments, the inkjet composition comprising a nanostructure composition described herein is used in the formulation of a light-emitting device.

Barrier Layers

In some embodiments, the nanostructure molded article comprises one or more barrier layers disposed on either one or both sides of the nanostructure layer. Suitable barrier layers protect the nanostructure layer and the nanostructure molded article from environmental conditions such as high temperatures, oxygen, and moisture. Suitable barrier materials include non-yellowing, transparent optical materials which are hydrophobic, chemically and mechanically compatible with the nanostructure molded article, exhibit photo- and chemical-stability, and can withstand high temperatures. In some embodiments, the one or more barrier layers have a similar refractive index to the nanostructure molded article. In some embodiments, the matrix material of the nanostructure molded article and the one or more adjacent barrier layers have similar refractive indices, such that most of the light transmitting through the barrier layer toward the nanostructure molded article is transmitted from the barrier layer into the nanostructure layer. Using materials with similar refractive indexes reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are preferably planar layers, and can include any suitable shape and surface area configuration, depending on the particular lighting application. In preferred embodiments, the one or more barrier layers will be compatible with laminate film processing techniques, whereby the nanostructure layer is disposed on at least a first barrier layer, and at least a second barrier layer is disposed on the nanostructure layer on a side opposite the nanostructure layer to form the nanostructure molded article according to one embodiment of the present disclosure. Suitable barrier materials include any suitable barrier materials known in the art. For example, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. Preferably, each barrier layer of the nanostructure molded article comprises at least 2 layers comprising different materials or compositions, such that the multi-layered barrier eliminates or reduces pinhole defect alignment in the barrier layer, providing an effective barrier to oxygen and moisture penetration into the nanostructure layer. The nanostructure layer can include any suitable material or combination of materials and any suitable number of barrier layers on either or both sides of the nanostructure layer. The materials, thickness, and number of barrier layers will depend on the particular application, and will suitably be chosen to maximize barrier protection and brightness of the nanostructure layer while minimizing thickness of the nanostructure molded article. In preferred embodiments, each barrier layer comprises a laminate film, preferably a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the nanostructures comprise heavy metals or other toxic materials, which guidelines may require more or thicker barrier layers. Additional considerations for the barriers include cost, availability, and mechanical strength.

In some embodiments, the nanostructure film comprises two or more barrier layers adjacent each side of the nanostructure layer, for example, two or three layers on each side or two barrier layers on each side of the nanostructure layer. In some embodiments, each barrier layer comprises a thin glass sheet, e.g., glass sheets having a thickness of about 100 μm, 100 μm or less, 50 μm or less, preferably 50 μm or about 50 μm.

Each barrier layer of the nanostructure film of the present disclosure can have any suitable thickness, which will depend on the particular requirements and characteristics of the lighting device and application, as well as the individual film components such as the barrier layers and the nanostructure layer, as will be understood by persons of ordinary skill in the art. In some embodiments, each barrier layer can have a thickness of 50 μm or less, 40 μm or less, 30 μm or less, 25 μm or less, 20 μm or less, or 15 μm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10 μm or less, 5 μm or less, 1 μm or less, or 100 nm or less. In certain embodiments, the barrier comprises a thin oxide coating with a thickness of about 100 nm or less, 10 nm or less, 5 nm or less, or 3 nm or less. The top and/or bottom barrier can consist of the thin oxide coating, or may comprise the thin oxide coating and one or more additional material layers.

Nanostructure Film Features and Embodiments

In some embodiments, the nanostructure films are used to form display devices. As used herein, a display device refers to any system with a lighting display. Such devices include, but are not limited to, devices encompassing a liquid crystal display (LCD), televisions, computers, mobile phones, smart phones, personal digital assistants (PDAs), gaming devices, electronic reading devices, digital cameras, and the like.

In some embodiments, the optical films containing nanostructure compositions are substantially free of cadmium. As used herein, the term "substantially free of cadmium" is intended that the nanostructure compositions contain less than 100 ppm by weight of cadmium. The RoHS compliance definition requires that there must be no more than 0.01% (100 ppm) by weight of cadmium in the raw homogeneous precursor materials. The cadmium concentration can be measured by inductively coupled plasma mass spectroscopy (ICP-MS) analysis, and are on the parts per billion (ppb) level. In some embodiments, optical films that are "substantially free of cadmium" contain 10 to 90 ppm cadmium. In other embodiment, optical films that are substantially free of cadmium contain less than about 50 ppm, less than about 20 ppm, less than about 10 ppm, or less than about 1 ppm of cadmium.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Preparation of a Carboxylic Acid Terminated Poly(Ethylene Oxide/Propylene Oxide) Ligand

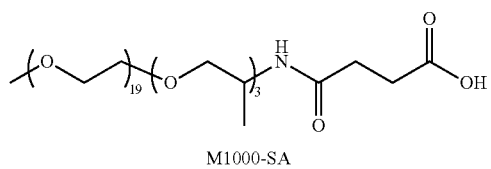

M1000-SA

Carboxylic Acid terminated poly(ethylene oxide/propylene oxide) ligand (M1000-SA) was synthesized from an amine-terminated poly((ethylene oxide/propylene oxide) ligand (Jeffamine® M-1000 polyetheramine, Huntsman, Tex.) by reaction with succinic anhydride, as shown in SCHEME 3.

SCHEME 3

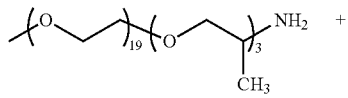

-continued

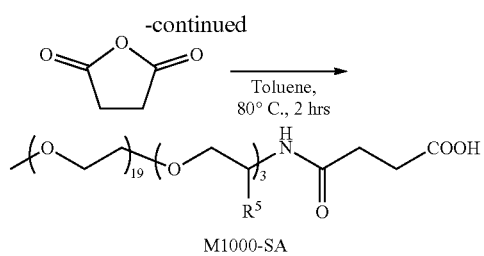

M1000-SA 427.6 g (416 mmol) Jeffamine® M-1000 was transferred into a round bottom flask while warm (>40° C.), and degassed at 80° C. under vacuum (100 mTorr) for one hour. The flask was purged with nitrogen before the addition of 43.76 g (436.8 mmol, 1.05 equivalents) of succinic anhydride powder (from SAFC) and 142 ml toluene. Vacuum was briefly applied to the flask to remove air and the flask was purged with nitrogen. The reaction mixture was stirred under nitrogen at 80° C. for two hours. Most of the succinic anhydride was visibly consumed within 5-10 min. The product was allowed to cool overnight under nitrogen. The flask was transferred into a glovebox and the product was transferred into a storage bottle as a liquid in toluene at room temperature.

Example 2

Preparation of Poly(Alkylene Oxide) Quantum Dots

FIG. 1 illustrates a general ligand exchange process between hydrophobic ligands (such as oleate ligand) bound to an as-synthesized quantum dot and hydrophilic poly(alkylene oxide) ligands (such as M1000-SA).

For example, a red InP quantum dot sample was combined with the M1000-SA ligand and heated to 80° C. in toluene under inert atmosphere for one hour to achieve a ligand ratio of 10 mg/mL/OD$_{460}$. A red InP/SiO$_2$ quantum dot sample was combined with the M1000-SA ligand and heated to 80° C. in a mixture of toluene and chloroform under inert atmosphere for one hour to achieve a ligand ratio of 10 mg/mL/OD$_{460}$.

A 10 mL red InP/SiO$_2$ quantum dot sample was combined with 0.9 mL M1000-SA ligand in a 40 mL vial and heated to 80° C. in a mixture of toluene and chloroform for two hours to achieve a ligand ratio of 10 mg/mL/OD$_{460}$. A portion of chloroform was removed by evaporation. The quantum dot composition was precipitated into 8 mL hexane. The precipitated M1000-SA quantum dots were washed with a mixture of chloroform and hexane twice. The resulting quantum dots were dried under vacuum. After drying, the M1000-SA quantum dots were dispersed with 3 mL chloroform for further testing.

To achieve a ligand ratio of 1 mg/mL/OD$_{450}$, a 40 mL green InP quantum dot sample with an optical density of 101 (measured at a wavelength of 450 nm in a 1 cm path length cuvette) was precipitated in 160 mL ethanol in a centrifuge bottle and separated by centrifugation at 4000 rpm for 10 minutes. After decanting the supernatant inside a glove box, 20 mL propylene glycol methyl ether acetate (PGMEA) and 5.5 mL M1000-SA ligand were mixed with the InP quantum dots for two hours. The resulting M1000-SA InP quantum dot composition was precipitated in 80 mL hexane and separated by centrifugation at 4000 rpm for 10 minutes. After decanting the supernatant inside a glove box, the M1000-SA InP quantum dots were dispersed in 40 mL PGMEA for further testing.

To achieve a ligand ratio of 0.5 mg/mL/$OD_{450}$, a 35 mL red InP quantum dot sample with an optical density of 229 (measured at a wavelength of 450 nm in a 1 cm path length cuvette) was precipitated in 160 mL ethanol in a centrifuge bottle and separated by centrifugation at 4000 rpm for 10 minutes. After decanting the supernatant inside a glove box, 20 mL propylene glycol methyl ether acetate (PGMEA) and 5.5 mL M1000-SA ligand were mixed with the InP quantum dots for two hours. The resulting M1000-SA InP quantum dot composition was precipitated in 80 mL hexane and separated by centrifugation at 4000 rpm for 10 minutes. After decanting the supernatant inside a glove box, the M1000-SA InP quantum dots were dispersed in 40 mL PGMEA for further testing.

Example 3

Preparation of Poly(Alkylene Oxide) Quantum Dots with an Organic Resin

A 10 mL quantum dot sample was combined with 2 mL M1000-SA ligand in a vial and heated to 80° C. in a glove box for two hours to achieve a ligand ratio of 5 mg/mL/$OD_{460}$. The resulting M1000-SA quantum dot composition was precipitated in 25 mL hexane and separated by centrifugation at 3000 rpm for 5 minutes. After decanting the supernatant, 2 mL 1,3,5-Triallyl-1,3,5-triazine-2,4,6 (1H, 3H,5H)-trione (TTT) was admixed with the M1000-SA quantum dots in the vial for further testing.

Figure 2:
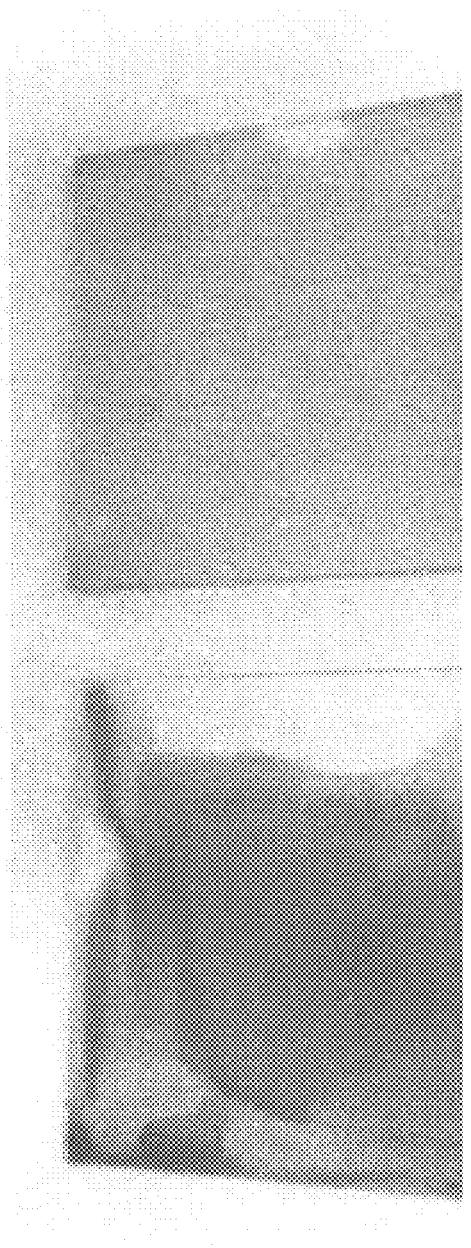
FIG. 2 is a side-by-side comparison of thin films made using quantum dots with native oleate ligands (left) and quantum dots with the M1000-SA ligands (right) in a photoresist formulation.

The impact of the ligand exchange can be observed by mixing the quantum dots and organic resin components together in solution and spin-coating to form a film, as shown in the photographs in FIG. 2. FIG. 2 is a side-by-side comparison of thin films made using quantum dots with native oleate ligands (left) and quantum dots with the M1000-SA ligands (right) in a photoresist formulation. The thin film on the left (using quantum dots with native oleate ligands) clearly shows aggregation of quantum dots and non-uniform morphology. By contrast, when the quantum dots are bounded by the M1000-SA ligands, they are much more compatible with the photoresist, and the resulting film is much more uniform.

Figure 3:
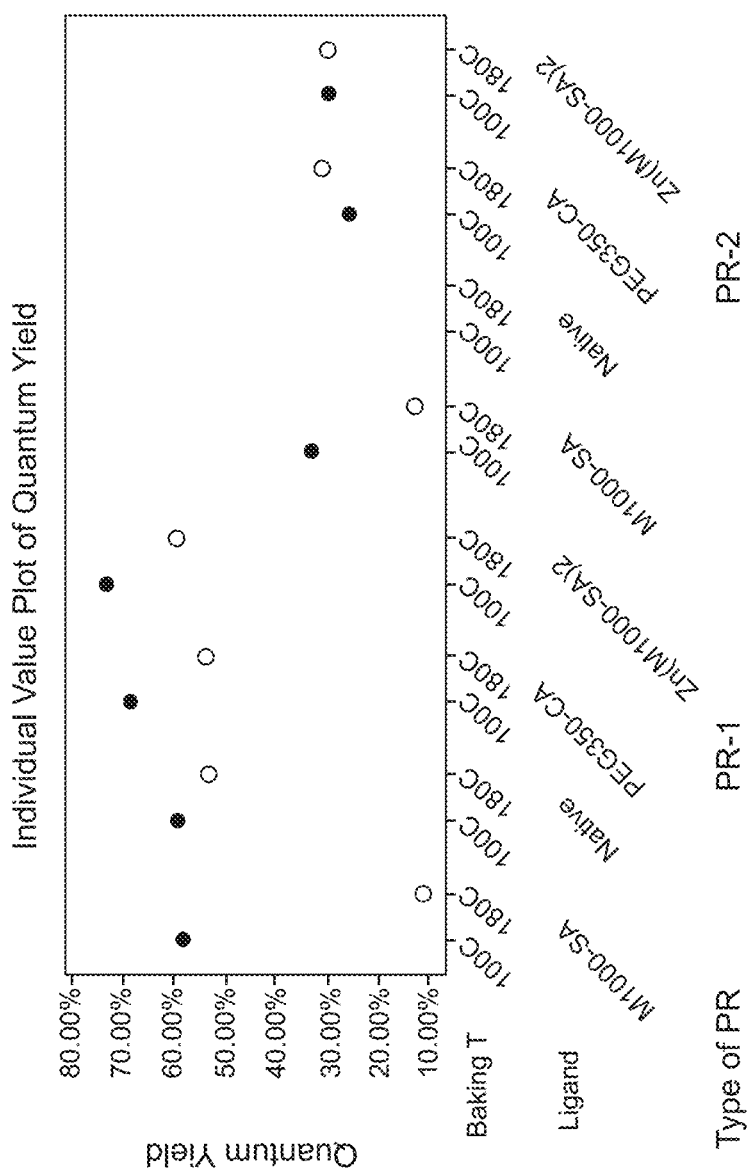
FIG. 3 shows a plot of quantum yield (QY) values measured at 100° C. and 180° C. of nanocomposite films made using quantum dots with four different ligand compositions—native (as-synthesized quantum dots), M1000-SA, PEG350-CA (a carboxylic acid terminated methoxy polyethylene glycol), and $Zn(M1000-SA)_2$ in two different photoresist formulations (PR-1 and PR-2)

The improved dispersion of M1000-SA quantum dots in the photoresist formulation results in higher initial quantum yield (QY) of the film. FIG. 3 shows a plot of QY values measured at 100° C. and 180° C. of nanocomposite films made using quantum dots with four different ligand compositions—native (as-synthesized quantum dots), M1000-SA, PEG350-CA (a carboxylic acid terminated methoxy polyethylene glycol), and Zn(M1000-SA)$_2$ in two different photoresist formulations (PR-1 and PR-2). In all cases, the initial QY measured at 100° C. of the films made using quantum dots with poly(alkylene oxide) ligands are higher than the films made using as-synthesized quantum dots. In the PR-2 photoresist formulation, the light retention rates ($QY_{180° C.}/QY_{100° C.}$) for the films made using quantum dots with poly(alkylene oxide) ligands are higher than the films made using as-synthesized quantum dots.

Figure 4:
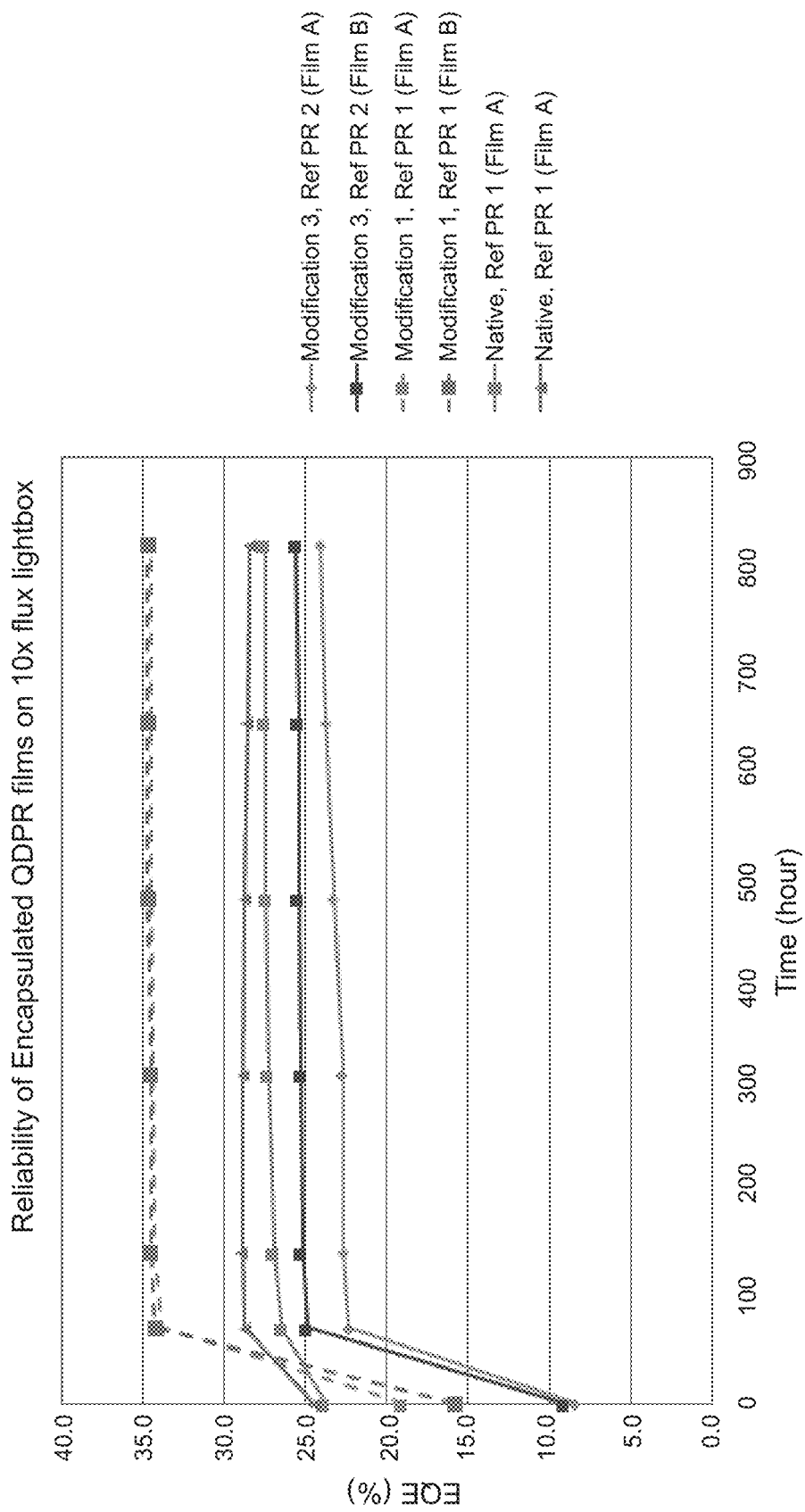
FIG. 4 shows a plot of external quantum efficiency (EQE) as a function of time for samples encapsulated in glass substrates and exposed to 10× light flux.
Figure 5:
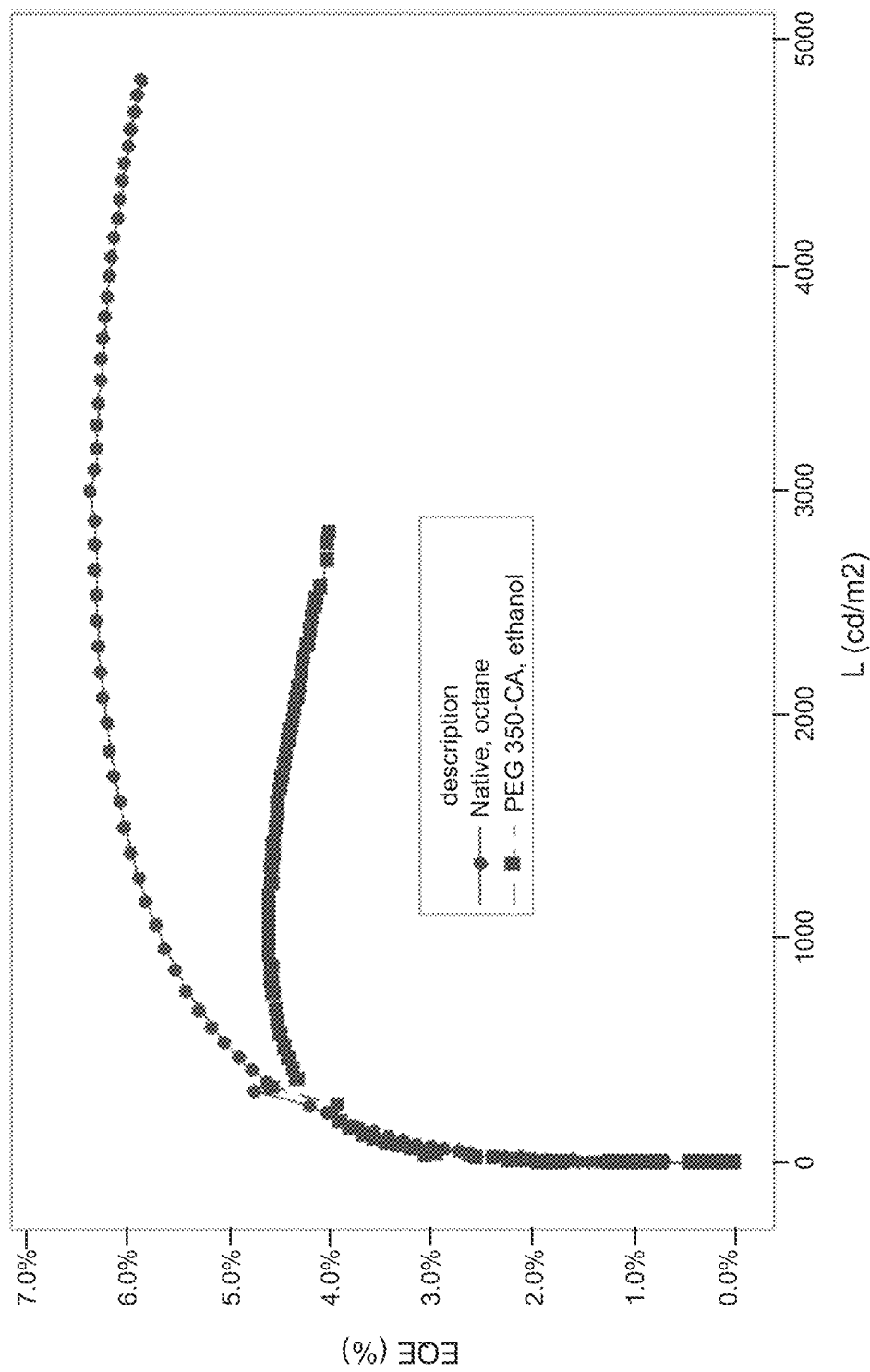
FIG. 5 shows a plot of EQE as a function of luminance (L) for full devices prepared with ZnSe quantum dots comprising oleic acid ligands (native ligands) dispersed in octane and full devices prepared with ZnSe quantum dots comprising PEG350-CA ligands dispersed in ethanol.

The reliability of the nanocomposite films was tested by measuring their external quantum efficiency (EQE) upon irradiation under accelerated conditions. FIG. 4 shows a plot of EQE as a function of time for samples encapsulated in glass substrates and exposed to 10× light flux. As shown in FIG. 4, functionalization with M1000-SA ("Modification 1") enables the nanocomposite film to achieve 20% EQE initially and almost 35% EQE after a burn-in process. This performance is then maintained over 800 hours, which translates to 8000 hours in real-life conditions. While not wishing to be bound by any theory, it is believed that the impressive lifetime of Modification 1 is a consequence of efficient passivation of the quantum dot surface by the poly(alkylene oxide) ligands.

Example 4

ZnSe Quantum Dot LED

Ligand exchange was performed by mixing an excess of PEG350-CA ($M_w$ 350) with native ligands (primarily oleic acid) on ZnSe quantum dots. After heating, ligands were exchanged and it was possible to isolate the ZnSe quantum dots with the PEG350-CA ligands from solution. The ZnSe quantum dots with PEG350-CA ligands have greatly enhanced dispersibility in polar solvents. The quantum dots were dispersed in ethanol and spin-coated to fabricate a layer of quantum dots. Full devices with ZnSe quantum dots with PEG350-CA ligands show comparable performance to those prepared using ZnSe quantum dots with native ligands.

Patterned indium tin oxide (ITO, 95 nm) glass substrates were sonicated with water and isopropanol/acetone, successively, and then treated with UV-ozone in air for 20 minutes. Poly(3,4-ethylenedioxythiophene) polystyrene sulfonate (PEDOT:PSS) was applied by spin coating at 3000 rpm followed by baking at 200° C. for 15 minutes in air. Substrates were transferred to an inert atmosphere glovebox and a hole transport layer (HTL) was applied by spin coating from a 4 mg/mL toluene solution of N4,N4'-di(1-naphthalen-1-yl)-N4,N4'-bis(4-vinylphenyl)biphenyl)-4,4'-diamine (VNPB) followed by baking at 200° C. for 20 minutes to cross-link the HTL. ZnSe quantum dots with PEG350-CA ligands in ethanol were spin-coated at 3000 rpm to form a ~23 nm thick film. The ZnSe film was baked at 180° C. for 5 minutes. An electron transport layer (ETL) consisting of ZnMgO nanoparticles (dispersed in ethanol at 8 mg/mL) was applied by spin coating at 3000 rpm. Aluminum (150 nm) was deposited by thermal evaporation to form a cathode. Devices were encapsulated with an epoxy-sealed cavity glass and desiccant/oxygen getter. Current-voltage and light output data was obtained using a Keithley 2400 source meter (Keithley Instruments, Inc., Cleveland, Ohio) and a Keithley 6485 picoammeter (Keithley Instruments, Inc., Cleveland, Ohio) coupled to a Hamamatsu photodiode (Hamamatsu Photonics K.K., Japan). The photodiode was calibrated relative to a SPECTRASCAN PR-655 spectroradiometer (Photo Research, Inc., Syracuse, N.Y.).

Example 5

Hole Transport Materials Mixed into the Quantum Dot Layer

Another advantage of the present invention is the ability to mix or grade interface materials with the quantum dot layer. For example, we have demonstrated enhanced miscibility of hole-transport molecules with quantum dots by use of this invention, allowing controlled mixing at what would otherwise be an abrupt interface.

Ligand exchange was performed by mixing an excess of PEG350-CA ($M_w$ 350) with native ligands (primarily oleic acid) on InP (red-emitting) quantum dots. Glass/ITO/PEDOT/VNPB substrates were prepared as described in the first example using $N^4,N^{4'}$-di(naphthalen-1-yl)-$N^4,N^{4'}$-bis (4-vinylphenyl)biphenyl-4,4'-diamine (VNPB) as the hole transport layer. Two devices, device A and B, were prepared as follows:

For device A, quantum dots were diluted with toluene to make a 20 nm film after spin coating at 2000 rpm. For device B, quantum dots were mixed with 4 mg/mL poly[(9,9-dioctylfluorenyl-2,7-diyl)-co-(4,4'-(N-(4-sec-butylphenyl) diphenylamine)] (TFB) and toluene so that the concentration of quantum dots matched that of device A. TFB was controlled to contribute 18 nm thickness to the mixture of quantum dots and TFB such that the total TFB+quantum dots film thickness was 38 nm on device B. After coating the quantum dots or quantum dot/TFB mix, the film was baked at 70° C. for 5 minutes. An electron transport layer (ETL) consisting of ZnMgO nanoparticles (dispersed in ethanol at 8 mg/mL) was applied by spin coating at 3000 rpm. Aluminum (150 nm) was deposited by thermal evaporation to form the cathode.

Figure 6:
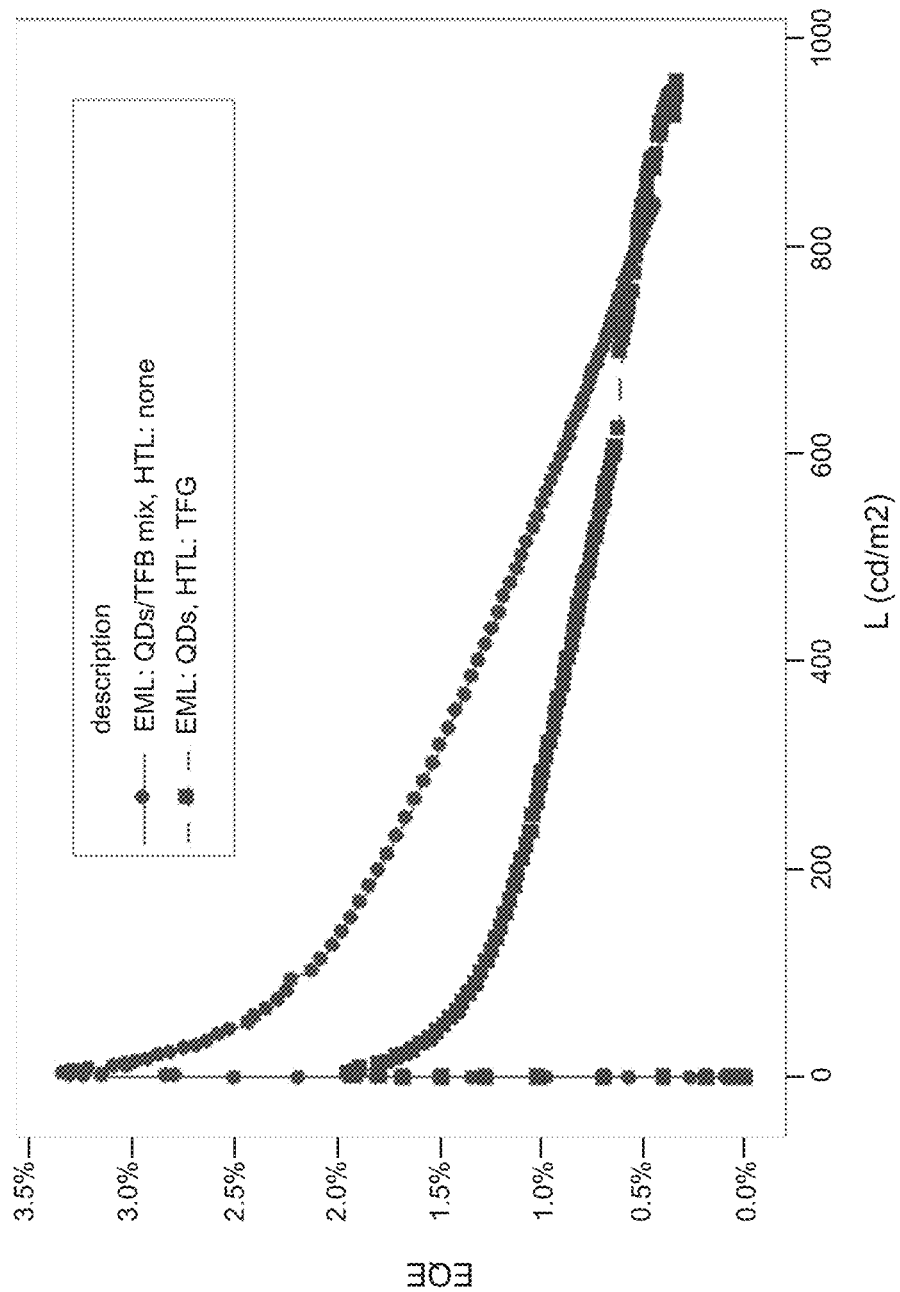
FIG. 6 shows a plot of EQE as a function of luminance for full devices prepared with InP quantum dots comprising oleic acid ligands with a discrete poly[(9,9-dioctylfluorenyl-2,7-diyl)-co-(4,4'-(N-(4-sec-butylphenyl)diphenylamine)] (TFB) hole layer and full devices prepared with InP quantum dots comprising PEG350-CA ligands mixed with TFB (no discrete hole layer).

As shown in FIG. 6, TFB mixed with PEG350-CA ligand InP quantum dots (with no separate hole transport layer (HTL)) gives similar performance to a device with a discrete HTL layer comprising TFB.

Example 6

ZnMgO as an Electron Transport Material Mixed into the Quantum Dot Layer

Red-emitting InP quantum dots were exchanged with PEG350-CA by standard processes. Two devices, device A and B, were prepared as follows:

Glass/ITO/PEDOT/VNPB substrates were prepared as described in Example 4. A 10× stock of PEG350-CA InP quantum dots in toluene was prepared from a more concentrated stock such that a film spin coated from a 10-fold dilution of this stock ("1×") yielded 20 nm film thickness at 2000 rpm. For device A, the film was formed directly from the 1× concentration. For device B, 10 uL of 10× PEG350-CA InP quantum dot stock and 45 uL of 8 mg/mL ZnMgO were combined with 45 uL toluene and spin coated at 2000 rpm. After coating the emissive layer (EML) films, the film was baked at 70° C. for 5 minutes. An ETL consisting of ZnMgO nanoparticles (dispersed in ethanol at 8 mg/mL) was applied by spin coating at 3000 rpm. Aluminum (150 nm) was deposited by thermal evaporation to form the cathode.

Figure 7:
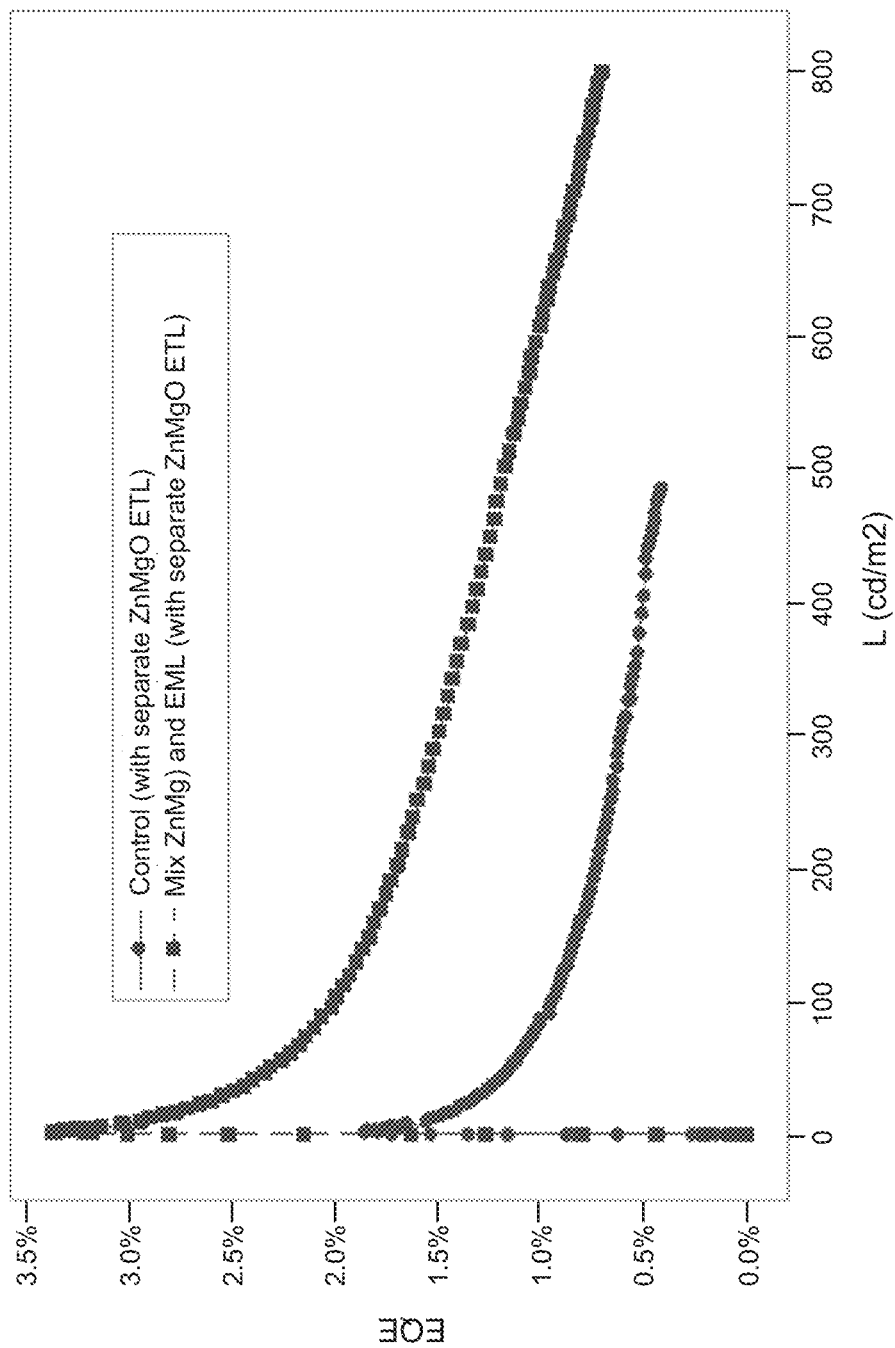
FIG. 7 shows a plot of EQE as a function of luminance for full devices prepared with InP quantum dots with a separate ZnMgO electron transport layer (control) and full devices prepared with InP quantum dots mixed with ZnMgO (and with separate ZnMgO electron transport layer).

As shown in FIG. 7, the device (device B) with the ZnMgO and InP quantum dots in the emissive layer performs better than the device (device A) with only InP quantum dots in the emissive layer.

Example 7

InP Modified with EO2CA

InP was ligand exchanged with the small molecule (2-[2-(2-Methoxyethoxy)ethoxy]acetic acid) (EO2CA). Glass/ITO/PEDOT/VNPB substrates were prepared as described in Example 4. EO2CA InP quantum dots were diluted with propylene glycol methyl ether acetate (PGMEA) such that a film spin-coated at 2000 rpm was 20 nm thick. The EO2CA InP film was baked at 200° C. for 5 minutes.

Native ligand quantum dots could not be dispersed in PGMEA but were instead coated from an 18 mg/mL solution in octane at 2000 rpm. An ETL consisting of ZnMgO nanoparticles (dispersed in ethanol at 8 mg/mL) was applied by spin coating at 3000 rpm. Aluminum (150 nm) was deposited by thermal evaporation to form the devices.

Figure 8:
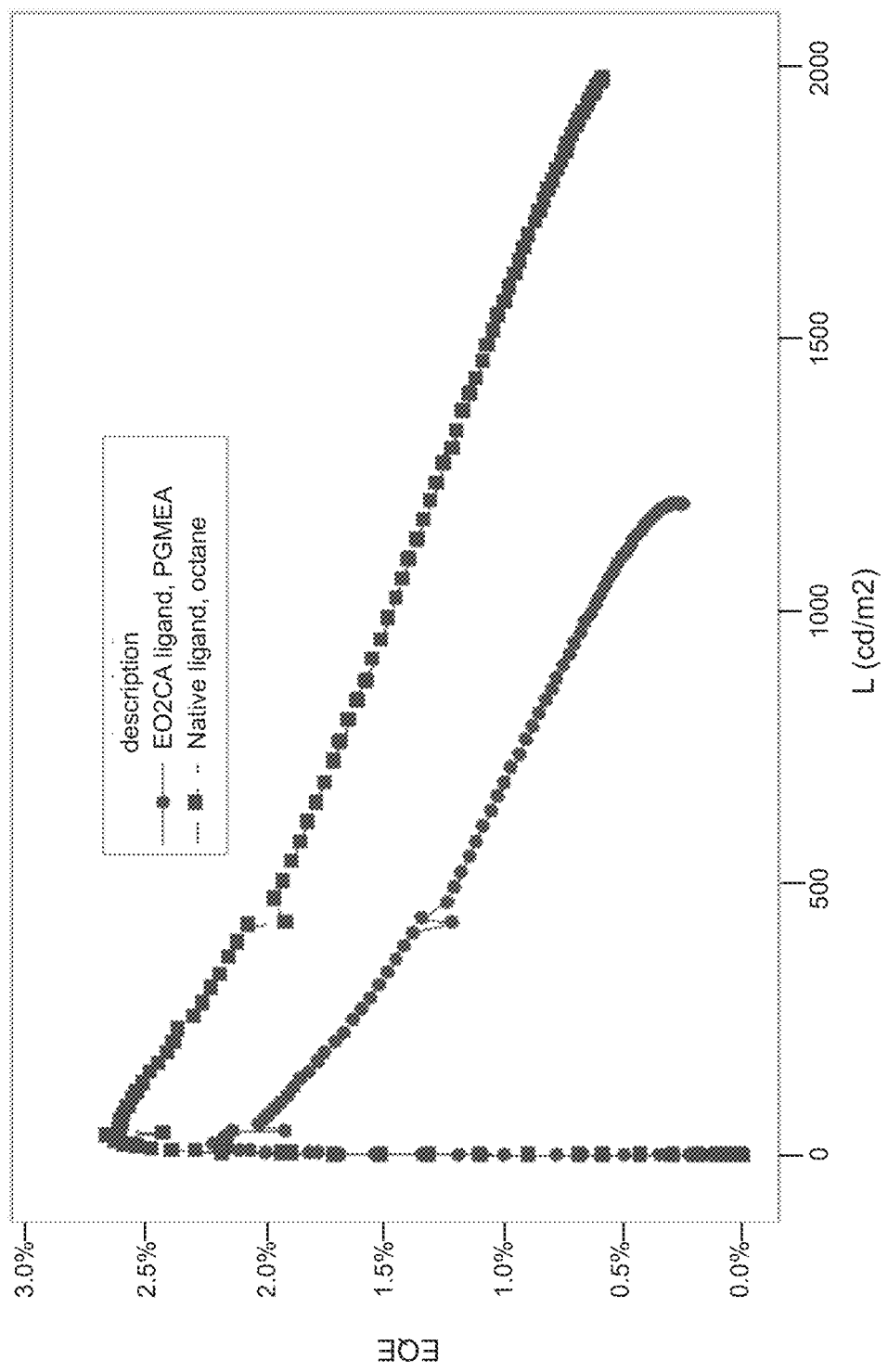
FIG. 8 shows a plot of EQE as a function of luminance for full devices prepared with InP quantum dots comprising (2-[2-(2-methoxyethoxy)ethoxy]acetic acid) (EO2CA) ligands diluted in propylene glycol methyl ether acetate (PGMEA) and full devices prepared with InP quantum dots comprising oleic acid ligands (native ligands) diluted in octane. The InP quantum dots comprising oleic acid ligands were not dispersable in PGMEA.

As shown in FIG. 8, devices fabricated from the PGMEA solution had comparable performance to native ligand quantum dots deposited from octane as spin coated solvent.

PGMEA has a higher boiling point that octane (146° C. v. 125° C.). Still higher boiling point solvents (200° C. or more) are required for inkjet printing. It is expected that PEG350-CA ligand quantum dots will be compatible with at least one of the solvents typically used for printing.

While various embodiments of the present disclosure have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present disclosure should not be limited by any of the above-described exemplary embodiments, but should be defined only in accordance with the following claims and their equivalents.

As will be understood by persons of ordinary skill in the art, any of the foregoing device and/or processing components can be used in any suitable combination to form the QD film of the present disclosure.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A nanostructure composition, comprising:
    (a) at least one population of nanostructures; and
    (b) at least one poly(alkylene oxide) ligand bound to the surface of the nanostructures, wherein the at least one poly(alkylene oxide) ligand comprises a functional group (FG) terminated poly(alkylene oxide), wherein the FG is —OH, —SH, —NH$_2$, —C(=O)OH, —N$_3$, or —Si(OR$^{1V}$)$_3$, and wherein each R$^{1V}$ is independently H or C$_{1-20}$ alkyl.

2. The nanostructure composition of claim 1, wherein the poly(alkylene oxide) ligand has the formula:

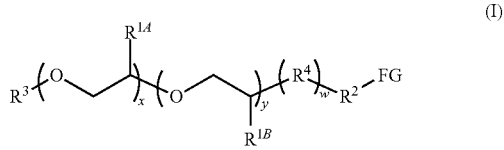

wherein:
    x is 1 to 100;
    y is 0 to 100;
    w is 0 or 1;
    R$^{1A}$ and R$^{1B}$ independently are H or C$_{1-20}$ alkyl;
    R$^2$ is C$_{1-20}$ alkyl;
    R$^3$ is H, C$_{1-20}$ alkyl, C$_{3-8}$ cycloalkyl, or C$_{6-14}$ aryl; and
    R$^4$ is —O—, —OC(=O)—, amido, or C$_{1-20}$ alkyl;
    provided that when FG is —SH, R$^{1A}$ and R$^{1B}$ cannot both be H.

3. The nanostructure composition of claim 1, wherein the poly(alkylene oxide) ligand has the formula:

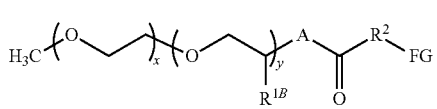

(II)

wherein:
x is 1 to 100;
y is 0 to 100;
A is —O— or —N—;
$R^{1B}$ is H or $C_{1-20}$ alkyl;
$R^2$ is $C_{1-20}$ alkyl;
FG is —OH, —SH, —NH$_2$, —C(=O)OH, —N$_3$, or —Si(OR$^{1V}$)$_3$; and
each $R^{1V}$ is independently H or $C_{1-20}$ alkyl,
provided that when FG is —SH, $R^{1B}$ is not H.

4. The nanostructure composition of claim 1, wherein the nanostructures comprise a core selected from the group consisting of InP, InZnP, InGaP, CdSe, CdS, CdSSe, CdZnSe, CdZnS, ZnSe, ZnSSe, ZnTe, ZnTeSe, ZnTeSeS, InAs, InGaAs, and InAsP.

5. The nanostructure composition of claim 2, wherein x is 2 to 20.

6. The nanostructure composition of claim 2, wherein y is 1 to 10.

7. The nanostructure composition of claim 2, wherein $R^{1B}$ is —CH$_3$.

8. The nanostructure composition of claim 2, wherein $R^2$ is —CH$_2$CH$_2$—.

9. The nanostructure composition of claim 2, wherein the poly(alkylene oxide) ligand has the formula:

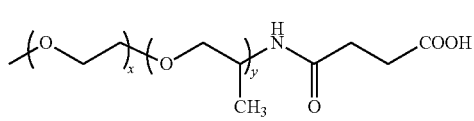

(III)

wherein:
x is 10 to 20; and
y is 1 to 10.

10. The nanostructure composition of claim 9, wherein x is 19 and y is 3.

11. The nanostructure composition of claim 1, wherein between about 10% and about 100% of the nanostructures in the at least one population of nanostructures comprise a functional group terminated poly(alkylene oxide) ligand bound to the nanostructures and further comprising at least one organic resin.

12. The nanostructure composition of claim 11, wherein between about 30% and about 100% of the nanostructures in the at least one population of nanostructures comprise the poly(alkylene oxide) ligand bound to the nanostructures.

13. A method of preparing a nanostructure composition, the method comprising:
(a) providing the nanostructure composition of claim 1; and
(b) admixing at least one organic resin with the composition of (a).

14. The method of claim 13, wherein the at least one population of nanostructures contains a core selected from the group consisting of InP, InZnP, InGaP, CdSe, CdS, CdSSe, CdZnSe, CdZnS, ZnSe, ZnSSe, ZnTe, ZnTeSe, ZnTeSeS, InAs, InGaAs, and InAsP.

15. The method of claim 13, wherein the functional group terminated poly(alkylene oxide) ligand has the formula:

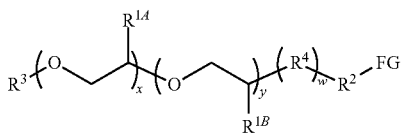

(I)

wherein:
x is 1 to 100;
y is 0 to 100;
w is 0 or 1;
$R^{1A}$ and $R^{1B}$ independently are H or $C_{1-20}$ alkyl;
$R^2$ is $C_{1-20}$ alkyl;
$R^3$ is H, $C_{1-20}$ alkyl, $C_{3-8}$ cycloalkyl, or $C_{6-14}$ aryl; and
$R^4$ is —O—, —OC(=O)—, amido, or $C_{1-20}$ alkyl;
provided that when FG is —SH, $R^{1A}$ and $R^{1B}$ cannot both be H.

16. The method of claim 13, wherein the functional group terminated poly(alkylene oxide) ligand has the formula:

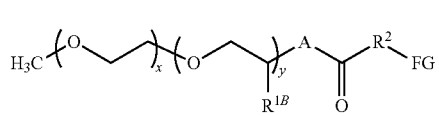

(II)

wherein:
x is 1 to 100;
y is 0 to 100;
A is —O— or —N—;
$R^{1B}$ is H or $C_{1-20}$ alkyl; and
$R^2$ is $C_{1-20}$ alkyl;
provided that when FG is —SH, $R^{1B}$ is not H.

17. The method of claim 13, wherein the providing in (a) comprises:
(1) replacing a first ligand non-covalently bound to a population of nanostructures with the poly(alkylene oxide) ligand;
(2) purifying the nanostructures prepared in (1); and
(3) dispersing the nanostructures in (2) in a reactive diluent or an organic solvent.

18. The method of claim 17, wherein the purifying in (2) comprises:
(4) precipitating the nanostructures prepared in (1) in a non-polar solvent; and
(5) centrifuging the composition in (4) and removing a supernatant.

19. The nanostructure composition of claim 1, further comprising at least one additional material selected from the group consisting of a hole transport material, an electron transport material, a processing additive, and combinations thereof.

20. The nanostructure composition of claim 19, comprising at least one hole transport material, wherein the at least one hole transport material is selected from the group consisting of an amine, a triarylamine, a thiophene, a carbazole, a phthalocyanine, a porphyrin, and combinations thereof.

21. The nanostructure composition of claim 20, wherein the at least one hole transport material is poly[(9,9-dioctylfluorenyl-2,7-diyl)-co-(4,4'-(N-(4-sec-butylphenyl)diphenylamine)].

22. The nanostructure composition of claim 19, comprising at least one electron transport material, wherein the at least one electron transport material is selected from the group consisting of an imidazole, a pyridine, a pyrimidine, a pyridazine, a pyrazxine, an oxadiazole, a chinoline, a chinoxaline, an anthracene, a benzanthracene, a pyrene, a perylen, a benzimidazole, a triazine, a ketone, a phosphinoxide, a phenazine, a phenanthroline, a triarylborane, a metal oxide, or combinations thereof.

23. The nanostructure composition of claim 22, wherein the at least one electron transport material is ZnMgO.

24. The nanostructure composition of claim 2, wherein x is 1, y is 1, w is 1, $R^{1A}$ is H, $R^{1B}$ is H, $R^2$ is —$CH_2$—, $R_3$ is —$CH_3$, $R^4$ is —O—, and FG is —C(=O)OH.

25. The nanostructure composition of claim 2, wherein x is 8, y is 0, w is 1, $R^{1A}$ is H, $R^{1B}$ is H, $R^2$ is —$CH_2$—, $R_3$ is —$CH_3$, $R^4$ is —O—, and FG is —C(=O)OH.

26. The nanostructure composition of claim 2, wherein x is 15, y is 0, w is 1, $R^{1A}$ is H, $R^{1B}$ is H, $R^2$ is —$CH_2$—, $R_3$ is —$CH_3$, $R^4$ is —O—, and FG is —C(=O)OH.

27. The nanostructure composition of claim 2, wherein x is 23, y is 0, w is 1, $R^{1A}$ is H, $R^{1B}$ is H, $R^2$ is —$CH_2$—, $R_3$ is —$CH_3$, $R^4$ is —O—, and FG is —C(=O)OH.

\* \* \* \* \*